(12) United States Patent
Mashino et al.

(10) Patent No.: US 8,554,149 B2
(45) Date of Patent: Oct. 8, 2013

(54) DIRECTIVITY CONTROL SYSTEM, CONTROL DEVICE, COOPERATIVE STATION DEVICE, RECEPTION STATION DEVICE, AND METHOD OF CONTROLLING DIRECTIVITY

(75) Inventors: Jun Mashino, Yokosuka (JP); Takatoshi Sugiyama, Yokosuka (JP); Kentaro Nishimori, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 397 days.

(21) Appl. No.: 12/867,404
(22) PCT Filed: Feb. 20, 2009
(86) PCT No.: PCT/JP2009/052964
§ 371 (c)(1),
(2), (4) Date: Aug. 12, 2010
(87) PCT Pub. No.: WO2009/104712
PCT Pub. Date: Aug. 27, 2009

(65) Prior Publication Data
US 2010/0317310 A1   Dec. 16, 2010

(30) Foreign Application Priority Data

Feb. 20, 2008   (JP) ................................ 2008-038878
Feb. 27, 2008   (JP) ................................ 2008-046012
Feb. 27, 2008   (JP) ................................ 2008-046013

(51) Int. Cl.
*H04B 1/00* (2006.01)
(52) U.S. Cl.
USPC ........................ 455/63.4; 455/63.1; 455/67.11
(58) Field of Classification Search
USPC .......... 455/67.11, 500, 556.1, 562.1, 69, 522, 455/63.1, 63.4, 65, 519, 518, 273, 561, 455/501; 370/328, 277, 314, 336, 338, 252, 370/329, 342; 375/260, 267, 148, 150
See application file for complete search history.

(56) References Cited

U.S. PATENT DOCUMENTS 6,308,085 B1   10/2001   Shoki
2003/0203741 A1   10/2003   Matsuo et al.
(Continued)

FOREIGN PATENT DOCUMENTS

CN   1339888 A   3/2002
CN   1489416 A   4/2004
(Continued)

OTHER PUBLICATIONS

First Office Action, Chinese Patent Application No. 200980104795.8, Dec. 4, 2012.
(Continued)

*Primary Examiner* — Edward Urban
*Assistant Examiner* — Golam Sorowar
(74) *Attorney, Agent, or Firm* — Harness, Dickey & Pierce, P.L.C.

(57) ABSTRACT

A directivity control system includes a first reception station device which receives an interference signal and a desired signal; a cooperative station device disposed at a different place from the first reception station device, which receives a signal using an antenna; and a control device which controls the directivity of an antenna of the first reception station device, wherein the control device regards a combination of the antenna of the first reception station device and the antenna of the cooperative station device as one array antenna, and calculates a sum, using a weight, of a received signal received using the antenna of the first reception station device and a received signal received using the antenna of the cooperative station device to compose a directivity pattern having a null in an arrival direction of the interference signal in the array antenna.

29 Claims, 43 Drawing Sheets

(56) References Cited

U.S. PATENT DOCUMENTS

| | | |
|---|---|---|
| 2006/0120477 A1 | 6/2006 | Shen et al. |
| 2007/0248172 A1 | 10/2007 | Mehta et al. |
| 2008/0003948 A1* | 1/2008 | Mitran ................ 455/67.11 |
| 2008/0075033 A1* | 3/2008 | Shattil ................. 370/328 |
| 2009/0296591 A1 | 12/2009 | Urabe et al. |
| 2010/0062802 A1* | 3/2010 | Amram ................ 455/556.1 |

FOREIGN PATENT DOCUMENTS

| | | |
|---|---|---|
| JP | 2002-141856 A | 5/2002 |
| JP | 2003-324443 A | 11/2003 |
| JP | 2007-096433 A | 4/2007 |
| KR | 10-2005-0026364 A | 3/2005 |
| KR | 10-2006-0009028 A | 1/2006 |
| WO | 2006/125137 A1 | 11/2006 |
| WO | 2006/132328 A | 12/2006 |
| WO | 2007/116398 A2 | 10/2007 |
| WO | 2008/003022 A2 | 1/2008 |

OTHER PUBLICATIONS

Haykin, S., "Cognitive Radio: Brain-Empowered Wireless Communications," IEEE JSAC, vol. 23, No. 2, pp. 201-220, Feb. 2005.

Kikuma Nobuyoshi, "Adaptation Signal Processing Using Array Antenna," Chapter 6, Science and Technology Publishing, 1998, with partial translation thereof.

Winters, J.H., "Smart Antennas for Wireless Systems," IEEE Wireless Communications, vol. 5, Issue 1., pp. 23-27, Feb. 1998.

Second Office Action, Chinese Patent Application No. 200980104795.8, Jun. 20, 2013.

* cited by examiner

DIRECTIVITY CONTROL SYSTEM, CONTROL DEVICE, COOPERATIVE STATION DEVICE, RECEPTION STATION DEVICE, AND METHOD OF CONTROLLING DIRECTIVITY

CROSS-REFERENCE TO RELATED APPLICATIONS

This application is a 371 U.S. National Stage of International Application No. PCT/JP2009/052964, filed Feb. 20, 2009. This application claims the benefit of Japanese Patent Applications No. JP 2008-038878, filed Feb. 20, 2008, JP 2008-046012, filed Feb. 27, 2008, and JP 2008-046013, filed Feb. 27, 2008. The entire disclosures of the above applications are incorporated by reference herein.

TECHNICAL FIELD

The present invention relates to a directivity control system, a control device, a cooperative station device, a reception station device, and a method of controlling directivity that is capable of suppressing interference through antenna directivity control even with a small reception station device (e.g., mobile phone) having no array antenna.

This application claims priority to and the benefits of Japanese Patent Application No. 2008-038878 filed on Feb. 20, 2008, Japanese Patent Application No. 2008-046012 filed on Feb. 27, 2008, and Japanese Patent Application No. 2008-046013 filed on Feb. 27, 2008, the disclosures of which are incorporated herein by reference.

BACKGROUND ART

As the exhaustion of available frequencies continues to approach, there have been increasingly various efforts to enhance use efficiency of the frequencies. A method in which different systems share one frequency by any system detecting (Cognitive) a time and place not used by existing systems and carefully performing transmission and reception not to obstruct the existing systems, as in cognitive radio (see Non-Patent Document 1), has been considered as one approach.

However, the cognitive radio requires very high accuracy in detecting the existing system, and does not actually resolve an issue of interference between the existing system and other systems. Here, as a method of resolving the interference issue, there is a method of suppressing interference by controlling the directivity of an array antenna (see Non-Patent Documents 2 and 3).

For example, FIG. 43 is a diagram for explaining a conventional method of suppressing interference in an array antenna. In FIG. 43, a reception station 1121 includes an array antenna consisting of two antennas 1131 and 1132. The reception station 1121 simultaneously receives an interference signal U from an interference station 1011 and a desired signal D from a transmission station 1012.

In this case, a control circuit 1122 in the reception station 1121 assigns a weight to an array antenna phase from received signals X1 and X2 obtained by summing the desired signal D and the interference signal U received using the respective antennas 1131 and 1132 or from the interference signal U, so that a null in an interference direction viewed from the reception station 1121 and a high directivity in a desired signal direction are obtained.

The control circuit 1122 calculates a weight coefficient (weight) for forming an optimal directivity pattern P40 using an adaptation algorithm. For example, the adaptation algorithm is a simple method with excellent effects, and a power inversion adaptive array antenna (PIAA antenna) scheme is used (e.g., see Non-Patent Document 2). The power inversion adaptive array antenna is effective when there is an interference wave stronger than a desired wave, and an output signal that an inversion of an S/N ratio of the desired wave and the interference wave is obtained. In addition, a reference wave is unnecessary and an arrival direction of the desired wave does not have to be known. An algorithm for the power inversion adaptive array antenna will be described below.

Through the power inversion adaptive array antenna (PIAA antenna), it is possible to obtain a null in an interference direction viewed from the reception station 1121 and a high directivity in a direction of the desired signal.

The directivity of the array antenna is controlled so that the null in the interference direction and the high directivity in a desired wave direction are obtained to suppress the interference. However, since there is a trade-off relationship between an interference suppression effect and an antenna scale, and a hardware scale of the array antenna greatly affects the scale and price of the device, it is difficult to apply the array antenna to small portable terminals.

As described above, the directivity of the array antenna is controlled so that the null in the interference direction and the high directivity in the desired wave direction are obtained to suppress the interference. However, since there is the trade-off relationship between the interference suppression effect and the antenna scale, and the hardware scale of the array antenna greatly affects the scale and price of the device, it is difficult to apply the array antenna to small portable terminals.

Non-Patent Document 1: S. Haykin, "Cognitive Radio: Brain-Empowered Wireless Communications," IEEE JSAC, VOL 23. NO.2. pp. 201-220, February 2005.

Non-Patent Document 2: Kikuma Nobuyoshi, "Adaptation Signal Processing Using Array Antenna," Chap 6, Science and Technology Publishing, 1998.

Non-Patent Document 3: Winters, J. H., "Smart antennas for wireless systems," IEEE Wireless Communications, Vol. 5, Issue. 1 pp. 23-27, February 1998.

DISCLOSURE OF INVENTION

Problem to be Solved by the Invention

The present invention has been achieved in view of the above circumstances, and it is an object of the present invention to provide a directivity control system, a control device, a cooperative station device, a reception station device, and a method of controlling directivity that is capable of suppressing interference through antenna directivity control even with a small reception station device having no array antenna.

Means for Solving the Problem (1) The present invention has been achieved to resolve the foregoing problems. The present invention provides a directivity control system including: a first reception station device which receives an interference signal and a desired signal; a cooperative station device disposed at a different place from the first reception station device, which receives a signal using an antenna; and a control device which controls the directivity of an antenna of the first reception station device, wherein the control device regards a combination of the antenna of the first reception station device and the antenna of the cooperative station device as one array antenna, and calculates a sum, using a weight, of a received signal received using the antenna of the first reception station device and a received signal received using the antenna of the cooperative station device to compose a directivity pattern having a null in an arrival direction of the interference signal in the array antenna.

(2) In the directivity control system of the present invention, the control device may include: a received signal receiver which receives a first received signal X1, which is received using the antenna of the first reception station device, from the first reception station device, and receives a second received signal X2, which is received using the antenna of the cooperative station device, from the cooperative station device; a weight coefficient calculator which calculates a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna; a weight coefficient transmitter which transmits the first weight coefficient W1 to the first reception station device and the second weight coefficient W2 to the cooperative station device; a product signal receiver which receives a signal of a product W1·X1 of the first received signal X1 and the first weight coefficient W1 from the first reception station device, and a signal of a product W2·X2 of the second received signal X2 and the second weight coefficient W2 from the cooperative station device; a synthesized signal generator which generates a signal of a sum Y of the product W1·X1 and the product W2·X2, in which: Y=W1·X1+W2·X2; and a synthesized signal transmitter which transmits the signal of the sum Y generated by the synthesized signal generator to the first reception station device.

(3) In the directivity control system of the present invention, the control device may include: a received signal receiver which receives a first received signal X1, which is received using the antenna of the first reception station device, from the first reception station device, and receives a second received signal X2, which is received using the antenna of the cooperative station device, from the cooperative station device; a weight coefficient calculator which calculates a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna; a synthesized signal generator which calculates a product W1·X1 of the first received signal X1 and the first weight coefficient W1 and a product W2·X2 of the second received signal X2 and the second weight coefficient W2, and generates a signal of a sum Y of the product W1·X1 and the product W2·X2, in which: Y=W1·X1+W2·X2; and a synthesized signal transmitter which transmits the signal of the sum Y generated by the synthesized signal generator to the first reception station device.

(4) In the directivity control system of the present invention, a second reception station device may be disposed in place of the cooperative station device, and the first and second reception station devices may take first and second transmission signals as respective desired signals, and regard transmission signals for other reception station devices as interference signals, and the control device may include: a directivity controller which regards a combination of the antenna of the first reception station device and the antenna of the second reception station device as one array antenna, and calculates a sum of, using a weight, of a received signal received using the antenna of the first reception station device and a received signal received using the antenna of the second reception station device to form, in the array antenna, a directivity pattern having a null in an arrival direction of the interference signal in the first reception station device when the first reception station device performs reception, and a directivity pattern having a null in an arrival direction of the interference signal in the second reception station device when the second reception station device performs reception.

(5) The directivity control system of the present invention may include: a weight coefficient calculator which calculates a weight coefficient W1 for a received signal X1 of the first reception station device and a weight coefficient W2 for a received signal X2 of the second reception station device, so that the directivity pattern of the array antenna forms a null in an arrival direction of the interference signal in the first reception station device, at a first timing when the first reception station device receives a signal, and calculates a weight coefficient W1' for a received signal X1' of the first reception station device and a weight coefficient W2' for a received signal X2' of the second reception station device, so that the directivity pattern of the array antenna forms a null in an arrival direction of the interference signal in the second reception station device, at a second timing when the second reception station device receives a signal, the second timing being different from the first timing; a weight coefficient transmitter which transmits the weight coefficient W1 to the first reception station device and the weight coefficient W2 to the second reception station device at the first timing, and transmits the weight coefficient W1' to the first reception station device and the weight coefficient W2' to the second reception station device at the second timing; a synthesized signal generator which receives a signal of a product W1·X1 of the received signal X1 and the weight coefficient W1 from the first reception station device and a signal of a product W2·X2 of the received signal X2 and the weight coefficient W2 from the second reception station device to generate a signal of a sum Y (Y=W1·X1+W2·X2) at the first timing, and receives a signal of a product W1'·X1' of the received signal X1' and the weight coefficient W1' from the first reception station device and a signal of a product W2'·X2' of the received signal X2' and the weight coefficient W2' from the second reception station device to generate a signal of a sum Y' (Y=W1'·X1'+W2'·X2') at the second timing; and a synthesized signal transmitter which transmits the signal of the sum Y to the first reception station device at the first timing and transmits the signal of the sum Y' to the second reception station device at the second timing.

(6) The directivity control system of the present invention may include: a weight coefficient calculator which calculates a weight coefficient W1 for a received signal X1 of the first reception station device and a weight coefficient W2 for a received signal X2 of the second reception station device, so that the directivity pattern of the array antenna forms a null in an arrival direction of the interference signal in the first reception station device, at a first timing when the first reception station device receives a signal, and calculates a weight coefficient W1' for a received signal X1' of the first reception station device and a weight coefficient W2' for a received signal X2' of the second reception station device, so that the directivity pattern of the array antenna forms a null in an arrival direction of the interference signal in the second reception station device, at a second timing when the second reception station device receives a signal, the second timing being different from the first timing; a synthesized signal generator which calculates a product $W1 \cdot X1$ of the received signal $X1$ and the weight coefficient $W1$ and a product $W2 \cdot X2$ of the received signal $X2$ and the weight coefficient $W2$ to calculate a signal of a sum Y ($Y=W1 \cdot X1+W2 \cdot X2$) at the first timing, and calculates a product $W1' \cdot X1'$ of the received signal $X1'$ and the weight coefficient $W1'$ and a product $W2' \cdot X2'$ of the received signal $X2'$ and the weight coefficient $W2'$ to generate a signal of a sum. Y' ($Y=W1' \cdot X1'+W2' \cdot X2'$) at the second timing; and a synthesized signal transmitter which transmits the signal of the sum Y to the first reception station device at the first timing and transmits the signal of the sum Y' to the second reception station device at the second timing.

(7) In the directivity control system of the present invention, the first reception station device may receive a plurality of interference signals and the desired signal, and a plurality of cooperative station devices may be disposed, and the control device may include: a cooperative station selector which selects at least one or two cooperative station devices based on information on an interference wave number detected by the first reception station device and information on an interference-wave reception state in the cooperative station device, and the control device may regard a combination of the antenna of the first reception station device and antennas of the at least one or two selected cooperative station devices as one array antenna, and calculates a sum, using a weight, of signals received using the respective antennas of the first reception station device and the selected cooperative station devices to form a directivity pattern having a null in an arrival direction of the interference signal in the array antenna.

(8) In the directivity control system of the present invention, the control device may include: a received signal receiver which receives a received signal $X1$, which is received using the antenna of the first reception station device, from the first reception station device and received signals $X2$, $X3$ to $Xn+1$, which are received using respective antennas of n ($n \geq 1$) cooperative station devices selected by the cooperative station selector, from the respective cooperative station devices; a weight coefficient calculator which calculates a weight coefficient $W1$ for the received signal $X1$ of the first reception station device and respective weight coefficients $W2$, $W3$ to $Wn+1$ for the received signals $X2$, $X3$ to $Xn+1$ of the cooperative station devices based on the received signal $X1$ and the received signals $X2$ to $Xn+1$ received by the received signal receiver, so that a directivity pattern of an array antenna formed of the antenna of the first reception station device and the antennas of the n selected cooperative station devices form a null in an arrival direction of each interference signal; a weight coefficient transmitter which transmits the weight coefficient $W1$ to the first reception station device and the weight coefficients $W2$, $W3$ to $Wn+1$ to the corresponding cooperative station devices; a product signal receiver which receives a signal of a product $W1 \cdot X1$ of the signal $X1$ received from the first reception station device and the reception station weight coefficient $W1$, and signals of respective products $W2 \cdot X2$, $W3 \cdot X3$ to $Wn+1 \cdot Xn+1$ of the signals $X2$, $X3$ to $Xn+1$ received from the respective cooperative station devices and the weight coefficients $W2$, $W3$ to $Wn+1$; a synthesized signal generator which generates a signal of a sum Y of the product $W1 \cdot X1$ received from the first reception station device and the products $W2 \cdot X2$, $W3 \cdot X3$ to $Wn+1 \cdot Xn+1$ received from the respective cooperative station devices, in which: $Y=W1 \cdot X1+W2 \cdot X2+W3 \cdot X3+ \ldots +Wn+1 \cdot Xn+1$; and a synthesized signal transmitter which transmits the signal of the sum Y generated by the synthesized signal generator to the first reception station device.

(9) In the directivity control system of the present invention, the control device may include: a received signal receiver which receives a received signal $X1$, which is received using the antenna of the first reception station device, from the first reception station device and received signals $X2$, $X3$ to $Xn+1$, which are received using respective antennas of n ($n \geq 1$) cooperative station devices selected by the cooperative station selector, from the respective cooperative station devices; a weight coefficient calculator which calculates a weight coefficient $W1$ for the received signal $X1$ of the first reception station device and respective weight coefficients $W2$, $W3$ to $Wn+1$ for the received signals $X2$, $X3$ to $Xn+1$ of the cooperative station devices based on the received signal $X1$ and the received signals $X2$ to $Xn+1$ received by the received signal receiver, so that a directivity pattern of an array antenna formed of the antenna of the first reception station device and the antennas of the n selected cooperative station devices form a null in a direction of each interference signal; a synthesized signal generator which calculates a product $W1 \cdot X1$ of the received signal $X1$ received from the first reception station device and the weight coefficient $W1$, and respective products $W2 \cdot X2$, $W3 \cdot X3$ to $Wn+1 \cdot Xn+1$ of the received signals $X2$, $X3$ to $Xn+1$ received from the respective cooperative station devices and the weight coefficients $W2$, $W3$ to $Wn+1$ to generate a signal of a sum Y, in which: $Y=W1 \cdot X1+W2 \cdot X2+W3 \cdot X3+ \ldots +Wn+1 \cdot Xn+1$; and a synthesized signal transmitter which transmits the signal of the sum Y generated by the synthesized signal generator to the first reception station device.

(10) In the directivity control system of the present invention, the control device may regard a combination of the antenna of the first reception station device and the antenna of the cooperative station device as one array antenna, and calculates a sum, using a weight, of a received signal received using the antenna of the first reception station device and a received signal received using the antenna of the cooperative station device to compose a directivity pattern having a null in an arrival direction of the interference signal in the array antenna and a high directivity in an arrival direction of the desired signal.

(11) The prevent invention provides a control device which controls a directivity of an antenna of a first reception station device which receives an interference signal and a desired signal, wherein the control device regards a combination of the antenna of the first reception station device and an antenna of a cooperative station device disposed at a different place from the first reception station device as one array antenna, and calculates a sum, using a weight, of a received signal received using the antenna of the first reception station device and a received signal received using the antenna of the cooperative station device to compose a directivity pattern having a null in an arrival direction of the interference signal in the array antenna.

(12) The control device of the present invention may include: a received signal receiver which receives a first received signal $X1$, which is received using the antenna of the first reception station device, from the first reception station device, and receives a second received signal $X2$, which is received using the antenna of the cooperative station device, from the cooperative station device; a weight coefficient calculator which calculates a first weight coefficient $W1$ for the first received signal $X1$ and a second weight coefficient $W2$ for the second received signal $X2$ based on the first and second received signals $X1$ and $X2$ received by the received signal receiver, so that a directivity pattern of an array antenna formed of the antenna of the first reception station device and the antenna of the cooperative station device has a null in an arrival direction of the interference signal in the array antenna; a weight coefficient transmitter which transmits the first weight coefficient W1 to the first reception station device and the second weight coefficient W2 to the cooperative station device; a product signal receiver which receives a signal of a product W1·X1 of the first received signal X1 and the first weight coefficient W1 from the first reception station device, and receives a signal of a product W2·X2 of the second received signal X2 and the second weight coefficient W2 from the cooperative station device; a synthesized signal generator which generates a signal of a sum Y of the product W1·X1 and the product W2·X2, in which: Y=W1·X1+W2·X2; and a synthesized signal transmitter which transmits the signal of the sum Y generated by the synthesized signal generator to the first reception station device.

(13) The control device of the present invention may include: a received signal receiver which receives a first received signal X1, which is received using the antenna of the first reception station device, from the first reception station device, and receives a second received signal X2, which is received using the antenna of the cooperative station device, from the cooperative station device; a weight coefficient calculator which calculates a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna; a synthesized signal generator which calculates a product W1·X1 of the first received signal X1 and the first weight coefficient W1 and a product W2·X2 of the second received signal X2 and the second weight coefficient W2, and generates a signal of a sum Y of the product W1·X1 and the product W2·X2, in which: Y=W1·X1+W2·X2; and a synthesized signal transmitter which transmits the signal of the sum Y generated by the synthesized signal generator to the first reception station device.

(14) In the control device of the present invention, a second reception station device may be disposed in place of the cooperative station device, and the first and second reception station devices may take first and second transmission signals as respective desired signals, and regard transmission signals for other reception station devices as interference signals, and wherein the control device may include: a directivity controller which regards a combination of the antenna of the first reception station device and an antenna of the second reception station device as one array antenna, and calculates a sum, using a weight, of a received signal received using the antenna of the first reception station device and a received signal received using the antenna of the second reception station device to form, in the array antenna, a directivity pattern having a null in an arrival direction of an interference signal in the first reception station device when the first reception station device performs reception, and a directivity pattern having a null in an arrival direction of the interference signal in the second reception station device when the second reception station device performs reception.

(15) In the control device of the present invention, the first reception station device may receive a plurality of interference signals and the desired signal, and a plurality of cooperative station devices may be disposed, and wherein the control device may include: a cooperative station selector which selects at least one or two cooperative station devices based on information on an interference wave number detected by the first reception station device and information on an interference-wave reception state in the cooperative station device, and the control device regards a combination of the antenna of the first reception station device and antennas of the at least one or two selected cooperative station devices as one array antenna, and calculates a sum, using a weight, of signals received using the respective antennas of the first reception station device and the selected cooperative station devices to form a directivity pattern having a null in an arrival direction of each interference signal in the array antenna.

(16) The present invention provides a cooperative station device disposed at a different place from a reception station device which receives an interference signal from an interference station and a desired signal from a transmission station using an antenna, the cooperative station device including: a received signal receiver in the cooperative station which receives a first received signal X1 received using the antenna of the reception station device; a weight coefficient calculator in the cooperative station which calculates a first weight coefficient W1 for the first received signal X1 and a second weight coefficient W2 for a second received signal X2 based on the first received signal X1 and the second received signal X2 received using an antenna of the cooperative station device, so that a directivity pattern of an array antenna formed of the antenna of the reception station device and the antenna of the cooperative station device has a null in an arrival direction of the interference signal in the array antenna; and a synthesized signal transmitter in the cooperative station which transmits a signal of a sum Y generated based on the first received signal X1, the first weight coefficient W1, the second received signal X2, and the second weight coefficient W2 to the reception station device, in which: Y=W1·X1+W2·X2.

(17) The cooperative station device of the present invention may further include: a weight coefficient transmitter in the cooperative station which transmits the first weight coefficient W1 to the reception station device; a product signal receiver in the cooperative station which receives a signal of a product W1·X1 of the first received signal X1 and the first weight coefficient W1 from the reception station device; and a synthesized signal generator in the cooperative station which calculates a product W2·X2 of the second received signal X2 and the second weight coefficient W2 and generates a signal of a sum Y of the product W2·X2 and the product W1·X1 received from the reception station device, in which: Y=W1·X1+W2·X2.

(18) The cooperative station device of the present invention may further include a synthesized signal generator in the cooperative station which calculates a product W1·X1 of the first received signal X1 and the first weight coefficient W1 and a product W2·X2 of the second received signal X2 and the second weight coefficient W2, and generates a signal of a sum Y of the product W1·X1 and the product W2·X2, in which: Y=W1·X1+W2·X2.

(19) In the cooperative station device of the present invention, the weight coefficient calculator in the cooperative station may calculate respective weight coefficients for the reception station device, the cooperative station itself, and the other cooperative station device, so that a directivity pattern of an array antenna formed of the antenna of the reception station device, the antenna of the cooperative station device itself, and the other cooperative station device has a null in an arrival direction of the interference signal in the array antenna, and the synthesized signal transmitter in the cooperative station may transmit a sum generated based on respective received signals of the reception station device, the cooperative station itself, and the other cooperative station device, and the respective weight coefficients calculated by the weight coefficient calculator in the cooperative station, to the reception station device.

(20) The present invention provides a reception station device which receives an interference signal from an interference station and a desired signal from a transmission station using an antenna, the reception station device including: a received signal receiver in a reception station which receives a second received signal X2 that is received using an antenna of a cooperative station device disposed at a different place from the reception station device and receives the interference signal and the desired signal; a weight coefficient calculator in the reception station which calculates, based on the second received signal X2 and a first received signal X1 received using the antenna of the reception station device itself, a first weight coefficient W1 for the first received signal X1 and a second weight coefficient W2 for the second received signal X2, so that a directivity pattern of an array antenna formed of the antenna of the cooperative station device and the antenna of the reception station device itself has a null in an arrival direction of the interference signal in the array antenna; and a synthesized signal generator in the reception station which generates a signal of a sum Y based on the first received signal X1, the first weight coefficient W1, the second received signal X2, and the second weight coefficient W2, in which: $Y=W1 \cdot X1+W2 \cdot X2$.

(21) The reception station device of the present invention may further include: a weight coefficient transmitter in the reception station which transmits the second weight coefficient W2 to the cooperative station device; and a product signal receiver in the reception station which receives a signal of a product $W2 \cdot X2$ of the second received signal X2 and the second weight coefficient W2 from the cooperative station device, wherein the synthesized signal generator in the reception station may calculate a product $W1 \cdot X1$ of the first received signal X1 and the first weight coefficient W1, and generates a signal of a sum Y of the product $W1 \cdot X1$ and the product $W2 \cdot X2$ received from the cooperative station device, in which: $Y=W1 \cdot X1+W2 \cdot X2$.

(22) In the reception station device of the present invention, the synthesized signal generator in the reception station may calculate a product $W1 \cdot X1$ of the first received signal X1 and the first weight coefficient W1 and a product $W2 \cdot X2$ of the second received signal X2 and the second weight coefficient W2, and generates a signal of a sum Y of the product $W1 \cdot X1$ and the product $W2 \cdot X2$, in which: $Y=W1 \cdot X1+W2 \cdot X2$.

(23) In the reception station device of the present invention, the received signal receiver in the reception station may receive respective received signals that are received using respective antennas of first and second cooperative station devices disposed at a different place from the reception station device and receives the interference signal and the desired signal; the weight coefficient calculator in the reception station may calculate respective weight coefficients of the first and second cooperative station devices and the reception station device itself based on the respective received signals received using respective antennas of the first and second cooperative station devices and a received signal received using the antenna of the reception station device itself, so that a directivity pattern of an array antenna formed of the antennas of the first and second cooperative station devices and the antenna of the reception station device itself has a null in an arrival direction of the interference signal in the array antenna; and the synthesized signal generator in the reception station may generate a sum based on the respective received signals received using the respective antennas of the first and second cooperative station devices, the received signal received using the antenna of the reception station device itself, and the respective weight coefficients of the first and second cooperative station devices and the reception station device itself.

(24) The reception station device of the present invention may include: a cooperative station selector which selects at least one or two cooperative station devices based on information on a detected interference wave number and information on an interference-wave reception state in the cooperative station device, wherein the reception station device may regard a combination of the antenna of the reception station device and antennas of the at least one or two selected cooperative station devices as one array antenna, and calculates a sum, using a weight, of signals received using the respective antennas of the reception station device and the selected cooperative station devices to form a directivity pattern having a null in an arrival direction of each interference signal in the array antenna.

(25) The present invention provides a method of controlling directivity using: a first reception station device which receives an interference signal and a desired signal; a cooperative station device disposed at a different place from the first reception station device, which receives a signal using an antenna; and a control device which controls the directivity of an antenna of the first reception station device, wherein the control device regards a combination of the antenna of the first reception station device and the antenna of the cooperative station device as one array antenna, and calculates a sum, using a weight, of a received signal received using the antenna of the first reception station device and a received signal received using the antenna of the cooperative station device to compose a directivity pattern having a null in an arrival direction of the interference signal in the array antenna.

(26) In the method of controlling directivity of the present invention, the control device may include: receiving a first received signal X1, which is received using the antenna of the first reception station device, from the first reception station device, and receiving a second received signal X2, which is received using the antenna of the cooperative station device, from the cooperative station device; calculating a first weight coefficient W1 for the first received signal X1 and a second weight coefficient W2 for the second received signal X2 based on the first and second received signals X1 and X2 received in the reception of the first and second received signals, so that a directivity pattern of an array antenna formed of the antenna of the first reception station device and the antenna of the cooperative station device has a null in an arrival direction of the interference signal in the array antenna; transmitting the first weight coefficient W1 to the first reception station device and the second weight coefficient W2 to the cooperative station device; receiving a signal of a product $W1 \cdot X1$ of the first received signal X1 and the first weight coefficient W1 from the first reception station device and a signal of a product $W2 \cdot X2$ of the second received signal X2 and the second weight coefficient W2 from the cooperative station device; generating a signal of the sum Y of the product $W1 \cdot X1$ and the product $W2 \cdot X2$, in which: $Y=W1 \cdot X1+W2 \cdot X2$; and transmitting the signal of the sum Y generated in the generation to the first reception station device.

(27) In the method of controlling directivity of the present invention, the control device may include: receiving a first received signal X1, which is received using the antenna of the first reception station device, from the first reception station device, and receiving a second received signal X2, which is received using the antenna of the cooperative station device, from the cooperative station device; calculating a first weight coefficient W1 for the first received signal X1 and a second weight coefficient W2 for the second received signal X2 based on the first and second received signals X1 and X2 received in the reception of the first and second received signals, so that a directivity pattern of an array antenna formed of the antenna of the first reception station device and the antenna of the cooperative station device has a null in an arrival direction of the interference signal in the array antenna; calculating a product W1·X1 of the first received signal X1 and the first weight coefficient W1 and a product W2·X2 of the second received signal X2 and the second weight coefficient W2, and generating a signal of a sum Y of the product W1·X1 and the product W2·X2, in which: Y=W1·X1+W2·X2; and transmitting the signal of the sum Y generated in the generation to the first reception station device.

(28) In the method of controlling directivity of the present invention, a second reception station device may be disposed in place of the cooperative station device, and the first and second reception station devices take first and second transmission signals as respective desired signals, and may regard transmission signals for other reception station devices as interference signals, and the control device may include: regarding a combination of the antenna of the first reception station device and the antenna of the second reception station device as one array antenna, and calculating a sum, using a weight, of a received signal received using the antenna of the first reception station device and a received signal received using the antenna of the second reception station device to form, in the array antenna, a directivity pattern having a null in an arrival direction of an interference signal in the first reception station device when the first reception station device performs reception, and a directivity pattern having a null in an arrival direction of the interference signal in the second reception station device when the second reception station device performs reception.

(29) In the method of controlling directivity of the present invention, the first reception station device may receive a plurality of interference signals and the desired signal, and a plurality of cooperative station devices may be disposed, and the control device selects at least one or two cooperative station devices based on information on an interference wave number detected by the first reception station device and information on an interference-wave reception state in the cooperative station device; and the control device may regard a combination of the antenna of the first reception station device and antennas of the at least one or two selected cooperative station devices as one array antenna, and may calculate a sum, using a weight, of signals received using the respective antennas of the first reception station device and the selected cooperative station devices to form a directivity pattern having a null in an arrival direction of each interference signal in the array antenna.

Effect of the Invention

In the directivity control system, the control device, the cooperative station device, the reception station device, and the method of controlling directivity of the present invention, it is possible to suppress interference through antenna directivity control even in a small reception station device (e.g., mobile phone) having no array antenna.

REFERENCE SYMBOLS

Figure 1:
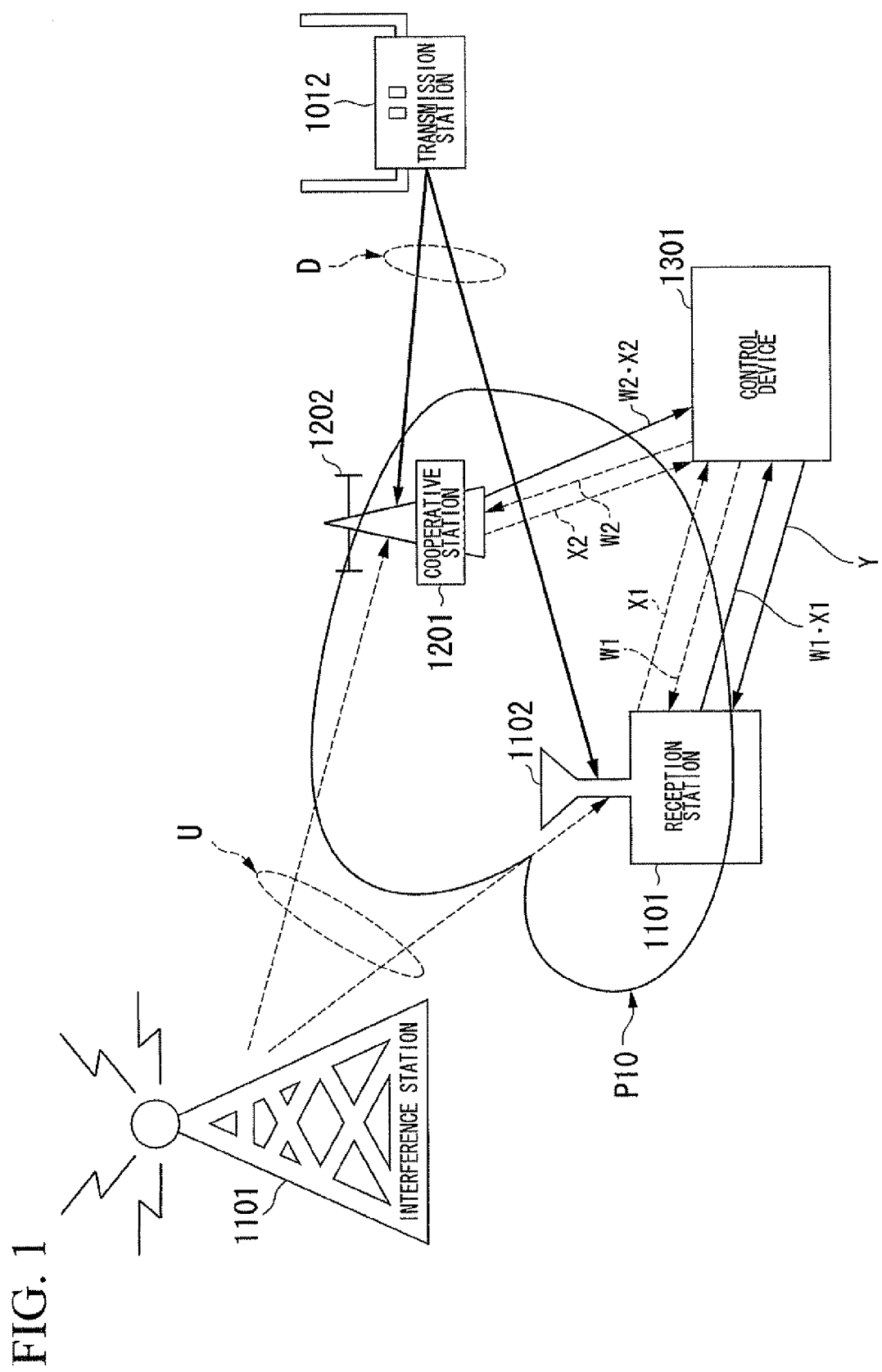
FIG. 1 shows a configuration of a directivity control system according to a first embodiment of the present invention.

1011: interference station, 1012, 1012A, 1012B: transmission station, 1101, 1101A to 1101G: reception station, 1102: antenna, 1111: received signal transmitter in reception station, 1112: weight coefficient receiver in reception station, 1113: multiplier in reception station, 1114: product signal transmitter in reception station, 1115: synthesized signal receiver in reception station, 1201, 1201 to 12010: cooperative station, 1202: antenna, 1211: received signal transmitter in cooperative station, 1212: weight coefficient receiver in cooperative station, 1213: multiplier in cooperative station, 1214: product signal transmitter in cooperative station, 1301, 1301A: control device, 1301B, 1301C: control device in cooperative station, 1301D, 1301E: control device in transmission station, 1301F, 1301G: control device in reception station, 1311: received signal receiver, 1312: weight coefficient calculator, 1313: weight coefficient transmitter, 1314: product signal receiver, 1315: synthesized signal generator, 1316: synthesized signal transmitter, 1321: received signal receiver in cooperative station, 1322: weight coefficient calculator in cooperative station, 1323: weight coefficient transmitter in cooperative station, 1324: product signal receiver in cooperative station, 1325: synthesized signal generator in cooperative station, 1326: synthesized signal transmitter in cooperative station, 1331: received signal receiver in reception station, 1332: weight coefficient calculator in reception station, 1333: weight coefficient transmitter in reception station, 1334: product signal receiver in transmission station, 1335: synthesized signal generator in transmission station, 1336: synthesized signal transmitter in transmission station, 1341: received signal receiver in reception station, 1342: weight coefficient calculator in reception station, 1343: weight transmitter in reception station, 1344: product signal receiver in reception station, 1345: synthesized signal generator in reception station, 2011: interference station, 2021, 2022, 2021A, 2022A: transmission station, 2101, 2101A, 2101B, 2101C: reception station, 2102: antenna, 2110: TDMA communication controller in first reception station, 2110B: CSMA communication controller in first reception station, 2111: received signal transmitter in first reception station, 2112: weight coefficient receiver in first reception station, 2113: multiplier in first reception station, 2114: product signal transmitter in first reception station, 2115: synthesized signal receiver in first reception station, 2201, 2201A, 2201B, 2201C: reception station, 2202: antenna, 2210: TDMA communication controller in second reception station, 2210B: CSMA communication controller in second reception station, 2211: received signal transmitter in second reception station, 2212: weight coefficient receiver in second reception station, 2213: multiplier in second reception station, 2214: product signal transmitter in second reception station, 2215: synthesized signal receiver in second reception station, 2301, 2301A, 2301B, 2301C: directivity control device, 2310: TDMA communication controller, 2310B: CSMA communication controller, 2311: received signal receiver, 2312: weight coefficient calculator, 2313: weight coefficient transmitter, 2314: product signal receiver, 2315: synthesized signal generator, 2316: synthesized signal transmitter, 3011: interference station, 3021: transmission station, 3022: cooperative station selector, 3023: interference wave number receiver, 3024: cooperative-station interference wave information receiver, 3025: cooperation requesting unit, 3101, 3101A to 3101C: reception station, 3102: antenna, 3111: interference wave detector in reception station, 3112: received signal transmitter in reception station, 3113: weight coefficient receiver in reception station, 3114: multiplier in reception station, 3115: product signal transmitter in reception station, 3116: synthesized signal receiver in reception station, 3201: cooperative station, 3202: antenna, 3211: reception state notification unit in first cooperative station, 3212: request signal receiver in first cooperative station, 3213: received signal transmitter in first cooperative station, 3214: weight coefficient receiver in first cooperative station, 3215: multiplier in first cooperative station, 3216: product signal transmitter in first cooperative station, 3301: cooperative station, 3302: antenna, 3311: reception state notification unit in second cooperative station, 3312: request signal receiver in second cooperative station, 3313: received signal transmitter in second cooperative station, 3314: weight coefficient receiver in second cooperative station, 3315: multiplier in second cooperative station, 3316: product signal transmitter in second cooperative station, 3401, 3401A, 3401B, 3401C: control device, 3411: received signal receiver, 3412: weight coefficient calculator, 3413: weight coefficient transmitter, 3414: product signal receiver, 3415: synthesized signal generator, 3416: synthesized signal transmitter, 3417: cooperative station selector, 3418: interference wave number receiver, 3419: cooperative-station interference wave information receiver, 3420: cooperation requesting unit

BEST MODE FOR CARRYING OUT THE INVENTION

Hereinafter, embodiments of the present invention will be described with reference to the accompanying drawings.

In this disclosure, at least one or two interference wave signals transmitted from an interference station are referred to as "interference signals," and a desired wave signal transmitted from a transmission station device is referred to as a "desired signal." Further, in the following description, the above-described "transmission station device" is simply referred to as a "transmission station," the above-described "reception station device" is simply referred to as a "reception station," and the above-described "cooperative station device" is simply referred to as a "cooperative station."

First Embodiment

FIG. 1 shows an entire configuration of a directivity control system according to a first embodiment of the present invention, in which a plurality of cells/systems share the same frequency at the same time and the same place.

In an example shown in FIG. 1, a reception station 1101 and a cooperative station 1201, which do not form an array antenna together, are combined to be regarded as one array antenna system. A control device 1301 assigns a weight to an array antenna phase from a synthesized signal of a desired signal D and an interference signal U received in the reception station 1101 and the cooperative station 1201 or from the interference signal to form, in the array antenna, a directivity pattern P10 having a null in an arrival direction of the interference signal and a high directivity in an arrival direction of the desired signal. Alternatively, the directivity pattern P10 having a null in an arrival direction of the interference signal is formed in the array antenna.

The control device 1301 may use, for example, a power inversion adaptive array antenna (PIAA antenna) scheme when performing weight assignment (obtaining weight coefficient). Hereinafter, a procedure of using the power inversion adaptive array antenna (PIAA antenna) scheme will be described.

In FIG. 1, the reception station 1101 receives the desired signal D and the interference signal U using an antenna 1102. A received signal X1 received using the antenna 1102 is transmitted to the control device 1301. Further, the cooperative station 1201 receives the desired signal D and the interference signal U using an antenna 1202. A received signal X2 received using the antenna 1202 is transmitted to the control device 1301. In the first embodiment, the transmission of the received signal X1 from the reception station 1101 to the control device 1301 and the transmission of the received signal X from the cooperative station 1201 to the control device 1301 are performed only when the weight coefficients are calculated.

The control device 1301 calculates a weight coefficient W based on the received signals X1 and X2 so that a reception power in the reception station 1101 is minimized, using the following equation.

First, a correlation matrix R of the received signals X1 and X2 is obtained.

$$R = \begin{bmatrix} x_1 x_1^* & x_1 x_2^* \\ x_2 x_1^* & x_2 x_2^* \end{bmatrix}$$ [Equation 1]

Subsequently, an optimal weight coefficient W is obtained from an inverse matrix of the correlation matrix R and a transpose matrix of a steering vector S (1, 0). The steering vector S (1, 0) is used to fix a weight coefficient of one of the antennas.

$$W = R^{-1} S$$

$$S = [1\ 0]^T$$ [Equation 2]

A weight coefficient W1 for the received signal X1 and a weight coefficient W2 for the received signal X2 are calculated from the optimal weight coefficient W.

$$W = [w_1 w_2]^T$$ [Equation 3]

When the weight coefficient W1 for the received signal X1 and the weight coefficient W2 for the received signal X2 have been calculated according to the above procedure, the control device 1301 transmits the weight coefficient W1 for the received signal X1 to the reception station 1101 and the weight coefficient W2 for the received signal X2 to the cooperative station 120.

The reception station 1101 multiplies the weight coefficient W1 received from the control device 1301 by the received signal X1 to obtain (W1·X1), and transmits a signal of the product W1·X1 to the control device 1301. Meanwhile, the cooperative station 1201 multiplies the weight coefficient W2 received from the control device 1301 by the received signal X2 to obtain (W2·X2), and transmits a signal of the product W2·X2 to the control device 1301.

The control device 1301 obtains a sum Y based on the signal of the product W1·X1 received from the reception station 1101 and the signal of the product W2·X2 received from the cooperative station 1201.

Sum $Y = W1 \cdot X1 + W2 \cdot X2$

The control device 1301 transmits the signal of the sum Y (Y=W1·X1+W2·X2) to the reception station 1101. The reception station 1101 takes the signal of the sum Y received from the control device 1301 as a received signal.

Thus, the reception station 1101 having no array antenna can be combined with the antenna of the peripheral cooperative station 1201 to form one array antenna, making it possible to form, in the array antenna, a directivity pattern P10 having a null in an arrival direction of the interference signal and a high directivity in an arrival direction of the desired signal. It is also possible to form, in the array antenna, a directivity pattern P10 having the null in the arrival direction of the interference signal. Thus, it is possible to achieve an interference suppression effect of the array antenna without affecting the scale of the device, even when the reception station 1101 is a small reception station device (e.g., mobile phone) having no array antenna, thereby suppressing the interference through antenna directivity control. Further, the directivity pattern of the array antenna P10 formed upon signal reception in the reception station 1101 may be used even upon signal transmission in the reception station 1101.

An algorithm for obtaining the weight coefficients in the control device 1301 is not limited to the above-described power inversion adaptive array antenna (PIAA antenna) scheme. For example, any algorithm, including zero forcing (ZF) and minimum mean square error (MMSE), is available as a control algorithm. Further, any control index, including reception power, reception SI, reception error rate, and so on, is available as a control index.

Figure 2:
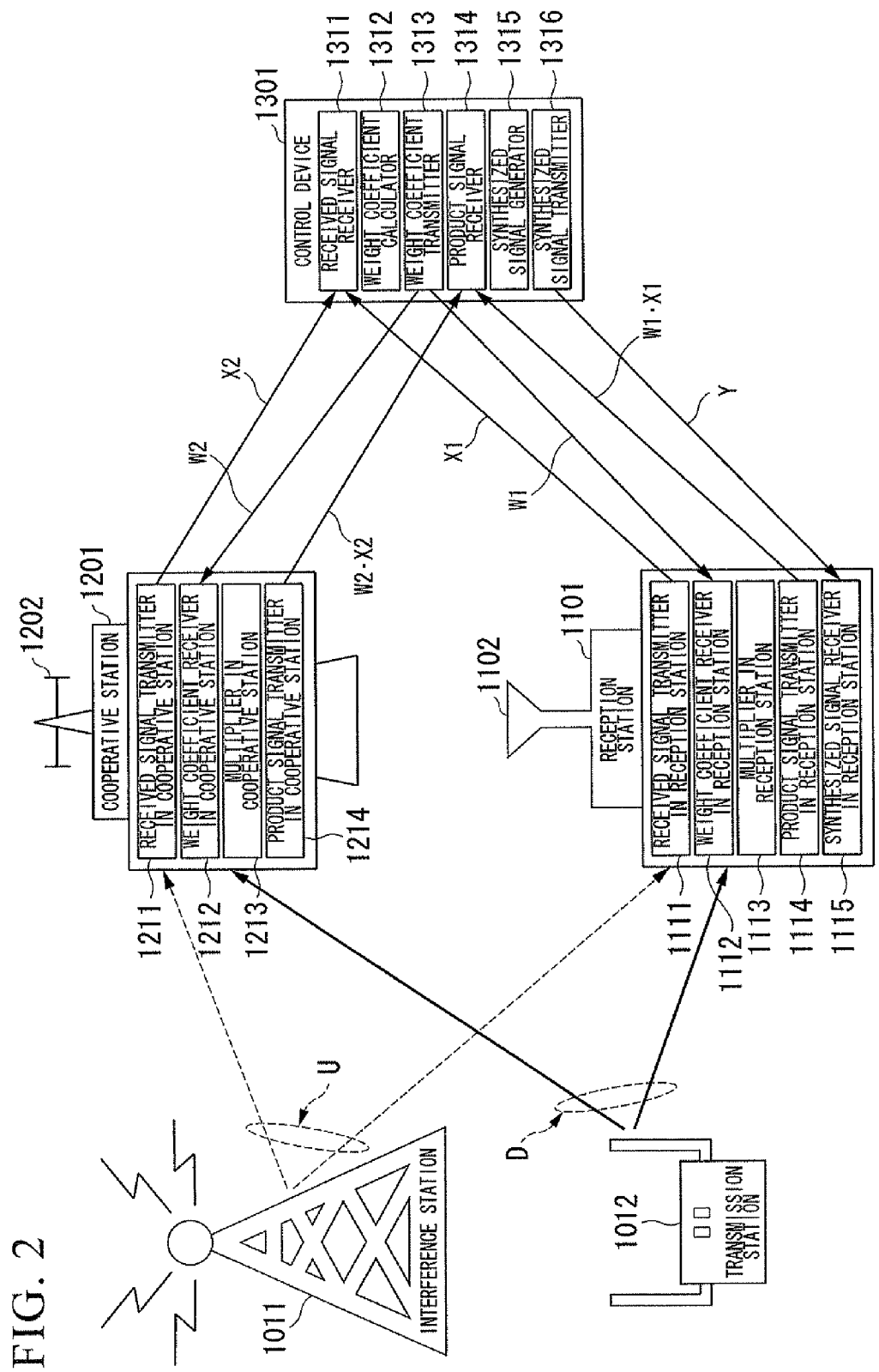
FIG. 2 shows an example of a configuration of each portion in the directivity control system shown in FIG. 1.

FIG. 2 shows an example of a configuration of the reception station 1101, the cooperative station 1201, and the control device 1301 in the directivity control system according to the first embodiment of the present invention.

First, a configuration of the control device 1301 will be described.

A received signal receiver 1311 in the control device 1301 receives the received signal X1, which is received using the antenna 1102 of the reception station 1101, from the reception station 1101, and receives the received signal X2, which is received using the antenna 1202 of the cooperative station 1201, from the cooperative station 1201. The transmission of the received signal X1 from the reception station 1101 to the control device 1301 and the transmission of the received signal X from the cooperative station 1201 to the control device 1301 are performed only when the weight coefficients for the received signals X1 and X2 are calculated.

A weight coefficient calculator 1312 calculates the weight coefficient W1 of the received signal X1 and the weight coefficient W2 of the received signal X2 based on the received signals X1 and X2 received by the received signal receiver 1311 so that a directivity pattern of an array antenna formed of the antenna 1102 and the antenna 1202 has a null in an arrival direction of the interference signal and a high directivity in an arrival direction of the desired signal. Alternatively, the weight coefficient calculator 1312 calculates the weight coefficient W1 of the received signal X1 and the weight coefficient W2 of the received signal X2 so that the directivity pattern of the array antenna has the null in the arrival direction of the interference signal. The weight coefficients can be calculated using the above-described power inversion adaptive array antenna (PIAA antenna) scheme.

A weight coefficient transmitter 1313 transmits the weight coefficient W1 calculated by the weight coefficient calculator 1312 to the reception station 1101 and transmits the weight coefficient W2 to the cooperative station 1201.

A product signal receiver 1314 receives a signal of a product W1·X1 of the received signal X1 and the weight coefficient W1 from the reception station 1101, and receives a signal of a product W2·X2 of the received signal X2 and the weight coefficient W2 from the cooperative station 1201.

A synthesized signal generator 1315 generates a sum Y of the product W1·X1 received from the reception station 1101 and the product W2·X2 received from the cooperative station 1201, i.e., a signal of "Y=W1·X1+W2·X2".

A synthesized signal transmitter 1316 transmits the signal of the sum Y generated by the synthesized signal generator 1315 to the reception station 1101.

Next, a configuration of the reception station 1101 will be described.

A received signal transmitter 1111 in the reception station 1101 transmits the interference signal U and the received signal X1 of the desired signal D received using the antenna 1102 to the control device 1301.

A weight coefficient receiver 1112 in the reception station receives the weight coefficient W1 from the control device 1301.

A multiplier 1113 in the reception station multiplies the weight coefficient W1 received from the control device 1301 by the received signal X1 to obtain (W1·X1).

A product signal transmitter 1114 in the reception station transmits the signal of the product W1·X1 calculated by the multiplier 1113 in the reception station to the control device 1301. A synthesized signal receiver 1115 in the reception station receives the signal of the sum Y (Y=W1·X1+W2·X2) from the control device 1301.

Next, a configuration of the cooperative station 1201 will be described.

A received signal transmitter 1211 in the cooperative station 1201 transmits the interference signal U and the received signal X2 of the desired signal D received using the antenna 1202 to the control device 1301.

A weight coefficient receiver 1212 in the cooperative station receives the weight coefficient W2 from the control device 1301. A multiplier 1213 in the cooperative station multiplies the weight coefficient W2 received from the control device 1301 by the received signal X2 to obtain (W2·X2).

A product signal transmitter 1214 in the cooperative station transmits a signal of the product W2·X2 calculated by the multiplier 1213 in the cooperative station to the control device 1301.

Through this configuration, it is possible to form a directivity pattern having a null in an arrival direction of the interference signal and a high directivity in an arrival direction of the desired signal even when the reception station 1101 is a small reception station device (e.g., mobile phone) having no array antenna. Or, it is possible to form a directivity pattern having the null in the arrival direction of the interference signal. That is, it is possible to achieve an interference suppression effect of the array antenna without affecting the scale of the device.

Second Embodiment

Figure 3:
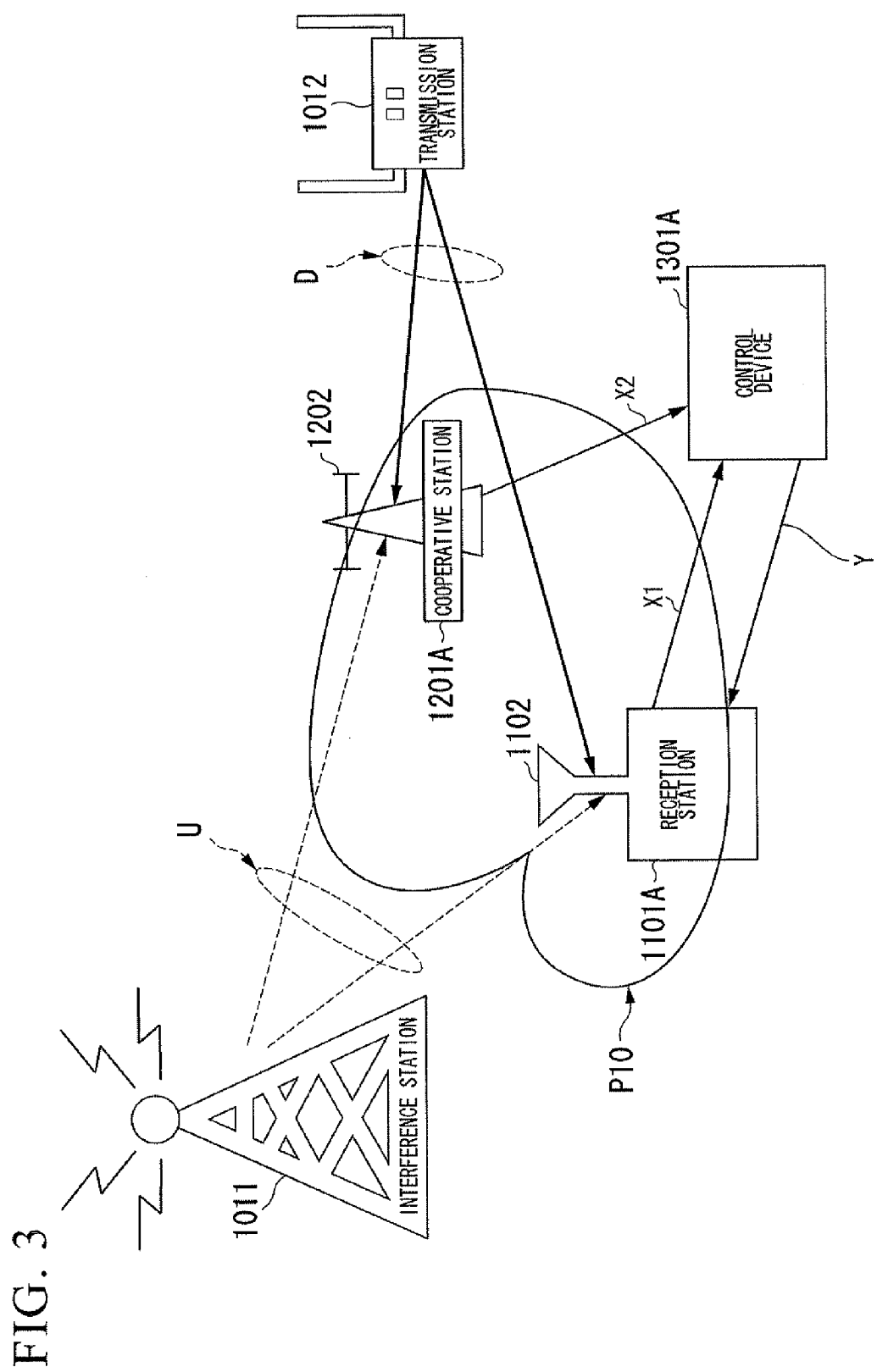
FIG. 3 shows a configuration of a directivity control system according to a second embodiment of the present invention.

FIG. 3 shows an entire configuration of a directivity control system according to a second embodiment of the present invention.

In an example shown in FIG. 3, a reception station 1101A and a cooperative station 1201A, which do not form an array antenna together, are combined to be regarded as one array antenna system, as in the example shown in FIG. 1. A control device 1301A assigns a weight to an array antenna phase from a synthesized signal of a desired signal D and an interference signal U received in the reception station 1101A and the cooperative station 1201A or from the interference signal to form, in the array antenna, a directivity pattern having a null in an arrival direction of the interference signal and a high directivity in an arrival direction of the desired signal. Alternatively, a directivity pattern having the null in the arrival direction of the interference signal is formed in the array antenna.

The configuration example shown in FIG. 3 differs from that of the first embodiment shown in FIG. 1 in that, in FIG. 3, the control device 1301A does not transmit the weight coefficient W1 to the reception station 1101A and the weight coefficient W2 to the cooperative station 1201A. The configuration example shown in FIG. 3 also differs from that of the first embodiment shown in FIG. 1 in that the control device 1301A multiplies the weight coefficient W1 by the received signal X1 and multiplies the weight coefficient W2 by the received signal X2. The configuration example shown in FIG. 3 also differs from that of the first embodiment shown in FIG. 1 in that the reception station 1101A normally transmits the received signal X1 to the control device 1301A (in FIG. 1, normally transmits the product W1·X1) and in that the cooperative station 1201A normally transmits the received signal X2 to the control device 1301A (in FIG. 1, normally transmits the product W2·X2). The other portion of the configuration is the same as in FIG. 1.

Thus, the control device 1301A multiplies the weight coefficient W1 by the received signal X1, and multiplies the weight coefficient W2 by the received signal X2. This makes it unnecessary to transmit the weight coefficient signal from the control device 1301A to the reception station 1101A and the cooperative station 1201A. It is also possible to eliminate the process of multiplying the received signal by the weight coefficient in the reception station 1101A and the cooperative station 1201A, thereby simplifying a process in the reception station 1101A and the cooperative station 1201A.

Figure 4:
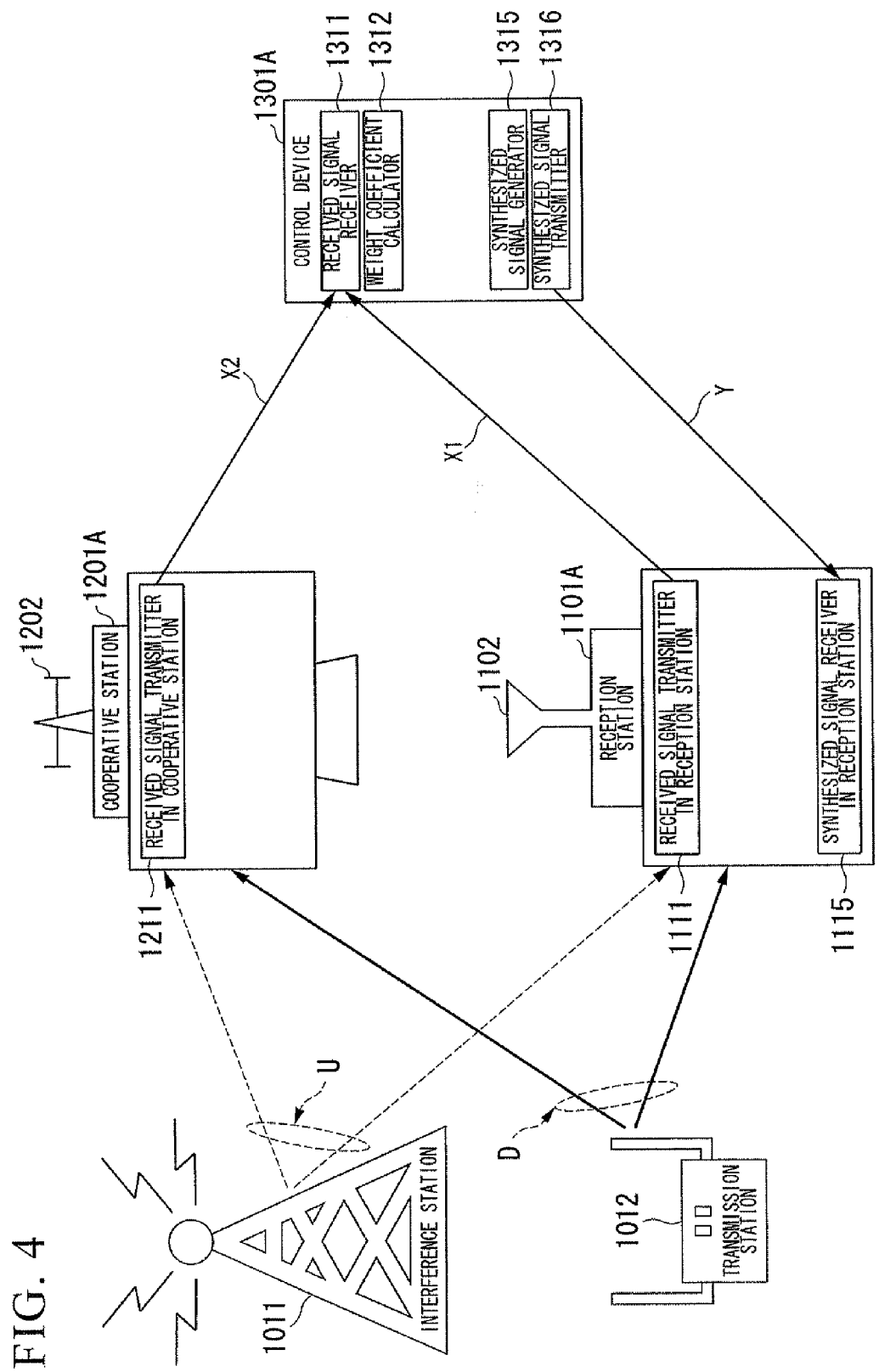
FIG. 4 shows an example of a configuration of each portion in the directivity control system shown in FIG. 3.

FIG. 4 shows an example of a configuration of the reception station 1101A, the cooperative station 1201A, and the control device 1301A in the directivity control system according to the second embodiment of the present invention.

In the configuration example shown in FIG. 4, the weight coefficient transmitter 1313 and the product signal receiver 1314 in the control device 1301 shown in FIG. 2 are omitted, unlike the configuration example of the first embodiment shown in FIG. 2. The weight coefficient receiver 1112, the multiplier 1113, and the product signal transmitter 1114 in the reception station 1101 shown in FIG. 2 are also omitted. The weight coefficient receiver 1212, the multiplier 1213, and the product signal transmitter 1214 in the cooperative station 1201 shown in FIG. 2 are also omitted.

That is, since, in the configuration example shown in FIG. 4, the signals of the weight coefficients W1 and W2 are not transmitted from the control device 1301A to the reception station 1101A and the cooperative station 1201A, and the process of multiplying the received signal by the weight coefficient is not performed in the reception station 1101A and the cooperative station 1201A, related processing units are omitted. The process of multiplying the received signal by the weight coefficient is performed by the synthesized signal generator 1315 in the control device 1301A. The other portion of the configuration is the same as in FIG. 2. Accordingly, like elements are designated by like reference numerals and an overlapping description thereof will be omitted.

Third Embodiment

Figure 5:
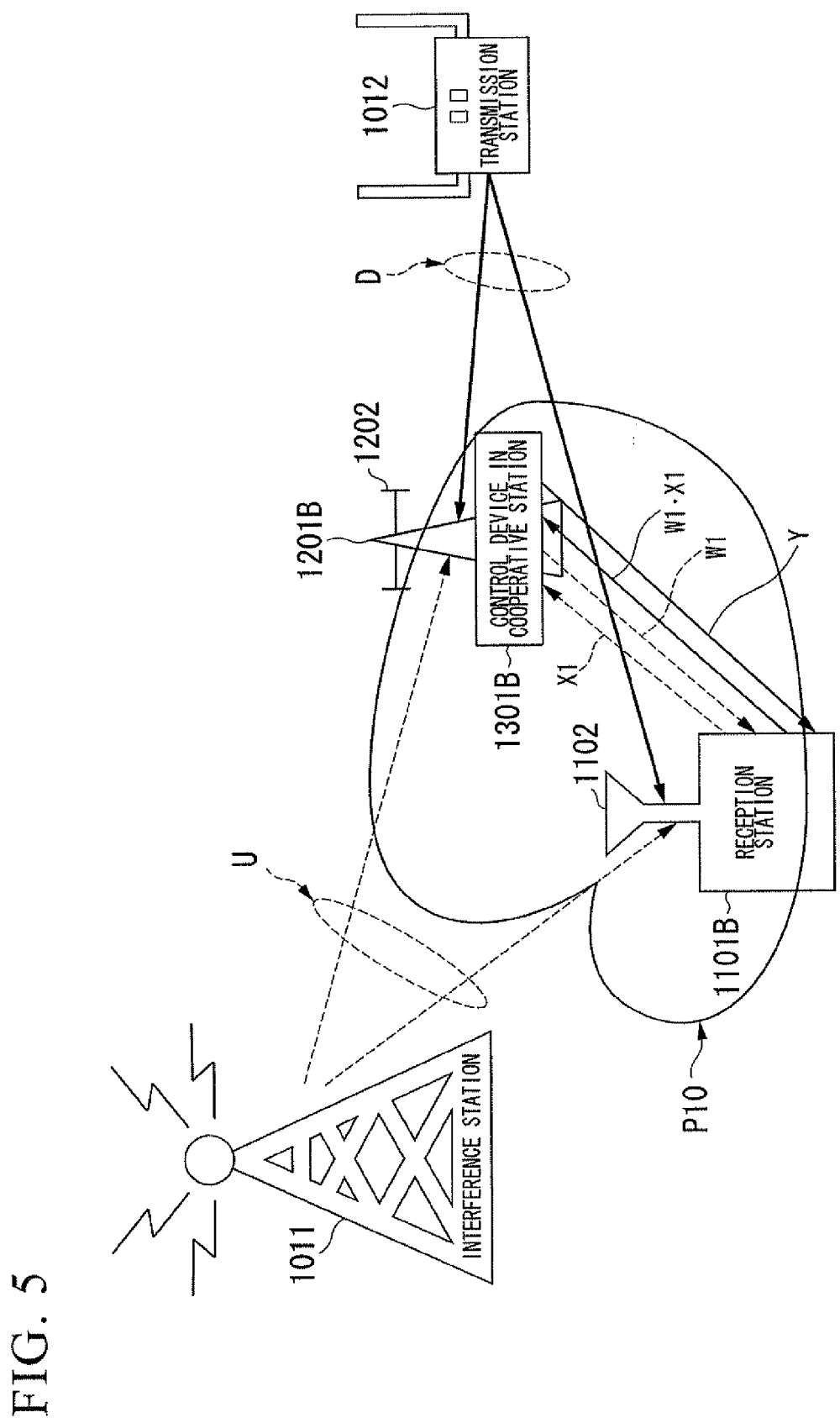
FIG. 5 shows a configuration of a directivity control system according to a third embodiment of the present invention.

FIG. 5 shows an entire configuration of a directivity control system according to a third embodiment of the present invention, in which a plurality of cells/systems share the same frequency at the same time and the same place.

In an example shown in FIG. 5, a reception station 1101B and a cooperative station 1201B, which do not form an array antenna together, are combined to be regarded as one array antenna system. A control device 1301B in the cooperative station 1201B assigns a weight to an array antenna phase from a synthesized signal of a desired signal D and an interference signal U received in the reception station 1101B and the cooperative station 1201B or from the interference signal to form, in the array antenna, a directivity pattern having a null in an arrival direction of the interference signal and a high directivity in an arrival direction of the desired signal. Alternatively, a directivity pattern having the null in the arrival direction of the interference wave is formed in the array antenna.

The control device 1301B in the cooperative station receives a received signal X1, which is received using an antenna 1102 of the reception station 1101B, from the reception station 1101B. Further, in the third embodiment, transmission of the received signal X1 from the reception station 1101B to the control device 1301B in the cooperative station is performed only when a weight coefficient W1 is calculated.

Based on the received signal X2 received using the antenna 1202 of the cooperative station 1201B and the received signal X1 received using the antenna 1102 of the reception station 1101B, the control device 1301B in the cooperative station calculates a weight coefficient W1 for the received signal X1 and a weight coefficient W2 for the received signal X2, for example, using the above-described power inversion adaptive array antenna (PIAA antenna) scheme. The weight coefficients W1 and W2 are calculated so that a directivity pattern of an array antenna formed of the antenna 1102 and the antenna 1202 has a null in an arrival direction of the interference signal and a high directivity in an arrival direction of the desired signal. Alternatively, the weight coefficients W1 and W2 are calculated so that the directivity pattern of the array antenna has the null in the arrival direction of the interference signal.

The control device 1301B in the cooperative station transmits the weight coefficient W1 for the received signal X1 to the reception station 1101B. The reception station 1101B multiplies the weight coefficient W1 received from the control device 1301B in the cooperative station by the received signal X1 to obtain (W1·X1), and transmits a signal of the product W1·X1 to the control device 1301B in the cooperative station.

The control device 1301B in the cooperative station calculates a product W2·X2 of the received signal X2 received using the antenna 1202 of the cooperative station and the weight coefficient W2. The control device 1301B obtains a sum Y (Y=W1·X1+W2·X2) based on the product W2·X2 and the product W1·X1 received from the reception station 1101B.

The control device 1301B in the cooperative station transmits a signal of the sum Y to the reception station 1101B.

The reception station 1101B takes the signal of the sum Y (Y=W1·X1+W2·X2) received from the control device 1301B in the cooperative station as a received signal.

Thus, the reception station 1101B having no array antenna can be combined with the antenna of the peripheral cooperative station 1201B to form one array antenna, making it possible to form, in the array antenna, a directivity pattern having a null in an arrival direction of the interference signal and a high directivity in the arrival direction of the desired signal. It is also possible to form, in the array antenna, a directivity pattern having the null in the arrival direction of the interference signal. Accordingly, even when the reception station 1101B is a small reception station device (e.g., mobile phone) having no array antenna, it is possible to achieve an interference suppression effect of the array antenna without affecting the scale of the device. A directivity pattern of the array antenna formed upon signal reception in the reception station 1101B may be used even upon signal transmission in the reception station 1101B.

Further, it is unnecessary to separately provide a control device, as in the first and second embodiments, and it is possible to calculate the weight coefficients W1 and W2 and generate the signal of the sum Y (Y=W1·X1+W2·X2) using the cooperative station 1201B.

An algorithm for obtaining the weight coefficients in the control device 1301B in the cooperative station is not limited to the above-described power inversion adaptive array antenna (PIAA antenna) scheme.

For example, any algorithm, including zero forcing (ZF) and minimum mean square error (MMSE), is available as a control algorithm. Further, any control index, including reception power, reception SI, reception error rate, and so on, is available as a control index.

Figure 6:
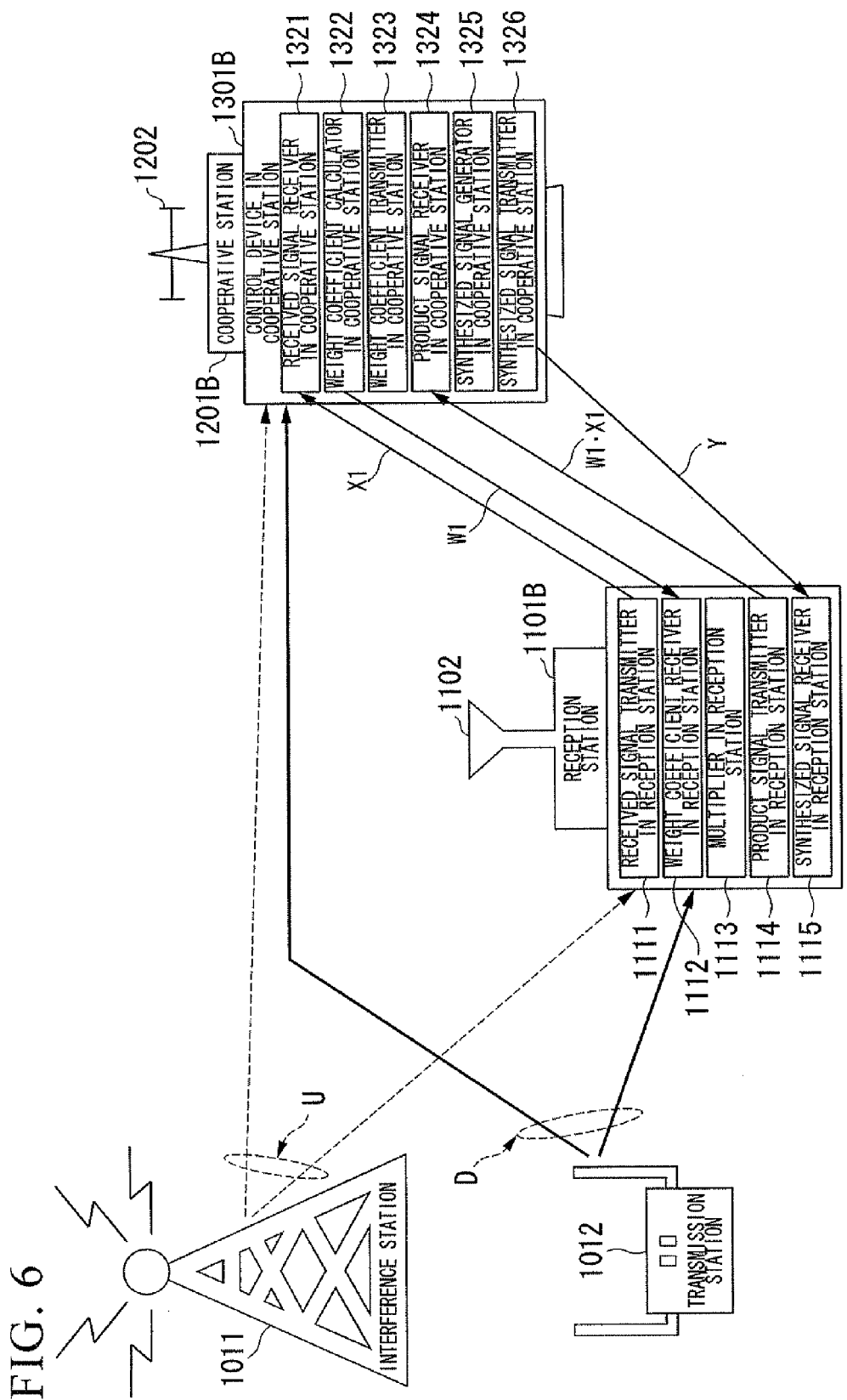
FIG. 6 shows an example of a configuration of each portion in the directivity control system shown in FIG. 5.

FIG. 6 shows an example of a configuration of the reception station 1101B, the cooperative station 1201B, and the control device 1301B in the cooperative station in the directivity control system according to the third embodiment of the present invention.

First, a configuration of the cooperative station 1201B will be described.

The cooperative station 1201B receives the interference signal U and the desired signal D as the received signal X2 using the antenna 1202. Further, the cooperative station 1201B includes the control device 1301B.

A received signal receiver 1321 of the control device 1301B in the cooperative station receives the received signal X1, which is received using the antenna 1102 of the reception station 1101B, from the reception station 1101B.

Based on the received signal X1 received by the received signal receiver 1321 in the cooperative station and the received signal X2 received using the antenna 1202, a weight coefficient calculator 1322 in the cooperative station calculates a weight coefficient W1 of the received signal X1 and a weight coefficient W2 of the received signal X2 so that a directivity pattern of an array antenna formed of the antenna 1102 and the antenna 1202 has a null in an arrival direction of the interference signal and a high directivity in an arrival direction of the desired signal. Alternatively, the weight coefficient calculator 1322 calculates the weight coefficient W1 of the received signal X1 and the weight coefficient W2 of the received signal X2 so that the directivity pattern of the array antenna has the null in the arrival direction of the interference signal.

A weight coefficient transmitter 1323 in the cooperative station transmits the weight coefficient W1 calculated by the weight coefficient calculator 1322 in the cooperative station to the reception station 1101B.

A product signal receiver 1324 in the cooperative station receives the signal of the product W1·X1 of the received signal X1 and the weight coefficient W1 from the reception station 1101B.

A synthesized signal generator 1325 in the cooperative station calculates a product W2·X2 of the received signal X2 received using the antenna 1202 and the weight coefficient W2, and generates a signal of a sum Y (Y=W1·X1+W2·X2) of the product W2·X2 and the product W1·X1 received from the reception station 1101B.

A synthesized signal transmitter 1326 in the cooperative station transmits the signal of the sum Y generated by the synthesized signal generator 1325 in the cooperative station to the reception station 1101B.

The reception station 1101B has the same configuration as the reception station 1101 shown in FIG. 2, except that the control device 1301, which is a communication destination of the reception station 1101 shown in FIG. 2, is replaced with the control device 1301B in the cooperative station shown in FIG. 6. Accordingly, like elements are designated by like reference numerals and an overlapping description thereof will be omitted.

Fourth Embodiment

Figure 7:
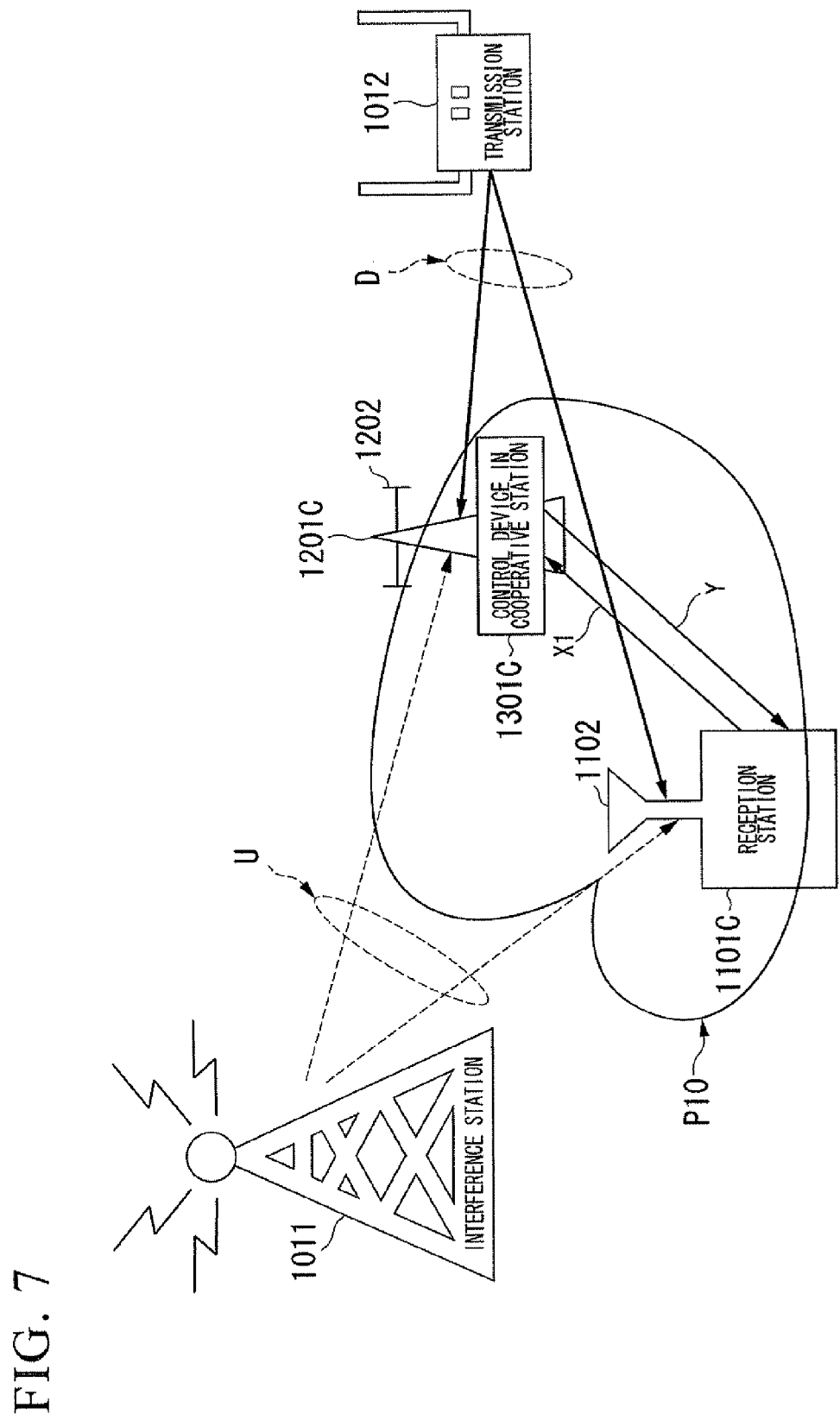
FIG. 7 shows a configuration of a directivity control system according to a fourth embodiment of the present invention.

FIG. 7 shows an entire configuration of a directivity control system according to a fourth embodiment of the present invention.

In an example shown in FIG. 7, a reception station 1101C and a cooperative station 1201C, which do not form an array antenna together, are combined to be regarded as one array antenna system, as in the example shown in FIG. 5. A control device 1301C in the cooperative station assigns a weight to an array antenna phase from a synthesized signal of a desired signal D and an interference signal U received in the reception station 1101C and the cooperative station 1201C or from the interference signal to form, in the array antenna, a directivity pattern having a null in an arrival direction of the interference signal and a high directivity in an arrival direction of the desired signal. Alternatively, a directivity pattern having the null in the arrival direction of the interference signal is formed in the array antenna.

The configuration example shown in FIG. 7 differs from that of the third embodiment shown in FIG. 5 in that the control device 1301C in a cooperative station in FIG. 7 does not transmit the weight coefficient W1 to the reception station 1101C. The configuration example shown in FIG. 7 also differs from that of the third embodiment shown in FIG. 5 in that the control device 1301C in the cooperative station multiplies the weight coefficient W1 by a received signal X1. The configuration example shown in FIG. 7 also differs from that of the third embodiment shown in FIG. 5 in that the reception station 1101C normally transmits the received signal X1 to the control device 1301C in the cooperative station (in FIG. 5, normally transmits the product W1·X1). The other portions of the configuration are the same as in FIG. 5.

Thus, the control device 1301C in the cooperative station multiplies the weight coefficient W1 by the received signal X1, making it possible to omit the process of transmitting the signal of the weight coefficient W1 from the control device 1301C in the cooperative station to the reception station 1101C and eliminate the process of multiplying the received signal X1 by the weight coefficient W1 in the reception station 1101C, thereby simplifying a process in the reception station 1101C.

Figure 8:
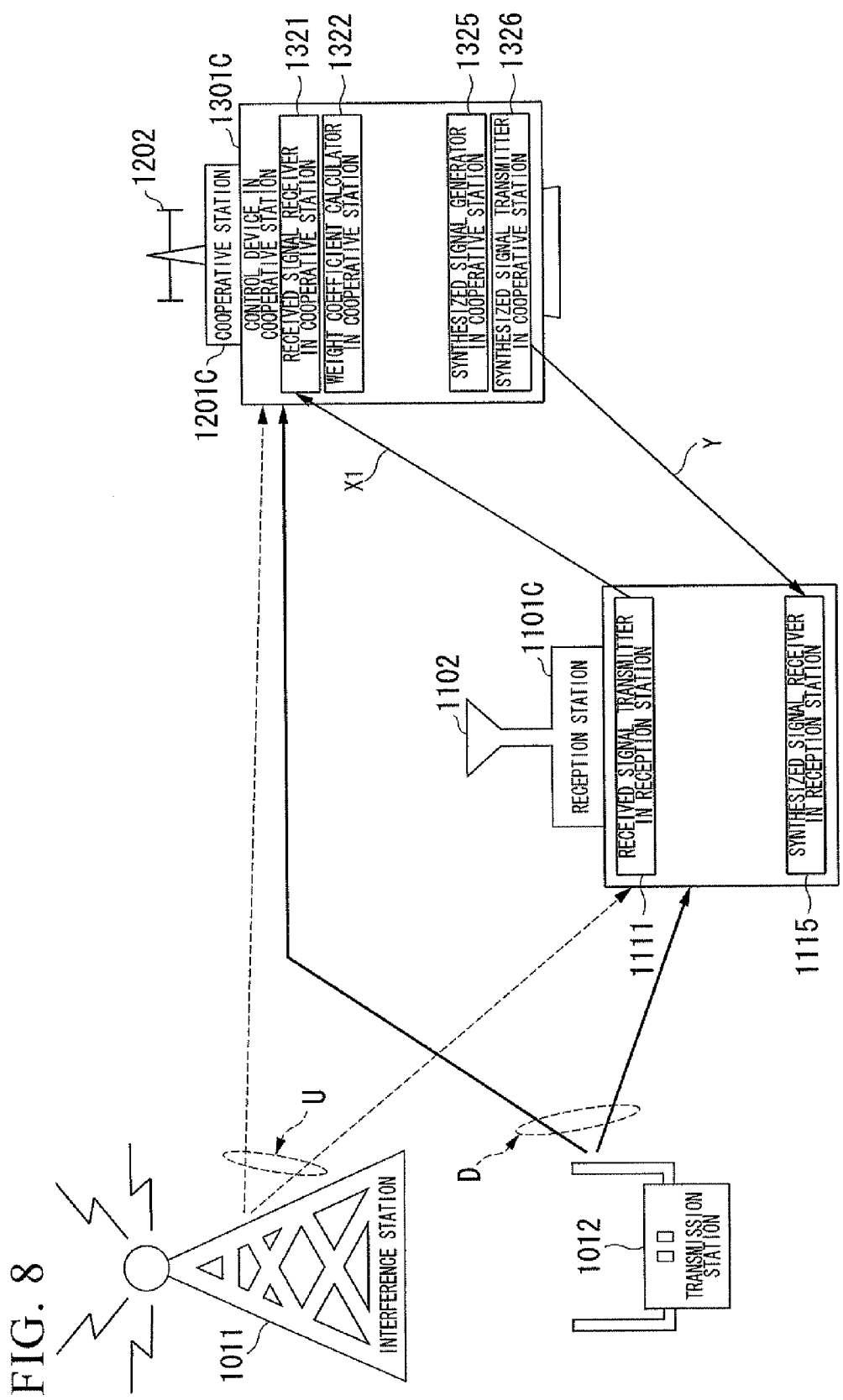
FIG. 8 shows an example of a configuration of each portion in the directivity control system shown in FIG. 7.

FIG. 8 shows an example of a configuration of the reception station 1101C, the cooperative station 1201C and the control device 1301C in the cooperative station 1201C in the directivity control system according to the fourth embodiment of the present invention.

In the configuration example shown in FIG. 8, the weight coefficient transmitter 1323 and the product signal receiver 1324 of the control device 1301B in the cooperative station shown in FIG. 6 are omitted, unlike the configuration example of the third embodiment shown in FIG. 6. The weight coefficient receiver 1112, the multiplier 1113, and the product signal transmitter 1114 in the reception station 1101B shown in FIG. 6 are also omitted.

That is, since, in the configuration example shown in FIG. 8, the signal of the weight coefficient W1 is not transmitted from the control device 1301C in the cooperative station to the reception station 1101C, and the process of multiplying the weight coefficient W1 by the received signal X1 is not performed in the reception station 1101C, related processing units are omitted. The process of multiplying the weight coefficient W1 by the received signal X1 is performed by the synthesized signal generator 1325 of the control device 1301C in the cooperative station. The other portions of the configuration are the same as in FIG. 6.

Fifth Embodiment

Figure 9:
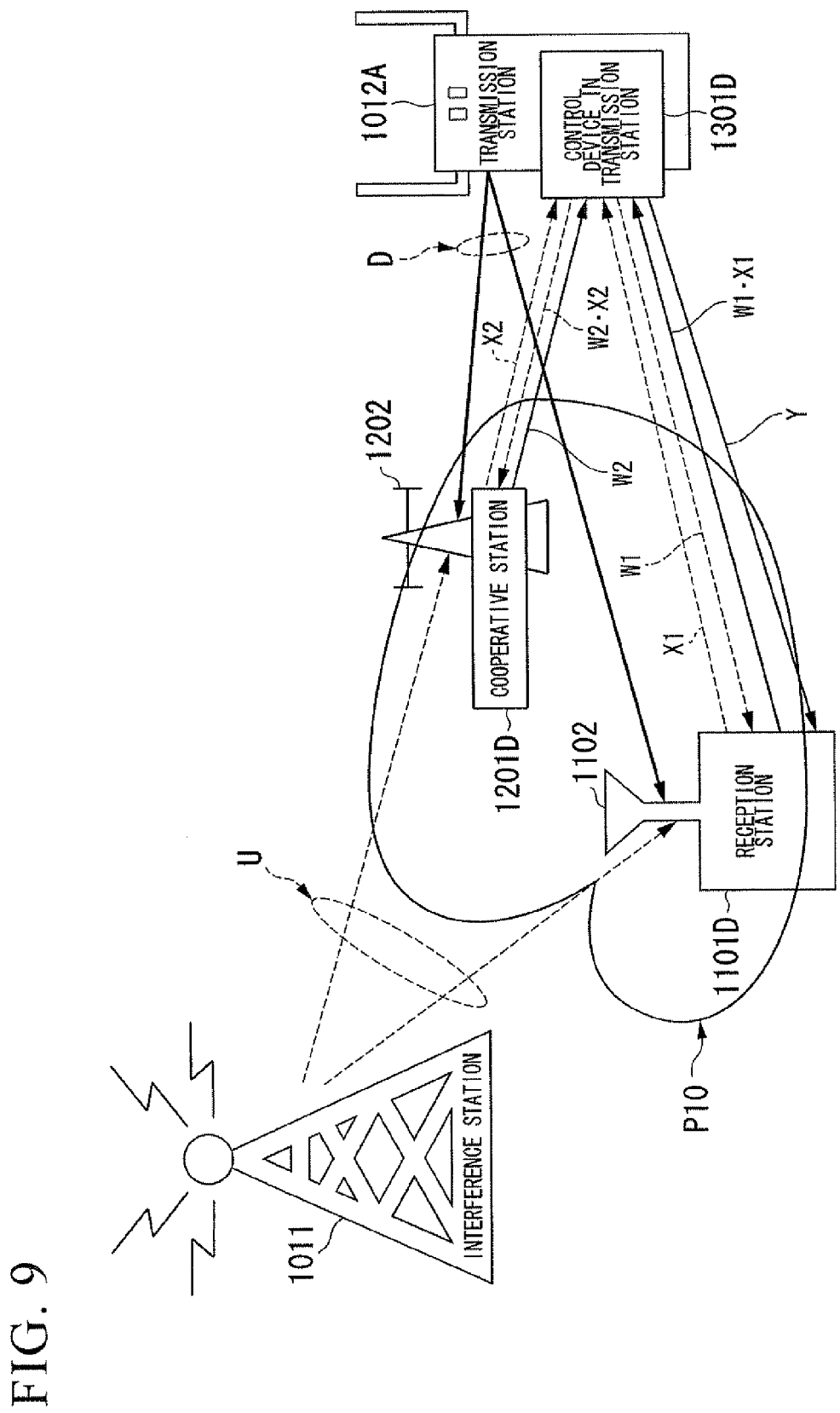
FIG. 9 shows a configuration of a directivity control system according to a fifth embodiment of the present invention.

FIG. 9 shows an entire configuration of a directivity control system according to a fifth embodiment of the present invention, in which a plurality of cells/systems share the same frequency at the same time and the same place.

In the example shown in FIG. 9, a reception station 1101D and a cooperative station 1201D, which do not form an array antenna together, are combined to be regarded as one array antenna system. A control device 1301D in a transmission station 1012A assigns a weight to an array antenna phase from a synthesized signal of a desired signal D and an interference signal U received in the reception station 1101D and the cooperative station 1201D or from the interference signal to form, in the array antenna, a directivity pattern having a null in an arrival direction of the interference signal and a high directivity in an arrival direction of the desired signal. Alternatively, a directivity pattern having a null in an arrival direction of the interference signal is formed in the array antenna.

In FIG. 9, the reception station 1101D receives a desired signal D and an interference signal U using an antenna 1102. The received signal X1 received using the antenna 1102 is transmitted to the control device 1301D in the transmission station. Further, the cooperative station 1201D receives the desired signal D and the interference signal U using an antenna 1202. The received signal X2 received using the antenna 1202 is transmitted to the control device 1301D in the transmission station. In the fifth embodiment, transmission of the received signal X1 from the reception station 1101D to the control device 1301D in the transmission station and transmission of the received signal X2 from the cooperative station 1201D to the control device 1301D in the transmission station are performed only when the weight coefficients are calculated.

Based on the received signal X2 received using the antenna 1202 of the cooperative station 1201D and the received signal X1 received using the antenna 1102 of the reception station 1101D, the control device 1301D in the transmission station calculates a weight coefficient W1 for the received signal X1 and a weight coefficient W2 for the received signal X2, for example, using the above-described power inversion adaptive array antenna (PIAA antenna) scheme. The weight coefficients W1 and W2 are calculated so that a directivity pattern of an array antenna formed of the antenna 1102 and the antenna 1202 has a null in an arrival direction of the interference signal and a high directivity in an arrival direction of the desired signal. Alternatively, the weight coefficients W1 and W2 are calculated so that the directivity pattern of the array antenna has the null in the arrival direction of the interference signal.

The control device 1301D in the transmission station transmits the weight coefficient W1 for the received signal X1 to the reception station 1101D and the weight coefficient W2 for the received signal X2 to the cooperative station 1201D.

The reception station 1101D multiplies the weight coefficient W1 received from the control device 1301D in the transmission station by the received signal X1 to obtain (W1·X1) and transmits a signal of the product W1·X1 to the control device 1301D in the transmission station. Meanwhile, the cooperative station 1201D multiplies the weight coefficient W2 received from the control device 1301D in the transmission station by the received signal X2 to obtain (W2·X2) and transmits a signal of the product W2·X2 to the control device 1301D in the transmission station.

The control device 1301D in the transmission station obtains a sum Y (Y=W1·X1+W2·X2) based on the signal of the product W1·X1 received from the reception station 1101D and the signal of the product W2·X2 received from the cooperative station 1201D.

The control device 1301D in the transmission station transmits a signal of the sum Y to the reception station 1101D.

The reception station 1101D takes the signal of the sum Y (Y=W1·X1+W2·X2) received from the control device 1301D in the transmission station, as the received signal.

Thus, the reception station 1101D having no array antenna can be combined with the antenna of the peripheral cooperative station 1201D to form one array antenna, making it possible to form, in the array antenna, a directivity pattern having a null in an arrival direction of the interference signal and a high directivity in an arrival direction of the desired signal. It is also possible to form, in the array antenna, a directivity pattern having the null in the arrival direction of the interference signal. Accordingly, even when the reception station 1101D is a small reception station device (e.g., mobile phone) having no array antenna, it is possible to achieve an interference suppression effect of the array antenna without affecting the scale of the device. Further, a directivity pattern of the array antenna formed upon signal reception in the reception station 1101D may be used even upon signal transmission in the reception station 1101D.

Further, it is unnecessary to separately provide the control device, as in the first and second embodiments, and it is possible to calculate the weight coefficients W1 and W2 and generate the signal of the sum Y (Y=W1·X1+W2·X2) using the transmission station 1012A.

An algorithm for obtaining the weight coefficients in the control device 1301D in the transmission station is not limited to the above-described power inversion adaptive array antenna (PIAA antenna) scheme.

For example, any algorithm, including zero forcing (ZF) and minimum mean square error (MMSE), is available as a control algorithm. Further, any control index, including reception power, reception SI, reception error rate, and so on, is available as a control index.

Figure 10:
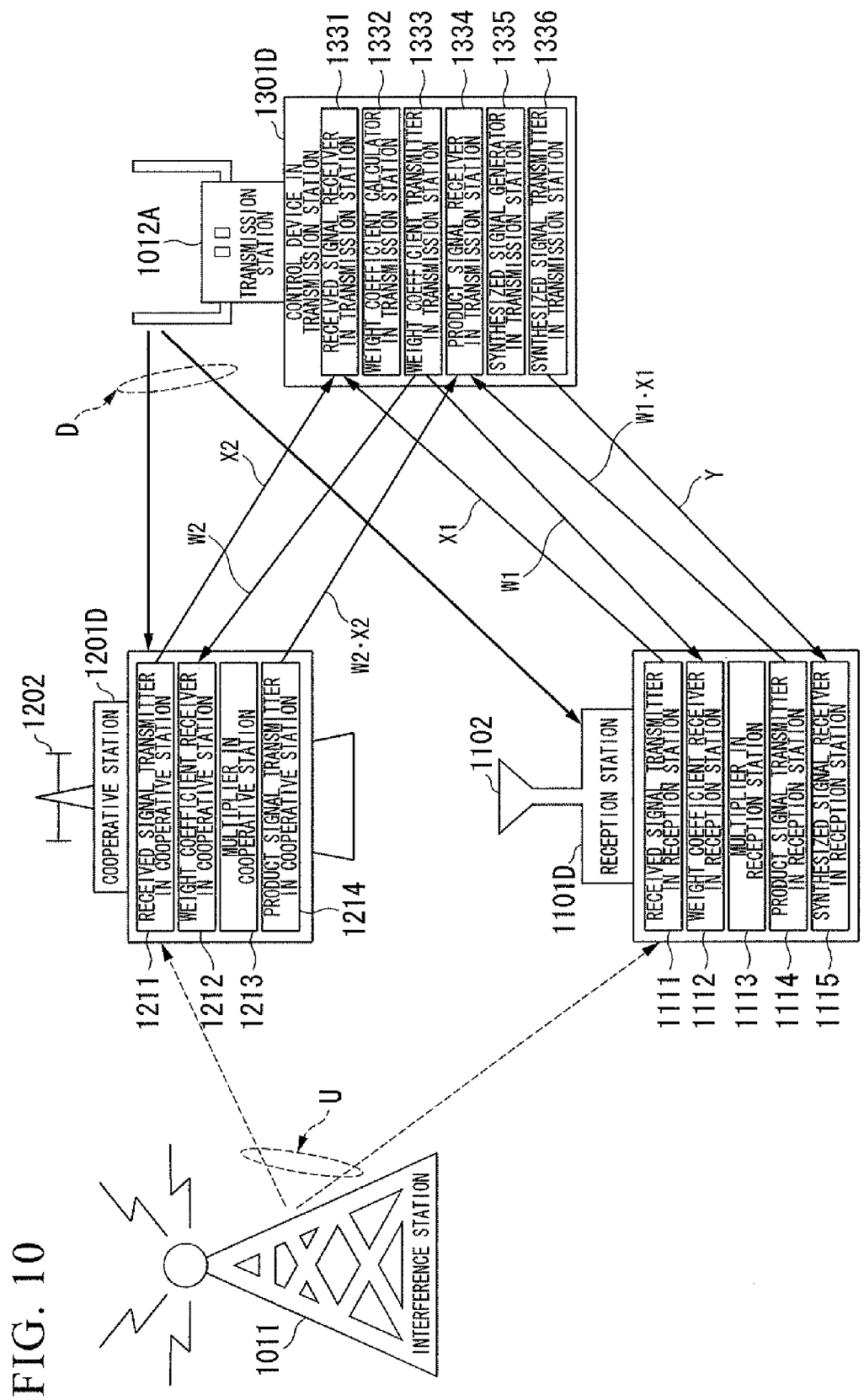
FIG. 10 shows an example of a configuration of each portion in the directivity control system shown in FIG. 9.

FIG. 10 shows an example of a configuration of the reception station 1101D, the cooperative station 1201D, and the control device 1301D in the transmission station in the directivity control system according to the fifth embodiment of the present invention.

First, a configuration of the control device 1301D in the transmission station 1012A will be described.

A received signal receiver 1331 of the control device 1301D in the transmission station receives the received signal X1, which is received using the antenna 1102 of the reception station 1101D, from the reception station 1101D and receives the received signal X2, which is received using the antenna 1202 of the cooperative station 1201D, from the cooperative station 1201D. Transmission of the received signal X1 from the reception station 1101D to the control device 1301D in the transmission station and transmission of the received signal X2 from the cooperative station 1201D to the control device 1301D in the transmission station are performed only when the weight coefficients are calculated.

Based on the received signals X1 and X2 received by the received signal receiver 1331 in the transmission station, a weight coefficient calculator 1332 in the transmission station calculates the weight coefficient W1 of the received signal X1 and the weight coefficient W2 of the received signal X2 so that a directivity pattern of an array antenna formed of the antenna 1102 and the antenna 1202 has a null in an arrival direction of the interference signal and a high directivity in an arrival direction of the desired signal. Alternatively, the weight coefficient calculator 1332 in the transmission station calculates the weight coefficient W1 of the received signal X1 and the weight coefficient W2 of the received signal X2 so that the directivity pattern of the array antenna has a null in an arrival direction of the interference signal.

A weight coefficient transmitter 1333 in the transmission station transmits the weight coefficient W1 calculated by the weight coefficient calculator 1332 in the transmission station to the reception station 1101D and transmits the weight coefficient W2 to the cooperative station 1201D.

A product signal receiver 1334 in the transmission station receives the signal of the product W1·X1 of the received signal X1 and the weight coefficient W1 from the reception station 1101D, and receives the signal of the product W2·X2 of the received signal X2 and the weight coefficient W2 from the cooperative station 1201D.

A synthesized signal generator 1335 in the transmission station generates a signal of a sum Y (Y=W1·X1+W2·X2) of the product W1·X1 received from the reception station 1101D and the product W2·X2 received from the cooperative station 1201D.

A synthesized signal transmitter 1336 in the transmission station transmits the signal of the sum Y generated by the synthesized signal generator 1335 in the transmission station to the reception station 1101D.

The reception station 1101D has the same configuration as the reception station 1101 in the first embodiment shown in FIG. 2, and the fifth embodiment differs from the first embodiment in that the control device 1301, which is a communication destination of the reception station 1101 shown in FIG. 2, is replaced with the control device 1301D in the transmission station shown in FIG. 10. Similarly, the cooperative station 1201D has the same configuration as the cooperative station 1201 shown in FIG. 2, and the fifth embodiment differs from the first embodiment in that the control device 1301, which is a communication destination of the cooperative station 1201 shown in FIG. 2, is replaced with the control device 1301D in the transmission station shown in FIG. 10. Accordingly, like elements are designated by like reference numerals and an overlapping description thereof will be omitted.

Sixth Embodiment

Figure 11:
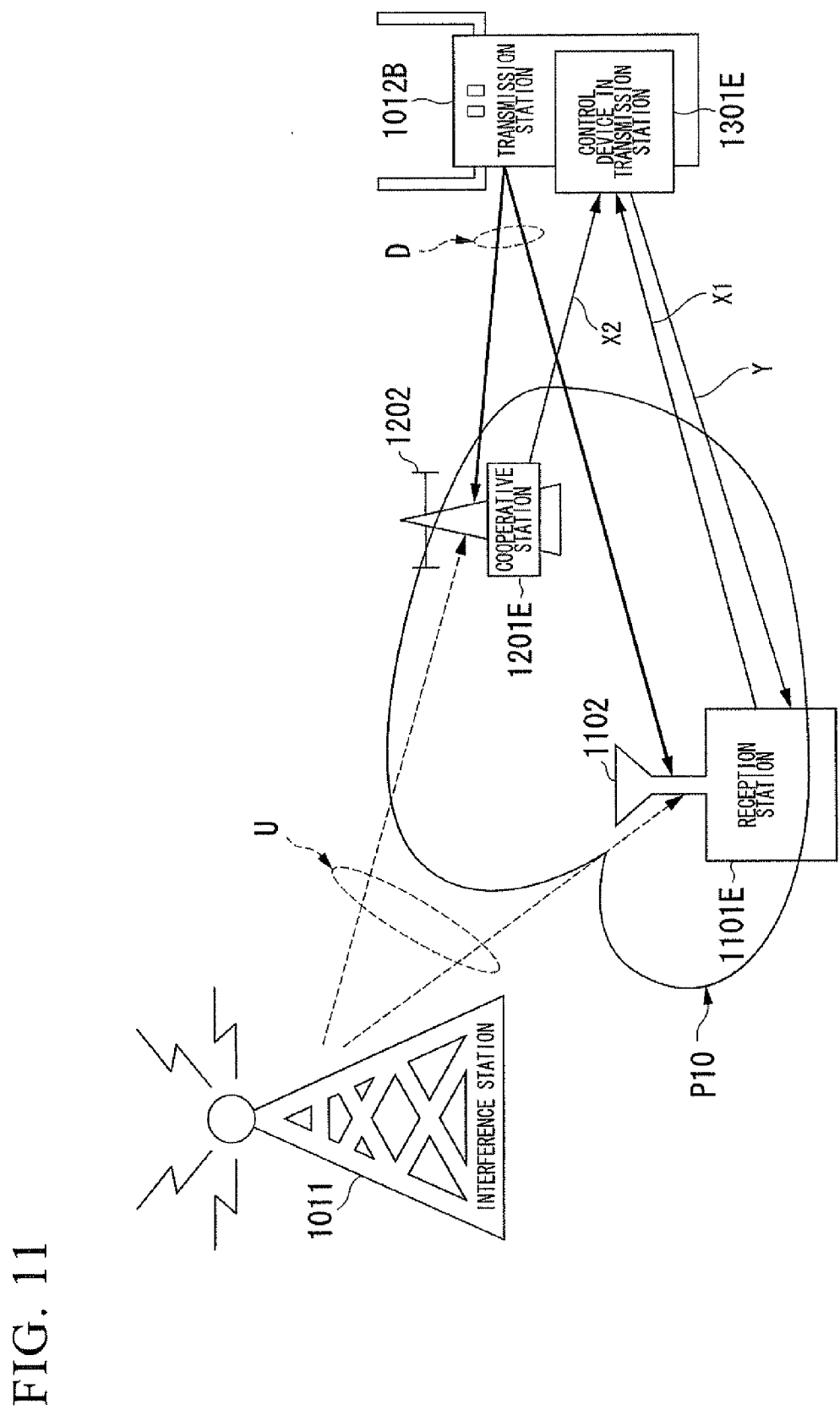
FIG. 11 shows a configuration of a directivity control system according to a sixth embodiment of the present invention.

FIG. 11 shows an entire configuration of a directivity control system according to a sixth embodiment of the present invention.

In the example shown in FIG. 11, a reception station 1101E and a cooperative station 1201E, which do not form an array antenna together, are combined to be regarded as one array antenna system, as in the example shown in FIG. 9. The control device 1301E in the transmission station 1012B assigns a weight to an array antenna phase from a synthesized signal of a desired signal D and an interference signal U received in the reception station 1101E and the cooperative station 1201E or from the interference signal to form, in the array antenna, a directivity pattern having a null in an arrival direction of the interference signal and a high directivity in an arrival direction of the desired signal. Alternatively, a directivity pattern having the null in the arrival direction of the interference signal is formed in the array antenna.

The configuration example shown in FIG. 11 differs from that of the fifth embodiment shown in FIG. 9 in that the control device 1301E in the transmission station in FIG. 11 does not transmit the weight coefficient W1 to the reception station 1101E and the control device 1301E in the transmission station does not transmit the weight coefficient W2 to the cooperative station 1201E.

The configuration example shown in FIG. 11 also differs from that of the fifth embodiment shown in FIG. 9 in that the control device 1301E in the transmission station multiplies the weight coefficient W1 by the received signal X1 and multiplies the weight coefficient W2 by the received signal X2. The configuration example shown in FIG. 11 also differs from that of the fifth embodiment shown in FIG. 9 in that the reception station 1101E normally transmits the received signal X1 to the control device 1301E in the transmission station (in FIG. 9, normally transmits the product W1·X1), and in that the cooperative station 1201E normally transmits the received signal X2 to the control device 1301E in the transmission station (in FIG. 9, normally transmits the product W2·X2). The other portions of the configuration are the same as in FIG. 9.

Thus, the control device 1301E in the transmission station multiplies the weight coefficient W1 by the received signal X1 and multiplies the weight coefficient W2 by the received signal X2, making it possible to omit the process of transmitting the signals of the weight coefficients W1 and W2 from the control device 1301E in the transmission station to the reception station 1101E and the cooperative station 1201E. It is also possible to eliminate the process of multiplying the received signal by the weight coefficient in the reception station 1101E and the cooperative station 1201E, thereby simplifying a process in the reception station 1101E and the cooperative station 1201E.

Figure 12:
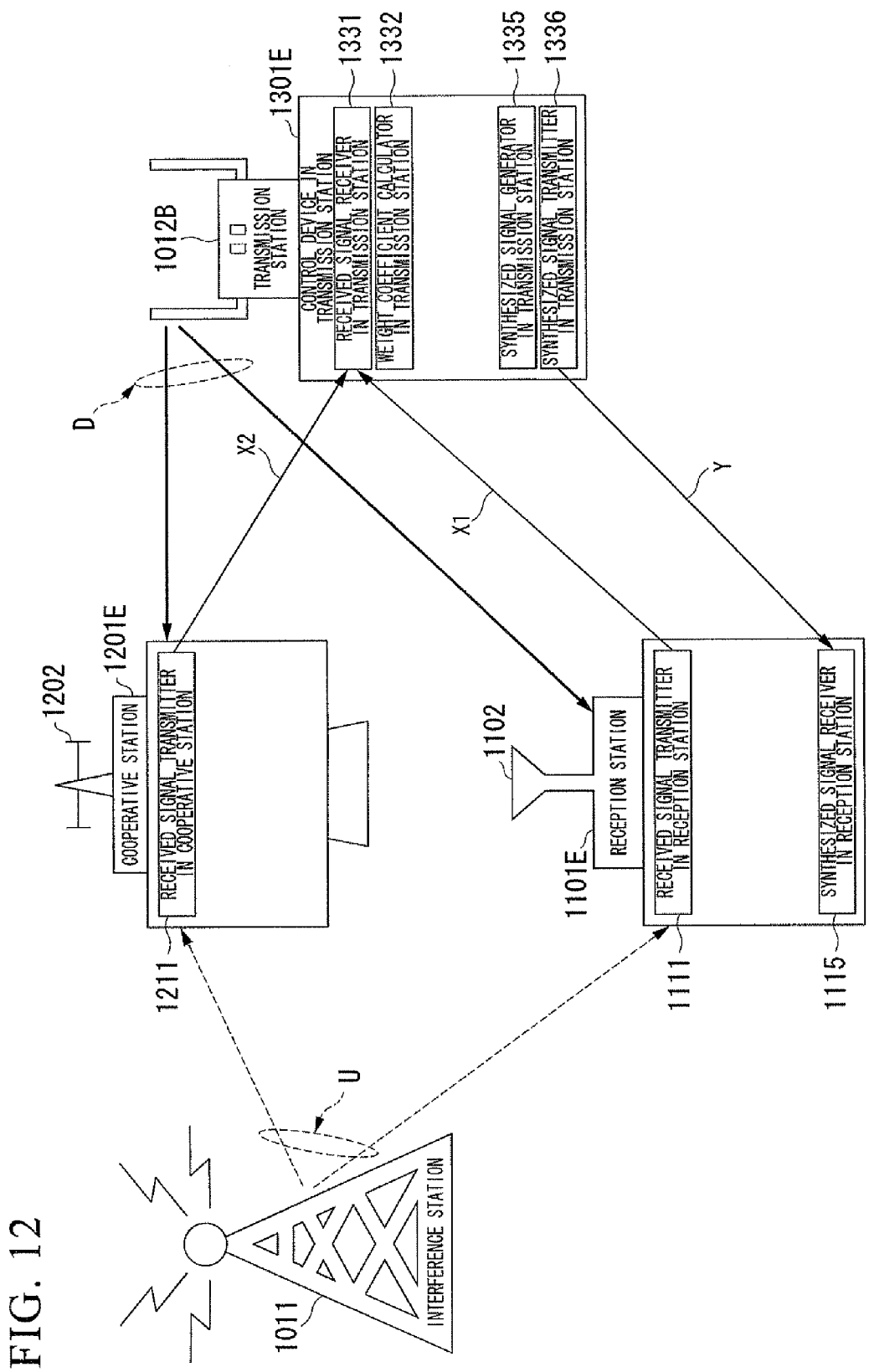
FIG. 12 shows an example of a configuration of each portion in the directivity control system shown in FIG. 11.

FIG. 12 shows an example of a configuration of the reception station 1101E, the cooperative station 1201E, and the control device 1301E in the transmission station in the directivity control system according to the sixth embodiment of the present invention.

In the configuration example shown in FIG. 12, the weight coefficient transmitter 1333 and the product signal receiver 1334 of the control device 1301D in the transmission station shown in FIG. 10 are omitted, unlike the configuration example of the fifth embodiment shown in FIG. 10. The weight coefficient receiver 1112, the multiplier 1113, and the product signal transmitter 1114 in the reception station 1101D shown in FIG. 10 are also omitted. The weight coefficient receiver 1212, the multiplier 1213 and the product signal transmitter 1214 in the cooperative station 1201D shown in FIG. 10 are also omitted.

That is since, in the configuration example shown in FIG. 12, the weight coefficient signal is not transmitted from the control device 1301E in the transmission station to the reception station 1101E and the cooperative station 1201E, and the process of multiplying the received signal by the weight coefficient is not performed in the reception station 1101E and the cooperative station 1201E, related processing units are omitted. Further, the process of multiplying the received signal by the weight coefficient is performed in the synthesized signal generator 1335 of the control device 1301E in the transmission station. The other portions of the configuration are the same as shown in FIG. 10.

Seventh Embodiment

Figure 13:
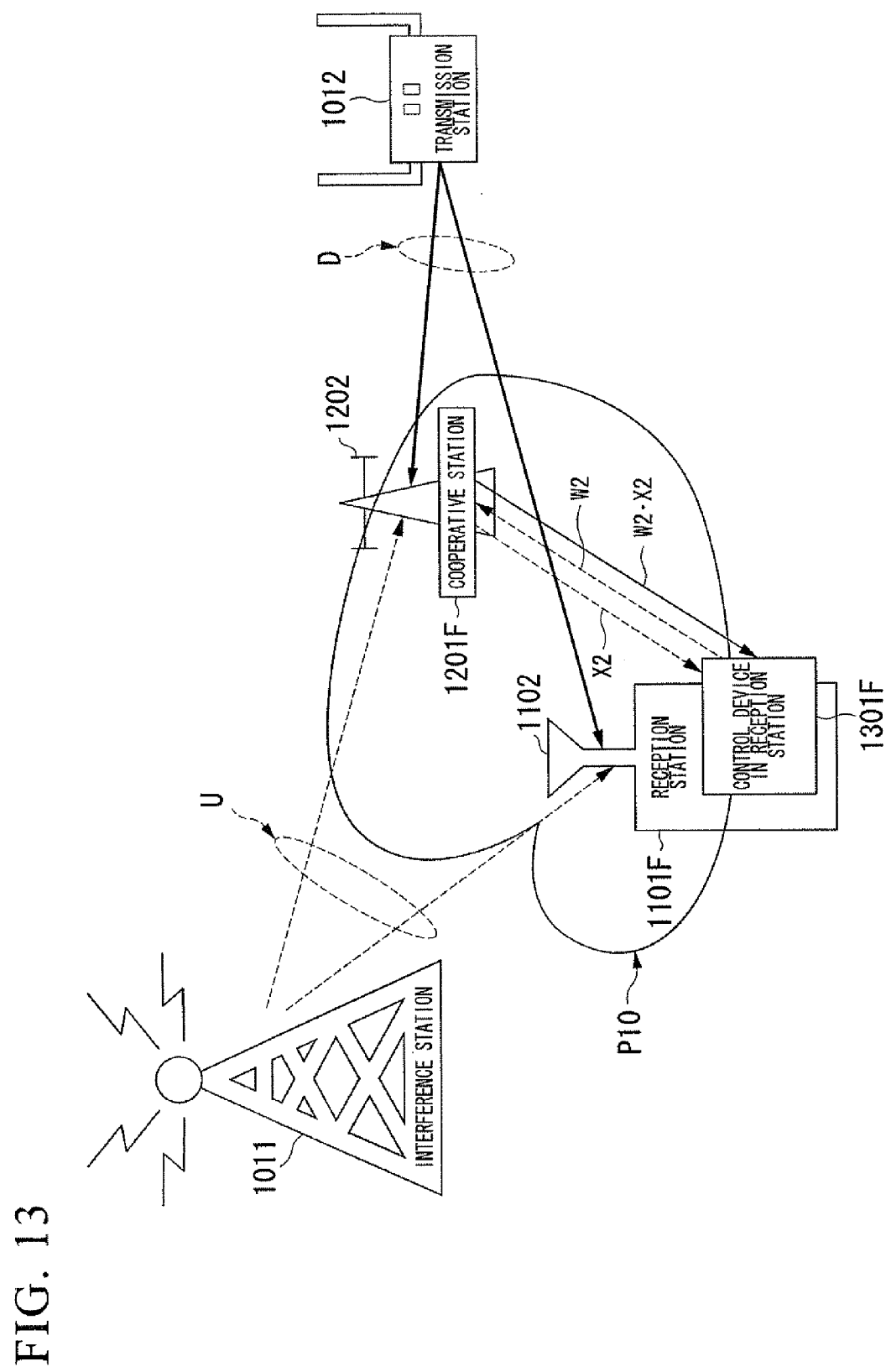
FIG. 13 shows a configuration of a directivity control system according to a seventh embodiment of the present invention.

FIG. 13 shows an entire configuration of a directivity control system according to a seventh embodiment of the present invention, in which a plurality of cells/systems share the same frequency at the same time and the same place.

In an example shown in FIG. 13, a reception station 1101F and a cooperative station 1201F, which do not form an array antenna together, are combined to be regarded as one array antenna system. A control device 1301F in the reception station 1101F assigns a weight to an array antenna phase from a synthesized signal of a desired signal D and an interference signal U received in the reception station 1101F and the cooperative station 1201F or from the interference signal to form, in the array antenna, a directivity pattern having a null in an arrival direction of the interference signal and a high directivity in an arrival direction of the desired signal. Alternatively, a directivity pattern having the null in the arrival direction of the interference signal is formed in the array antenna.

In FIG. 13, the cooperative station 1201F receives the desired signal D and the interference signal U using an antenna 1202. The received signal X2 received using the antenna 1202 is transmitted to the control device 1301F in the reception station. In the seventh embodiment, transmission of the received signal X2 from the cooperative station 1201F to the control device 1301F in the reception station is performed only when the weight coefficients are calculated.

Based on the received signal X2 received using the antenna 1202 of the cooperative station 1201F and the received signal X1 received using the antenna 1102 of the reception station 1101F, the control device 1301F in the reception station calculates a weight coefficient W1 for the received signal X1 and a weight coefficient W2 for the received signal X2, for example, using the above-described power inversion adaptive array antenna (PIAA antenna) scheme. The weight coefficients W1 and W2 are calculated so that a directivity pattern of an array antenna formed of the antenna 1102 and the antenna 1202 has a null in an arrival direction of the interference signal and a high directivity in an arrival direction of the desired signal. Alternatively, the weight coefficients W1 and W2 are calculated so that the directivity pattern of the array antenna has the null in the arrival direction of the interference signal.

The control device 1301F in the reception station transmits the weight coefficient W2 for the received signal X2 to the cooperative station 1201F. The cooperative station 1201F multiplies the weight coefficient W2 received from the control device 1301F in the reception station by the received signal X2 to obtain (W2·X2), and transmits a signal of the product W2·X2 to the control device 1301F in the reception station.

The control device 1301F in the reception station calculates a product W1·X1 of the received signal X1 received using the antenna 1102 and the weight coefficient W1, and obtains a sum Y (Y=W1·X1+W2·X2) based on the product W1·X1 and the signal of the product W2·X2 received from the cooperative station 1201F.

The reception station 1101F takes the signal of the sum Y (Y=W1·X1+W2·X2) as a received signal.

Thus, the reception station 1101F having no array antenna can be combined with the antenna of the peripheral cooperative station 1201F to form one array antenna, making it possible to form, in the array antenna, a directivity pattern having a null in an arrival direction of the interference signal and a high directivity in an arrival direction of the desired signal. It is also possible to form, in the array antenna, a directivity pattern having the null in the arrival direction of the interference signal. Accordingly, even when the reception station 1101F is a small reception station device (e.g., mobile phone) having no array antenna, it is possible to achieve an interference suppression effect of the array antenna without affecting the scale of the device. A directivity pattern of the array antenna upon signal reception in the reception station 1101F may be used even upon signal transmission in the reception station 1101F.

Further, it is unnecessary to separately provide a control device, as in the first and second embodiments, and the reception station itself can calculate the weight coefficients W1 and W2 and generate the signal of the sum Y (Y=W1·X1+W2·X2).

An algorithm for obtaining the weight coefficients in the control device 1301F in the reception station is not limited to the above-described power inversion adaptive array antenna (PIAA antenna) scheme.

For example, any algorithm, including zero forcing (ZF) and minimum mean square error (MMSE), is available as a control algorithm. Further, any control index, including reception power, reception SI, reception error rate, and so on, is available as a control index.

Figure 14:
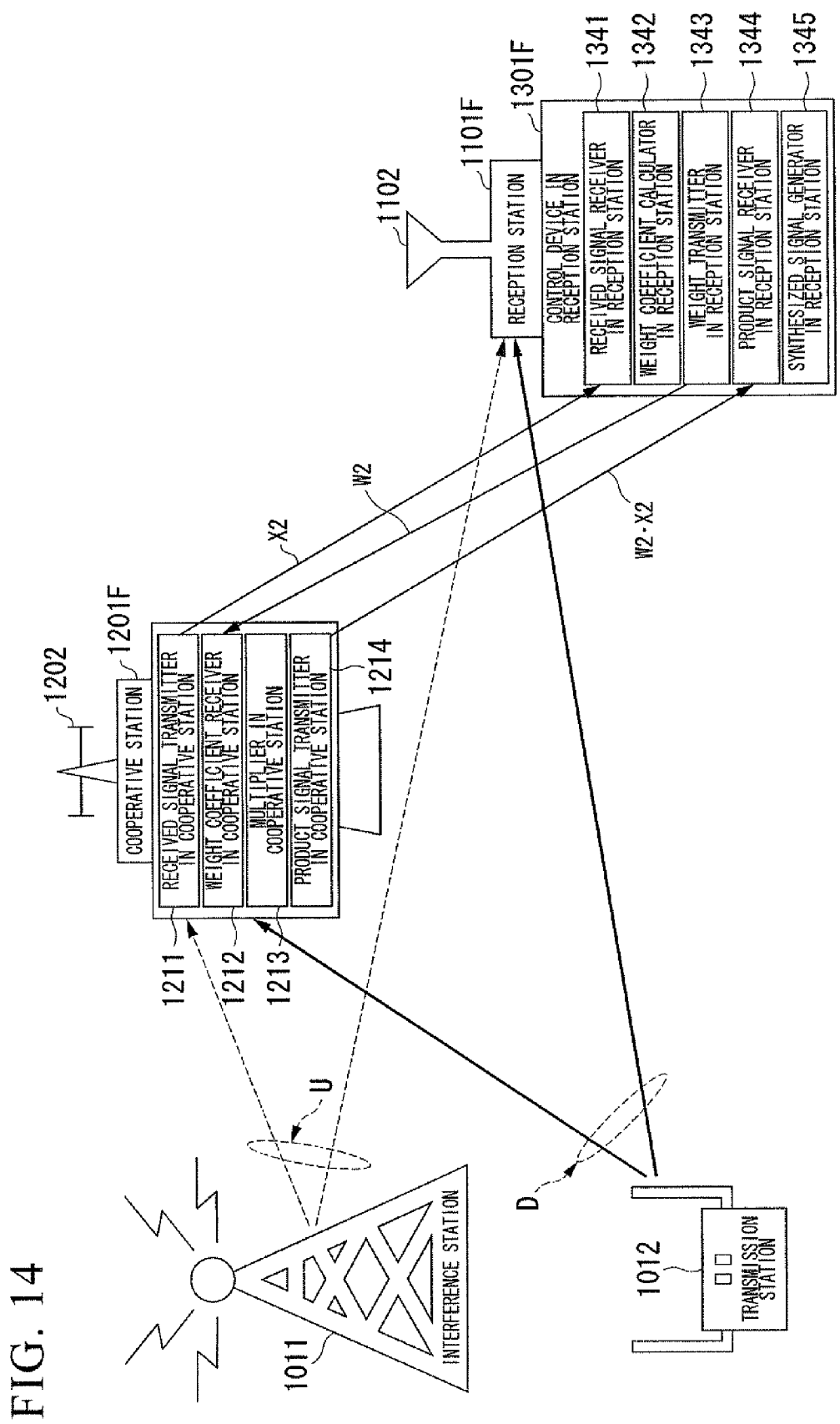
FIG. 14 shows an example of a configuration of each portion in the directivity control system shown in FIG. 13.

FIG. 14 shows an example of a configuration of the cooperative station 1201F, the reception station 1101F, and the control device 1301F in the reception station in the directivity control system according to the seventh embodiment of the present invention.

First, a configuration of the reception station 1101F will be described.

The reception station 1101F receives the interference signal U and the desired signal D as the received signal X1 using the antenna 1102. Further, the reception station 1101F includes the control device 1301F.

A received signal receiver 1341 of the control device 1301F in the reception station receives the received signal X2, which is received using the antenna 1202 of the cooperative station 1201F, from the cooperative station 1201F.

Based on the received signal X2 received by the received signal receiver 1341 in the reception station and the received signal X1 received using the antenna 1102, a weight coefficient calculator 1342 in the reception station calculates a weight coefficient W1 of the received signal X1 and a weight coefficient W2 of the received signal X2 so that a directivity pattern of an array antenna formed of the antenna 1102 and the antenna 1202 has a null in an arrival direction of the interference signal and a high directivity in an arrival direction of the desired signal. Alternatively, the weight coefficient calculator 1342 in the reception station calculates the weight coefficient W1 of the received signal X1 and the weight coefficient W2 of the received signal X2 so that the directivity pattern of the array antenna has the null in the arrival direction of the interference signal.

A weight coefficient transmitter 1343 in the reception station transmits the weight coefficient W2 calculated by the weight coefficient calculator 1342 in the reception station to the cooperative station 1201F.

A product signal receiver 1344 in the reception station receives the signal of the product W2·X2 of the received signal X2 and the weight coefficient W2 from the cooperative station 1201F.

A synthesized signal generator 1345 in the reception station calculates the product W1·X1 of the received signal X1 received using the antenna 1102 and the weight coefficient W1, and generates a signal of a sum Y (Y=W1·X1+W2·X2) based on the product W1·X1 and the signal of the product W2·X2 received from the cooperative station 1201F.

The reception station 1101F takes the signal of the sum Y generated by the synthesized signal generator 1345 in the reception station as a received signal.

The cooperative station 1201F has the same configuration as the cooperative station 1201 of the first embodiment shown in FIG. 2 and the seventh embodiment differs from the first embodiment only in that the control device 1301, which is a communication destination of the cooperative station 1201 shown in FIG. 2, is replaced with the control device 1301F in the reception station shown in FIG. 14. Accordingly, like elements are designated by like reference numerals and an overlapping description thereof will be omitted.

Eighth Embodiment

Figure 15:
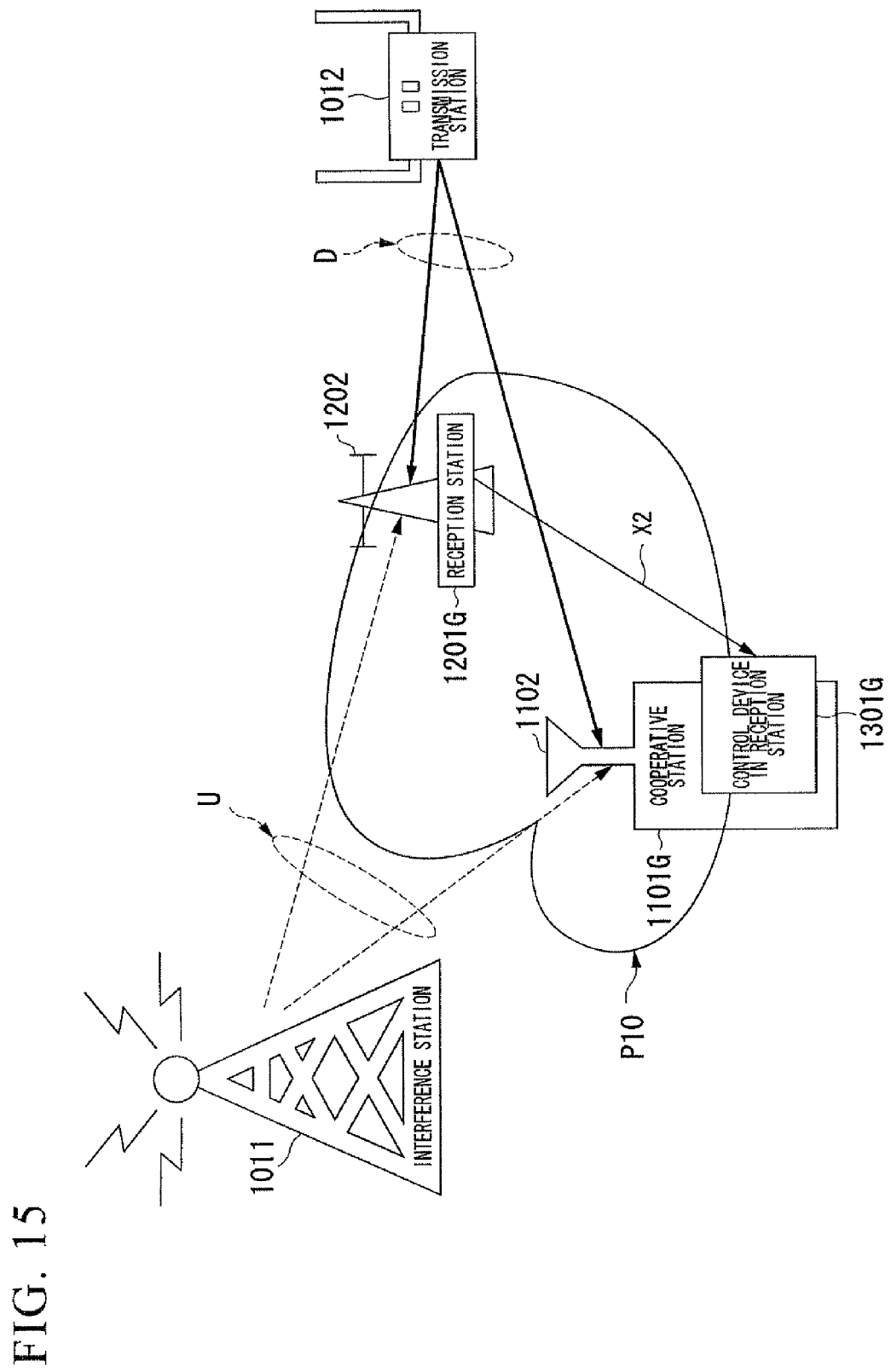
FIG. 15 shows a configuration of a directivity control system according to an eighth embodiment of the present invention.

FIG. 15 shows an entire configuration of a directivity control system according to an eighth embodiment of the present invention.

In an example shown in FIG. 15, a reception station 1101G and a cooperative station 1201G, which do not form an array antenna together, are combined to be regarded as one array antenna system, as in the example shown in FIG. 13. A control device 1301G in the reception station assigns a weight to an array antenna phase from a synthesized signal of a desired signal D and an interference signal U received in the reception station 1101G and the cooperative station 1201G or from the interference signal to form, in the array antenna, a directivity pattern having a null in an arrival direction of the interference signal and a high directivity in an arrival direction of the desired signal. Alternatively, a directivity pattern having the null in the arrival direction of the interference signal is formed in the array antenna.

The configuration example shown in FIG. 15 differs from that of the seventh embodiment shown in FIG. 13 in that the control device 1301G in the reception station in FIG. 15 does not transmit the weight coefficient W2 to the cooperative station 1201G, but multiplies the weight coefficient W2 by the received signal X2. The configuration example shown in FIG. 15 also differs from that of the seventh embodiment shown in FIG. 13 in that the cooperative station 1201G normally transmits the received signal X2 to the control device 1301G in the reception station (in FIG. 13, normally transmits the product W2·X2). The other portions of the configuration are the same as in FIG. 13.

Thus, the control device 1301G in the reception station multiplies the weight coefficient W2 by the received signal X2, making it possible to omit the process of transmitting the signal of the weight coefficient W2 from the control device 1301G in the reception station to the cooperative station 1201G and eliminate the process of multiplying the weight coefficient W2 by the received signal X2 in the cooperative station 1201G, thereby simplifying a process in the cooperative station 1201G.

Figure 16:
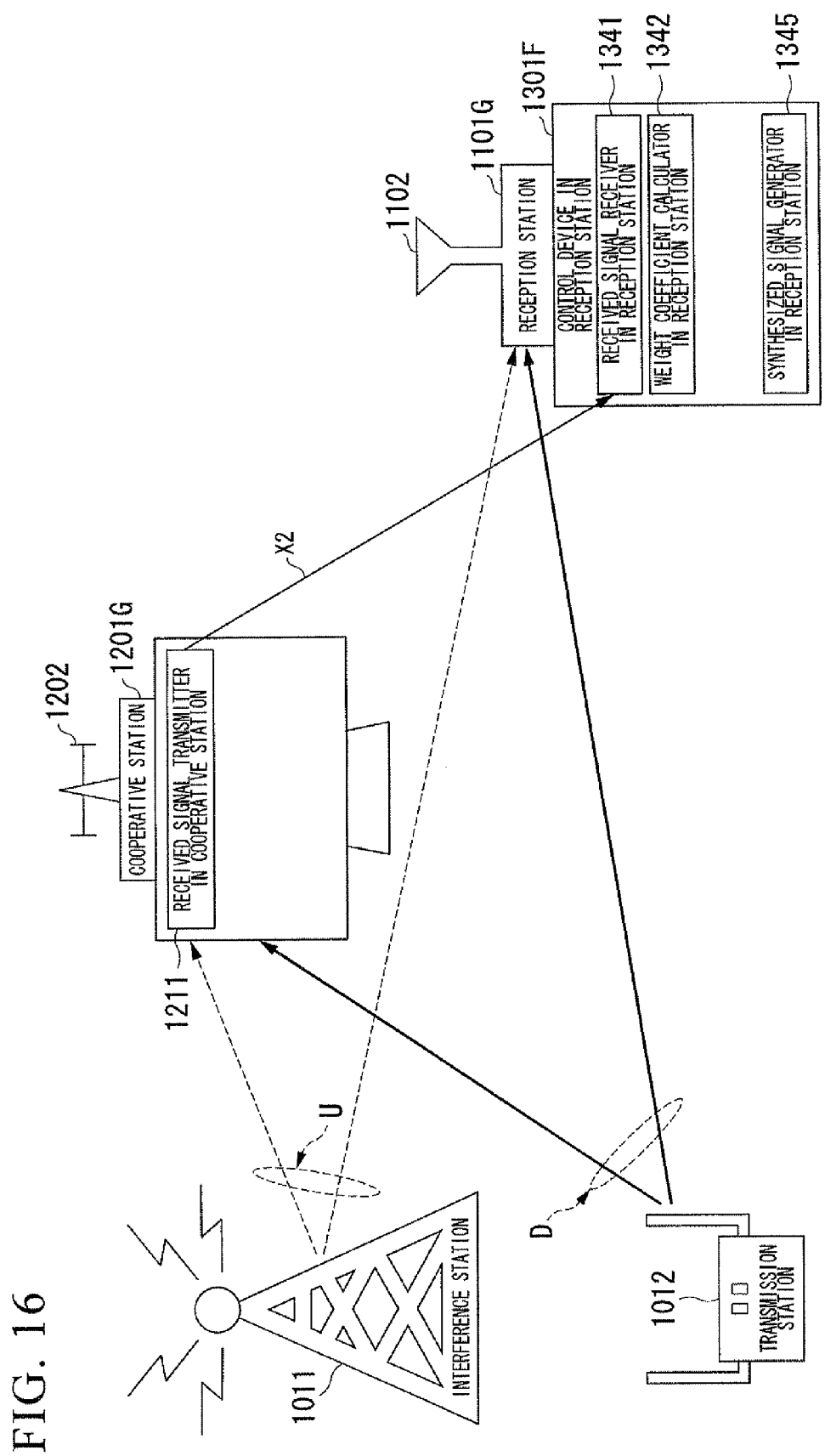
FIG. 16 shows an example of a configuration of each portion in the directivity control system shown in FIG. 15.

FIG. 16 shows an example of a configuration of the cooperative station 1201G, the reception station 1101G and the control device 1301G in the reception station in the directivity control system according to the eighth embodiment of the present invention.

In the configuration example shown in FIG. 16, the weight coefficient transmitter 1343 and the product signal receiver 1344 in the control device 1301F in the reception station shown in FIG. 14 are omitted, unlike the configuration example of the seventh embodiment shown in FIG. 14. The weight coefficient receiver 1212, the multiplier 1213, and the product signal transmitter 1214 in the cooperative station 1201F shown in FIG. 14 are also omitted.

That is, since, in the configuration example shown in FIG. 16, the weight coefficient signal is not transmitted from the control device 1301G in the reception station to the cooperative station 1201G, and the process of multiplying the weight coefficient W2 by the received signal X2 is not performed in the cooperative station 1201G, related processing units are omitted. The process of multiplying the received signal by the weight coefficient is performed by the synthesized signal generator 1345 of the control device 1301G in the reception station. The other portions are the same as in FIG. 14.

Although the first to eighth embodiments of the present invention in which the reception station receives the desired signal from the transmission station have been described, the present invention is not limited thereto and the reception station may receive and transmit the desired signal. Similarly, although the first to eighth embodiments in which the transmission station transmits the desired signal to the reception station have been described, the present invention is not limited thereto but the transmission station may transmit and receive the desired signal.

Ninth Embodiment

Figure 17:
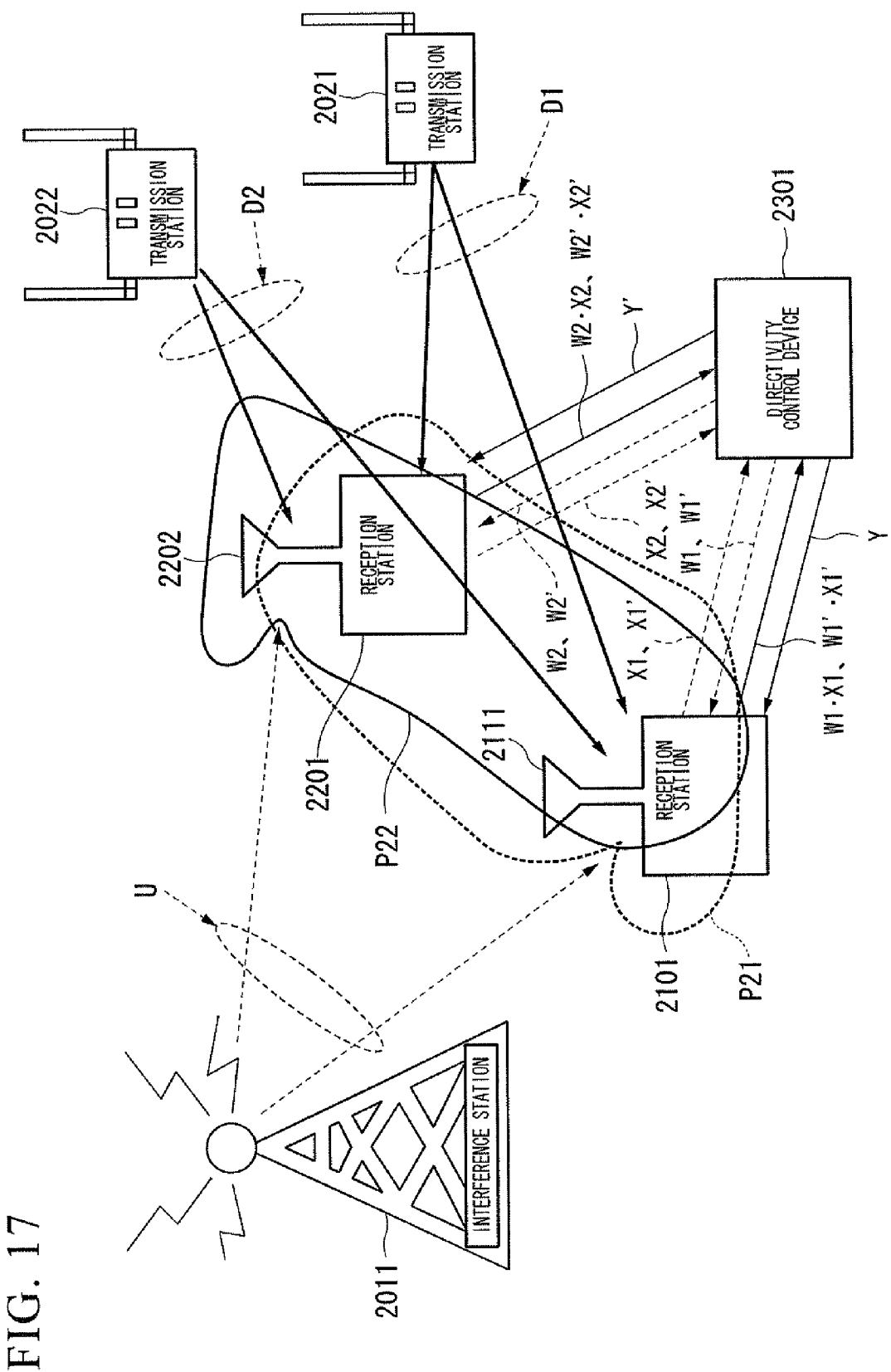
FIG. 17 shows a configuration of a directivity control system according to a ninth embodiment of the present invention.

FIG. 17 shows an entire configuration of a directivity control system according to a ninth embodiment of the present invention. In an example shown in FIG. 17, a plurality of cells/systems share the same frequency at the same time and the same place and a plurality of reception stations cooperate to suppress an interference signal.

Figure 18:
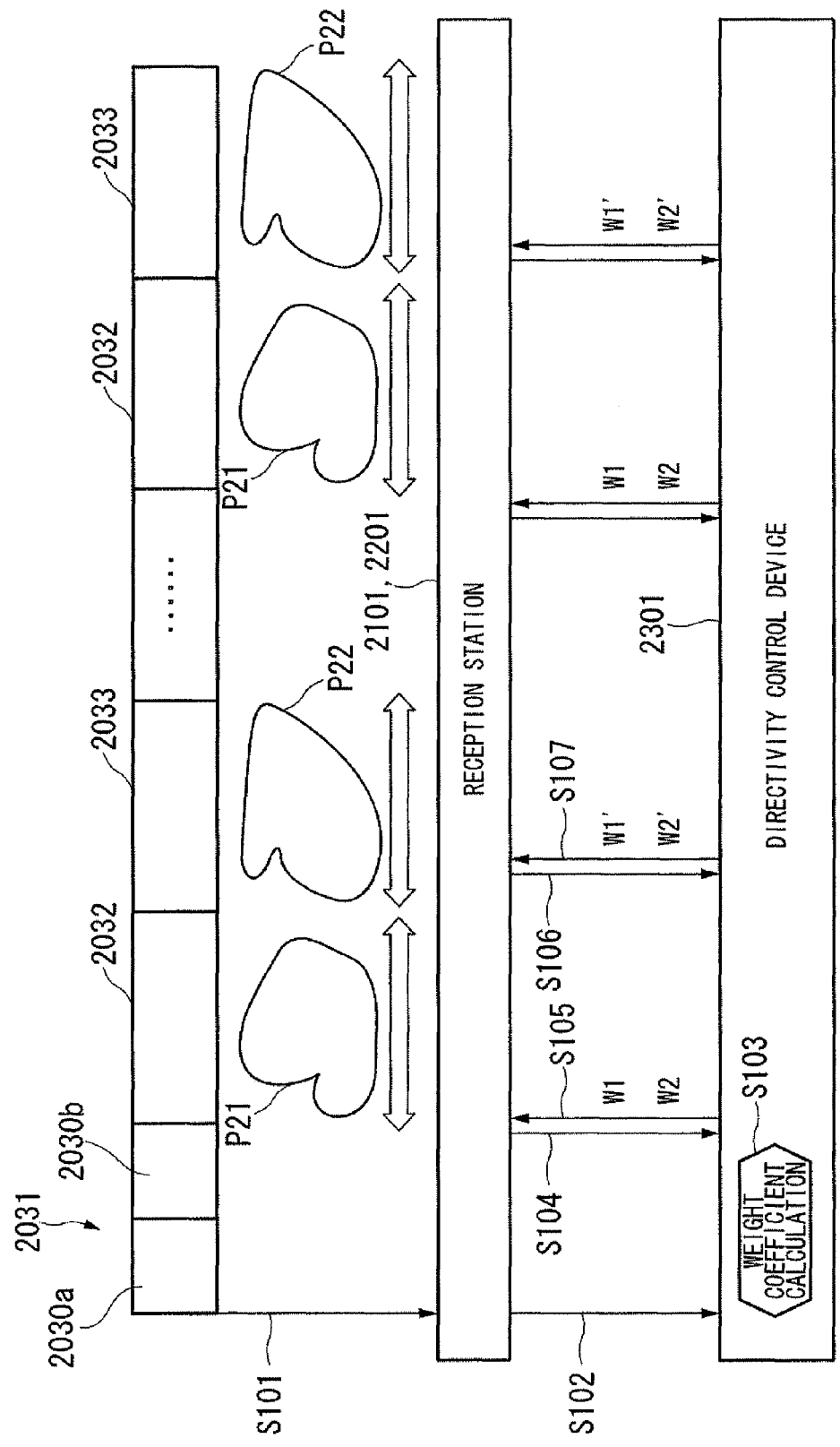
FIG. 18 shows a transmission timing for weight coefficients in a TDMA scheme.

In FIG. 17, a TDMA scheme is used as a communication scheme. In the TDMA scheme, as shown in FIG. 18, communication of a transmission station 2021 and a reception station 2101 and communication of a transmission station 2022 and a reception station 2201 are assigned to a preamble 2030a and a TDMA slot 2032 and a preamble 2030b and a TDMA slot 2033, which are fixed in a TDAM frame 2031 for an electric wave at the same frequency, respectively. That is, the reception station 2101 receives a desired signal D1 from the transmission station 2021, and the reception station 2201 receives a desired signal D2 from the transmission station 2022 at a timing of a different communication slot.

In the following description, a "communication slot at which the transmission station 2021 and the reception station 2101 perform communication" may be referred to as a "TDMA slot 2032," and a "TDMA slot" at which the transmission station 2022 and the reception station 2201 perform communication is referred to as a "TDMA slot 2033." For example, the first timing described above corresponds to a timing of the TDMA slot 2032, and the second timing described above corresponds to a timing of the TDMA slot 2033.

In the example shown in FIG. 17, the reception station 2101 receives an interference signal U from the interference station 2011 as well as an original desired signal D1 from the transmission station 2021 at the TDMA slot 2032. The reception station 2101 also receives a desired signal D2, which is not an original desired signal, from the transmission station 2022 and the interference signal U from the interference station 2011 at the TDMA slot 2033.

Meanwhile, the reception station 2201 receives the interference signal U from the interference station 2011 as well as the desired signal D2, which is an original desired signal, from the transmission station 2022 at the TDMA slot 2033. The reception station 2201 also receives the desired signal D1, which is not an original desired signal, from the transmission station 2021 and the interference signal U from the interference station 2011 at the TDMA slot 2032.

A directivity control device 2301 receives the received signal X1 from the reception station 2101 and the received signal X2 from the reception station 2201 at a timing of the TDMA slot 2032. The directivity control device 2301 calculates a weight coefficient W1 for the received signal X1 and a weight coefficient W2 for the received signal X2. That is, the antenna 2102 of the reception station 2101 and the reception station 2201 are regarded as one array antenna, and weight assignment is performed on the received signals X1 and X2.

Through the weight assignment, a directivity pattern P21 having a null in an arrival direction of the interference signal in the reception station 2101 and a high directivity in an arrival direction of the desired signal D1 from the transmission station 2021a is formed at a timing of transmission from the transmission station 2021 to the reception station 2101. Alternatively, a directivity pattern having the null in the arrival direction of the interference signal in the reception station 2101 is formed.

Further, the directivity control device 2301 receives the received signal X1' from the reception station 2101 and the received signal X2' from the reception station 2201 at a timing of the TDMA slot 2033. The directivity control device 2301 calculates a weight coefficient W1' for the received signal X1' and a weight coefficient W2' for the received signal X2'. That is, weight assignment is performed on the received signals X1' and X2'.

Through the weight assignment, a directivity pattern P22 having a null in an arrival direction of the interference signal in the reception station 2201 and a high directivity in the arrival direction of the desired signal D2 from the transmission station 2022 is formed at a timing of transmission from the transmission station 2022 to the reception station 2201. Alternatively, a directivity pattern having the null in the arrival direction of the interference signal in the reception station 2201 is formed.

When the directivity control device 2301 performs the weight assignment (obtains the weight coefficient), the directivity control device 2301 may use, for example, a power inversion adaptive array antenna (PIAA antenna) scheme.

Hereinafter, a procedure of using the power inversion adaptive array antenna (PIAA antenna) scheme will be described.

In FIG. 17, the reception station 2101 receives the desired signal D1 and the interference signal U using the antenna 2102 at a timing of the TDMA slot 2032. The received signal X1 received using the antenna 2102 is transmitted to the directivity control device 2301. Further, the reception station 2201 receives the desired signal D1 (an original desired signal is D2) and the interference signal U using the antenna 2202. The received signal X2 received using the antenna 2202 is transmitted to the directivity control device 2301. In the ninth embodiment, transmission of the received signal X1 from the reception station 2101 to the directivity control device 2301 and transmission of the received signal X2 from the reception station 2201 to the directivity control device 2301 are performed only when the weight coefficients W1 and W2 are calculated.

Based on the received signals X1 and X2, the directivity control device 2301 calculates the weight coefficient W using the following equation so that reception power in the reception station 2101 is minimized.

First, a correlation matrix R of the received signals X1 and X2 is obtained.

$$R = \begin{bmatrix} x_1 x_1^* & x_1 x_2^* \\ x_2 x_1^* & x_2 x_2^* \end{bmatrix}$$ [Equation 4]

Subsequently, an optimal weight coefficient W is obtained from an inverse matrix of the correlation matrix R and a transpose matrix of a steering vector S (1, 0). The steering vector S (1, 0) is used to fix a weight coefficient of one of the antennas.

$$W = R^{-1} S$$

$$S = [1\ 0]^T$$ [Equation 5]

A weight coefficient W1 for the received signal X1 and a weight coefficient W2 for the received signal X2 are calculated from the optimal weight coefficient W.

$$W = [w_1 w_2]^T$$ [Equation 6]

Further, the reception station 2101 receives the desired signal D2 (the original desired signal is D1), which is transmitted from the transmission station 2022, and the interference signal U using the antenna 2102, at a timing of the TDMA slot 2033. The received signal X1' received using the antenna 2102 is transmitted to the directivity control device 2301. Further, the reception station 2201 receives the original desired signal D2 and the interference signal U using the antenna 2202. The received signal X2' received using the antenna 2202 is transmitted to the directivity control device 2301. In the ninth embodiment, transmission of the received signal X1' from the reception station 2101 to the directivity control device 2301 and transmission of the received signal X2' from the reception station 2201 to the directivity control device 2301 are performed only when the weight coefficients are calculated.

A weight coefficient W1' for the received signal X1' and a weight coefficient W2' for the received signal X2' are calculated by the above-described power inversion adaptive array antenna (PIAA antenna) scheme.

According to the above procedure, the weight coefficient W1 for the received signal X1, the weight coefficient W2 for the received signal X2, the weight coefficient W1' for the received signal X1', and the weight coefficient W2' for the received signal X2' are calculated.

The directivity control device 2301 transmits the weight coefficient W1 to the reception station 2101 and the weight coefficient W2 to the reception station 2201 at a timing of the TDMA slot 2032. The directivity control device 2301 also transmits the weight coefficient W1' to the reception station 2101 and the weight coefficient W2' to the reception station 2201 at a timing of the TDMA slot 2033.

The reception station 2101 multiplies the weight coefficient W1 received from the directivity control device 2301 by the received signal X1 to obtain (W1·X1) and transmits a signal of the product W1·X1 to the directivity control device 2301 at a timing of the TDMA slot 2032. The reception station 2101 also multiplies the weight coefficient W1' received from the directivity control device 2301' by the received signal X1' to obtain (W1'·X1') and transmits a signal of the product W1'·X1' to the directivity control device 2301 at a timing of the TDMA slot 2033.

Meanwhile, the reception station 2201 multiplies the weight coefficient W2 received from the directivity control device 2301 by the received signal X2 to obtain (W2·X2) and transmits a signal of the product W2·X2 to the directivity control device 2301 at a timing of the TDMA slot 2032. The reception station 2201 also multiplies the weight coefficient W2' received from the directivity control device 2301 by the received signal X2' to obtain (W2'·X2') and transmits a signal of the product W2'·X2' to the directivity control device 2301 at a timing of the TDMA slot 2033.

The directivity control device 2301 obtains a sum Y based on the signal of the product W1·X1 received from the reception station 2101 and the signal of the product W2·X2 received from the reception station 2201, at the timing of the TDMA slot 2032.

Sum $Y = W1 \cdot X1 + W2 \cdot X2$

The directivity control device 2301 transmits the signal of the sum Y (Y=W1·X1+W2·X2) to the reception station 2101. The reception station 2101 takes the signal of the sum Y received from the directivity control device 2301 as a received signal.

Further, the directivity control device 2301 obtains a sum Y' based on the signal of the product W1'·X1' received from the reception station 2101 and the signal of the product W2'·X2' received from the reception station 2201, at the timing of the TDMA slot 2033.

Sum $Y' = W1' \cdot X1' + W2' \cdot X2'$

The directivity control device 2301 transmits a signal of the sum Y' (Y'=W1'·X1'+W2'·X2') to the reception station 2201. The reception station 2201 takes the signal of the sum Y' received from the directivity control device 2301 as a received signal.

Thus, the reception station 2101 having no array antenna can be combined with the antenna of the peripheral reception station 2201 to form one array antenna, thereby achieving an interference suppression effect of the array antenna without affecting the scale of the device. Similarly, the reception station 2201 having no array antenna can be combined with the antenna of the peripheral reception station 2101 to form one array antenna, thereby achieving an interference suppression effect of the array antenna without affecting the scale of the device.

Accordingly, even when the reception station 2101 and the reception station 2201 are small reception station devices (e.g., mobile phones) having no array antenna, it is possible to suppress the interference through antenna directivity control. An antenna directivity formed upon signal reception in the reception station 2101 and the reception station 2201 may be used even upon signal transmission.

Further, an algorithm for obtaining weight coefficients in the directivity control device 2301 is not limited to the above-described power inversion adaptive array antenna (PIAA antenna) scheme. For example, any algorithm, including zero forcing (ZF) and minimum mean square error (MMSE), is available as a control algorithm. Further, any control index, including reception power, reception SI, reception error rate, and so on, is available as a control index.

FIG. 18 shows a transmission timing for weight coefficients in a TDMA scheme. A flow of a process of transmitting and receiving weight coefficients between the control device and the reception station in the above-described TDMA scheme is shown.

In the example shown in FIG. 18, the transmission station 2021 is synchronized to the transmission station 2022 (communication is performed in the TDMA scheme), and the directivity control device 2301 stores the weight coefficients W1, W2, W1 and W2, which are transmitted to the reception station 2101 and the reception station 2201.

In FIG. 18, the TDMA frame 2031 includes the preamble 2030a transmitted from the transmission station 2021 to the reception station 2101, and the preamble 2030b transmitted from the transmission station 2022 to the reception station 2201. In the TDMA frame 2031, the preambles 2030a and 2030b are followed by the TDMA slot 2032 at which a signal is transmitted from the transmission station 2021 to the reception station 2101, and the TDMA slot 2033 at which a signal is transmitted from the transmission station 2022 to the reception station 2201. The preamble 2030a is a signal assigned to the reception station 2101, and the preamble 2030b is a signal assigned to the reception station 2201.

The weight coefficient W1 calculated by the directivity control device 2301 is included in the preamble 2030a, and the reception station 2101 sets a directivity when receiving the TDMA slot 2032, using the weight coefficient W1.

Further, the weight coefficient W2 calculated by the directivity control device 2301 is included in the preamble 2030b, and the reception station 2201 sets a directivity when receiving the TDMA slot 2033, using the weight coefficient W2.

As in the present embodiment, where TDMA is used as a communication scheme, when the reception station 2101 receives the weight coefficient W1 included in the preamble 2030a from the directivity control device 2301 once, the reception station 2101 stores the weight coefficient W1. The reception station 2101 sets the directivity using the weight coefficient W1 each time the reception station 2101 receives the TDMA slot 2032.

Further, when the reception station 2201 receives the weight coefficient W2 included in the preamble 2030b from the directivity control device 2301 once, the reception station 2201 stores the weight coefficient W2. The reception station 2201 sets the directivity using the weight coefficient W2 each time the reception station 2201 receives the TDMA slot 2033.

When CSMA is used instead of TDMA as a communication scheme, the weight coefficient W1 calculated by the directivity control device 2301 is included in the preamble received by the reception station 2101, and the reception station 2101 sets the directivity when receiving the CSMA slot, using the weight coefficient W1.

Further, the weight coefficient W2 calculated by the directivity control device 2301 is included in the preamble received by the reception station 2201, and the reception station 2201 sets the directivity when receiving the CSMA slot, using the weight coefficient W2.

When CSMA is used as a communication scheme, the directivity control device 2301 calculates the weight coefficient W1 of the reception station 2101 at each CSMA slot. The reception station 2101 sets the directivity when receiving each CSMA slot, using the weight coefficient W1. Further, the directivity control device 2301 calculates the weight coefficient W2 of the reception station 2201 at each CSMA slot. The reception station 2201 sets the directivity when receiving each CSMA slot, using the weight coefficient W2.

Synchronization between the transmission station 2021 and the reception station 2101 and synchronization between the transmission station 2022 and the reception station 2201 are established by the preamble PA of the TDMA frame (step S101). Further, synchronization between the reception station 2101 and the directivity control device 2301 and synchronization between the reception station 2201 and the directivity control device 2301 are established (step S102).

When synchronization among the reception station 2101, the reception station 2201 and the directivity control device 2301 has been established, the directivity control device 2301 calculates the weight coefficients W1, W2, W1' and W2' based on the received signals X1 and X1' from the reception station 2101 and the received signals X2 and X2' from the reception station 2201 using the above-described power inversion adaptive array antenna (P1 antenna) scheme (step S103). The directivity control device 2301 retains the weight coefficients W1, W2, W1' and W2'.

Where preamble signals are available for the received signals X1 and X2 required when the weight coefficients W1 and W2 are calculated, and the received signals X1' and X2' required when the weight coefficients W1' and W2' are calculated, the preamble signals may be used to calculate the weight coefficients.

A calling signal for the weight coefficients W1 and W2 for forming the directivity pattern P21 is transmitted from the reception station 2101 to the directivity control device 2301 at a first timing of the TDMA slot 2032 (step S104). The directivity control device 2301 transmits the weight coefficients W1 and W2 to the reception station 2101 (step S105). The process of transmitting the weight coefficients W1 and W2 is then continued until the communication between the transmission station 2021 and the reception station 2101 stops.

Further, a calling signal for the weight coefficients W1' and W2' for forming the directivity pattern P22 is transmitted from the reception station 2201 to the directivity control device 2301 at a first timing of the TDMA slot 2033 (step S106). The directivity control device 2301 transmits the weight coefficients W1' and W2' to the reception station 2201 (step S107). The process of transmitting the weight coefficients W1' and W2' is then continued until the communication between the transmission station 2022 and the reception station 2201 stops.

Figure 19:
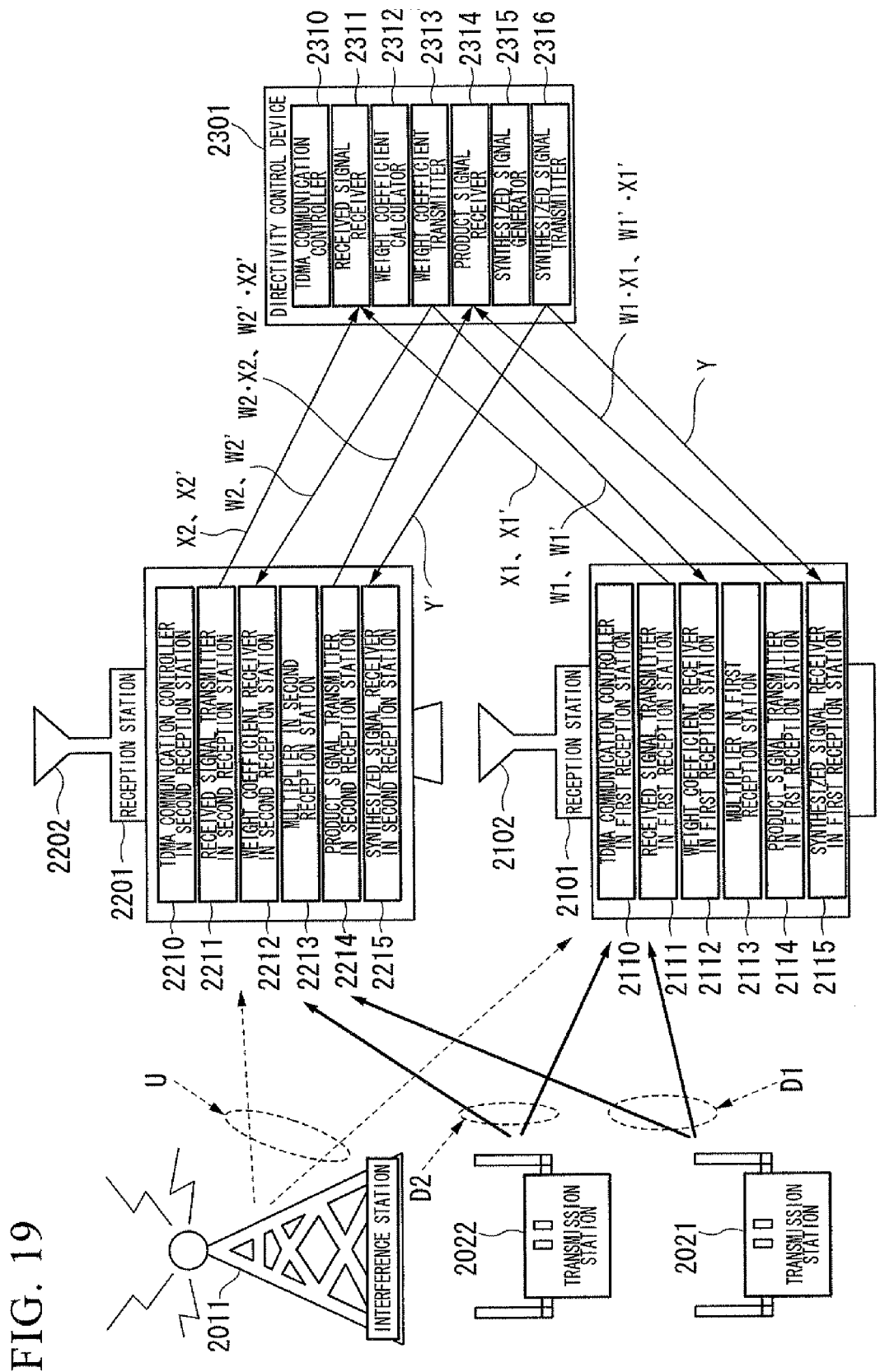
FIG. 19 shows an example of a configuration of each portion in the directivity control system shown in FIG. 17.

FIG. 19 shows an example of a configuration of the reception station 2101, the reception station 2201, and the directivity control device 2301 in the directivity control system according to the ninth embodiment of the present invention.

First, a configuration of the directivity control device 2301 will be described.

A TDMA communication controller 2310 in the directivity control device 2301 is a controller for detecting a preamble of the TDMA frame and establishing synchronization with the TDMA frame. After the synchronization is established, communication between the directivity control device 2301 and the reception station 2101 and communication between the directivity control device 2301 and the reception station 2201 are performed using a communication slot in the TDMA frame.

A received signal receiver 2311 receives a received signal X1, which is received using the antenna 2102 of the reception station 2101, from the reception station 2101 at a timing of the TDMA slot 2032. The received signal receiver 2311 also receives a received signal X2, which is received using the antenna 2202 of the reception station 2201, from the reception station 2201. The received signal receiver 2311 also receives a received signal X1', which is received using the antenna 2102 of the reception station 2101, from the reception station 2101 and a received signal X2', which is received using the antenna 2202 of the reception station 2201, from the reception station 2201 at a timing of the TDMA slot 2033.

The transmission of the received signal X1 from the reception station 2101 to the directivity control device 2301 and the transmission of the received signal X2 from the reception station 2201 to the directivity control device 2301 are performed only when the weight coefficients W1 and W2 for the received signals X1 and X2 are calculated (normally, a signal of a product of the received signal and the weight coefficient is transmitted). Similarly, the transmission of the received signal X1' from the reception station 2101 to the directivity control device 2301 and the transmission of the received signal X2' from the reception station 2201 to the directivity control device 2301 are performed only when the weight coefficients W1' and W2' for the received signals X1' and X2' are calculated.

Based on the received signals X1 and X2 received by the received signal receiver 2311, a weight coefficient calculator 2312 calculates the weight coefficient W1 of the received signal X1 and the weight coefficient W2 of the received signal X2, so that a directivity pattern of an array antenna formed of the antenna 2102 and the antenna 2202 has a null in an arrival direction of the interference signal in the reception station 2101 and a high directivity in an arrival direction of the desired signal D1 from the transmission station 2021. Alternatively, the weight coefficient calculator 2312 calculates the weight coefficient W1 of the received signal X1 and the weight coefficient W2 of the received signal X2 so that the directivity pattern of the array antenna has the null in the arrival direction of the interference signal.

Based on the received signals X1' and X2' received by the received signal receiver 2311, the weight coefficient calculator 2312 also calculates the weight coefficient W1' of the received signal X1' and the weight coefficient W2' of the received signal X2', so that the directivity pattern of the array antenna consisting of the antenna 2102 and the antenna 2202 has a null in an arrival direction of the interference signal in the reception station 2201 and a high directivity in the arrival direction of the desired signal D2 from the transmission station 2022. Alternatively, the weight coefficient calculator 2312 calculates the weight coefficient W1' of the received signal X1' and the weight coefficient W2' of the received signal X2', so that the directivity pattern of the array antenna has the null in the arrival direction of the interference signal in the reception station 2201.

Further, the above-described power inversion adaptive array antenna (PIAA antenna) scheme may be used to calculate the weight coefficients W1, W2, W1' and W2'.

A weight coefficient transmitter 2313 transmits the weight coefficients W1 and W2 calculated by the weight coefficient calculator 2312 to the reception station 2101 at a timing of the TDMA slot 2032. The weight coefficient transmitter 2313 also transmits the weight coefficients W1' and W2' calculated by weight coefficient calculator 2312 to the reception station 2201 at a timing of the TDMA slot 2033.

A product signal receiver 2314 receives the signal of the product W1·X1 of the received signal X1 and the weight coefficient W1 from the reception station 2101, and the signal of the product W1'·X1' of the received signal X1' and the weight coefficient W1' from the reception station 2101. The product signal receiver 2314 also receives the signal of the product W2·X2 of the received signal X2 and the weight coefficient W2, and the signal of the product W2'·X2' of the received signal X2' and the weight coefficient W2' from the reception station 2201.

A synthesized signal generator 2315 generates a signal of a sum Y, "Y=W1·X1+W2·X2", of the product W1·X1 received from the reception station 2101 and the product W2·X2 received from the reception station 2201. The synthesized signal generator 2315 also generates a signal of a sum Y', "Y'=W1'·X1'+W2'·X2'", of the product W1'·X1' received from the reception station 2101 and the product W2'·X2' received from the reception station 2201.

A synthesized signal transmitter 2316 transmits the signal of the sum Y generated by the synthesized signal generator 2315 to the reception station 2101 at a timing of the TDMA slot 2032. The synthesized signal transmitter 2316 also transmits the signal of the sum Y' generated by the synthesized signal generator 2315 to the reception station 2201 at a timing of the TDMA slot 2033.

Next, a configuration of the reception station 2101 will be described.

A TDMA communication controller 2110 in a first reception station in the reception station 2101 is a controller for detecting a preamble of the TDMA frame and establishing synchronization with the TDMA frame.

After the synchronization is established, communication between the directivity control device 2301 and the reception station 2101 is performed using a communication slot of the TDMA frame.

A received signal transmitter 2111 in the first reception station transmits the interference signal U and the received signal X1 of the desired signal D1, which are received using the antenna 2102, to the directivity control device 2301 at the timing of the TDMA slot 2032. The received signal transmitter 2111 in the first reception station also transmits the interference signal U and the received signal X1' of the desired signal D2, which are received using the antenna 2102, to the directivity control device 2301 at the timing of the TDMA slot 2033.

A weight coefficient receiver 2112 in the first reception station receives the weight coefficient W1 from the directivity control device 2301 at a timing of the TDMA slot 2032. The weight coefficient receiver 2112 in the first reception station also receives the weight coefficient W1' from the directivity control device 2301 at the timing of the TDMA slot 2033.

A multiplier 2113 in the first reception station multiplies the weight coefficient W1 received from the directivity control device 2301 by the received signal X1 to obtain (W1·X1). The multiplier 2113 in the first reception station also multiplies the weight coefficient W1 received from the directivity control device 2301' by the received signal X1' to obtain (W1'·X1').

A product signal transmitter 2114 in the first reception station transmits a signal of the product W1·X1 calculated by the multiplier 2113 in the first reception station to the directivity control device 2301 at the timing of the TDMA slot 2032. The product signal transmitter 2114 in the first reception station also transmits a signal of the product W1'·X1' calculated by the multiplier 2113 in the first reception station to the directivity control device 2301 at the timing of the TDMA slot 2033.

A synthesized signal receiver 2115 in the first reception station receives the signal of the sum Y (Y=W1·X1+W2·X2) from the directivity control device 2301 at the timing of the TDMA slot 2032.

Next, a configuration of the reception station 2201 will be described.

A TDMA communication controller 2210 in a second reception station in the reception station 2201 is a controller for detecting a preamble of the TDMA frame and establishing synchronization with the TDMA frame.

After the synchronization is established, communication between the directivity control device 2301 and the reception station 2201 is performed using a communication slot of the TDMA frame.

A received signal transmitter 2211 in the second reception station transmits the interference signal U and the received signal X2 of the desired signal D1, which are received using the antenna 2202, to the directivity control device 2301 at the timing of the TDMA slot 2032. The received signal transmitter 2211 in the second reception station also transmits the interference signal U and the received signal X2' of the desired signal D2, which are received using the antenna 2202, to the directivity control device 2301 at the timing of the TDMA slot 2033.

A weight coefficient receiver 2212 in the second reception station receives the weight coefficient W2 from the directivity control device 2301 at the timing of the TDMA slot 2032. The weight coefficient receiver 2112 in the second reception station also receives the weight coefficient W2' from the directivity control device 2301 at the timing of the TDMA slot 2033.

The multiplier 2213 in the second reception station multiplies the weight coefficient W2 received from the directivity control device 2301 by the received signal X2 to obtain (W2·X2). The multiplier 2213 in the second reception station also multiplies the weight coefficient W2' received from the directivity control device 2301 by the received signal X2' to obtain (W2'·X2').

A product signal transmitter 2214 in the second reception station transmits a signal of the product W2·X2 calculated by the multiplier 2213 in the second reception station to the directivity control device 2301 at the timing of the TDMA slot 2032. The product signal transmitter 2114 in the second reception station also transmits a signal of the product W2'·X2' calculated by the multiplier 2113 in the first reception station to the directivity control device 2301 at the timing of the TDMA slot 2033.

A synthesized signal receiver 2215 in the second reception station receives the signal of the sum Y (Y'=W1'·X1'+W2'·X2') from the directivity control device 2301 at the timing of the TDMA slot 2033.

The above-described directivity controller corresponds to the directivity control device 2301, the above-described weight coefficient calculator corresponds to the weight coefficient calculator 2312, and the above-described weight coefficient transmitter corresponds to the weight coefficient transmitter 2313. Further, the above-described synthesized signal generator corresponds to the synthesized signal generator 2315, and the above-described synthesized signal transmitter corresponds to the synthesized signal transmitter 2316.

Although, in the present embodiment, the example in which the weight coefficients W1 and W2 are calculated using the preambles 2030a and 2030b included in the TDMA frame 2031 has been described, the present invention is not limited thereto. For example, the weight coefficients W1 and W2 may be calculated using a synchronization signal, a training signal, a data signal, or the like instead of preambles 2030a and 2030b.

Tenth Embodiment

Next, a tenth embodiment of the present invention will be described. In the ninth embodiment, the transmission station 2021 transmits the desired signal D1 to the reception station 2101 and the reception station 2201, and the transmission station 2022 transmits the desired signal D2 to the reception station 2101 and the reception station 2201. In the tenth embodiment, an example in which only the transmission station 2021 transmits the desired signal D1 to the reception station 2101 and the reception station 2201 will be described.

Further, a description of the same configuration portions of the tenth embodiment as in the ninth embodiment or portions for performing the same process as in the ninth embodiment will be omitted.

Figure 20:
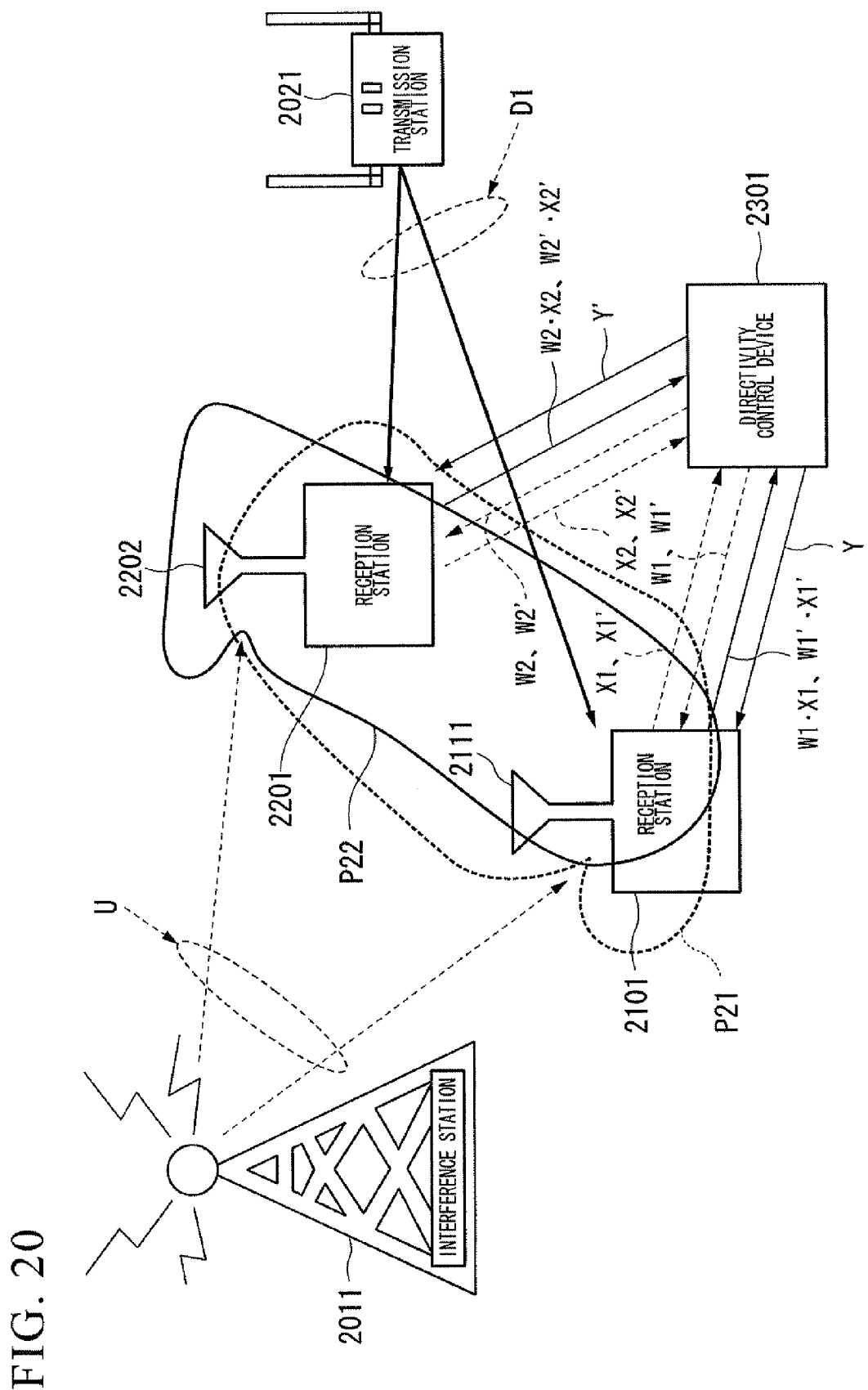
FIG. 20 shows a configuration of a directivity control system according to a tenth embodiment of the present invention.

In the example shown in FIG. 20, the reception station 2101 receives an interference signal U from an interference station 2011 as well as an original desired signal D1 from the transmission station 2021 at a TDMA slot 2032. The reception station 2101 also receives the interference signal U from the interference station 2011 at a TDMA slot 2033.

Meanwhile, the reception station 2201 also receives the interference signal U from the interference station 2011 at the TDMA slot 2033. The reception station 2201 also receives the desired signal D1, which is not an original desired signal, from the transmission station 2021 and the interference signal U from the interference station 2011 at the TDMA slot 2032.

A directivity control device 2301 receives the received signal X1 from the reception station 2101 and the received signal X2 from the reception station 2201 at the timing of the TDMA slot 2032. The directivity control device 2301 calculates a weight coefficient W1 for the received signal X1 and a weight coefficient W2 for the received signal X2. That is, the antenna 2102 of the reception station 2101 and the reception station 2201 are regarded as one array antenna, and weight assignment is performed on the received signals X1 and X2.

Through the weight assignment, a directivity pattern P21 having a null in an arrival direction of the interference signal in the reception station 2101 and a high directivity in an arrival direction of the desired signal D1 from the transmission station 2021 is formed at a timing of transmission from the transmission station 2021 to the reception station 2101. Alternatively, a directivity pattern having the null in the arrival direction of the interference signal in the reception station 2101 is formed.

Eleventh Embodiment

Next, an eleventh embodiment of the present invention will be described. In the ninth embodiment, the directivity control device 2301 is provided at a different place from the reception station 2101, the reception station 2201, the transmission station 2021, and the transmission station 2022. In the eleventh embodiment, an example in which the directivity control device 2301 is provided in the reception station 2101 will be described.

A description of the same configuration portions of the eleventh embodiment as in the ninth embodiment or portions for performing the same process as in the ninth embodiment will be omitted.

Figure 21:
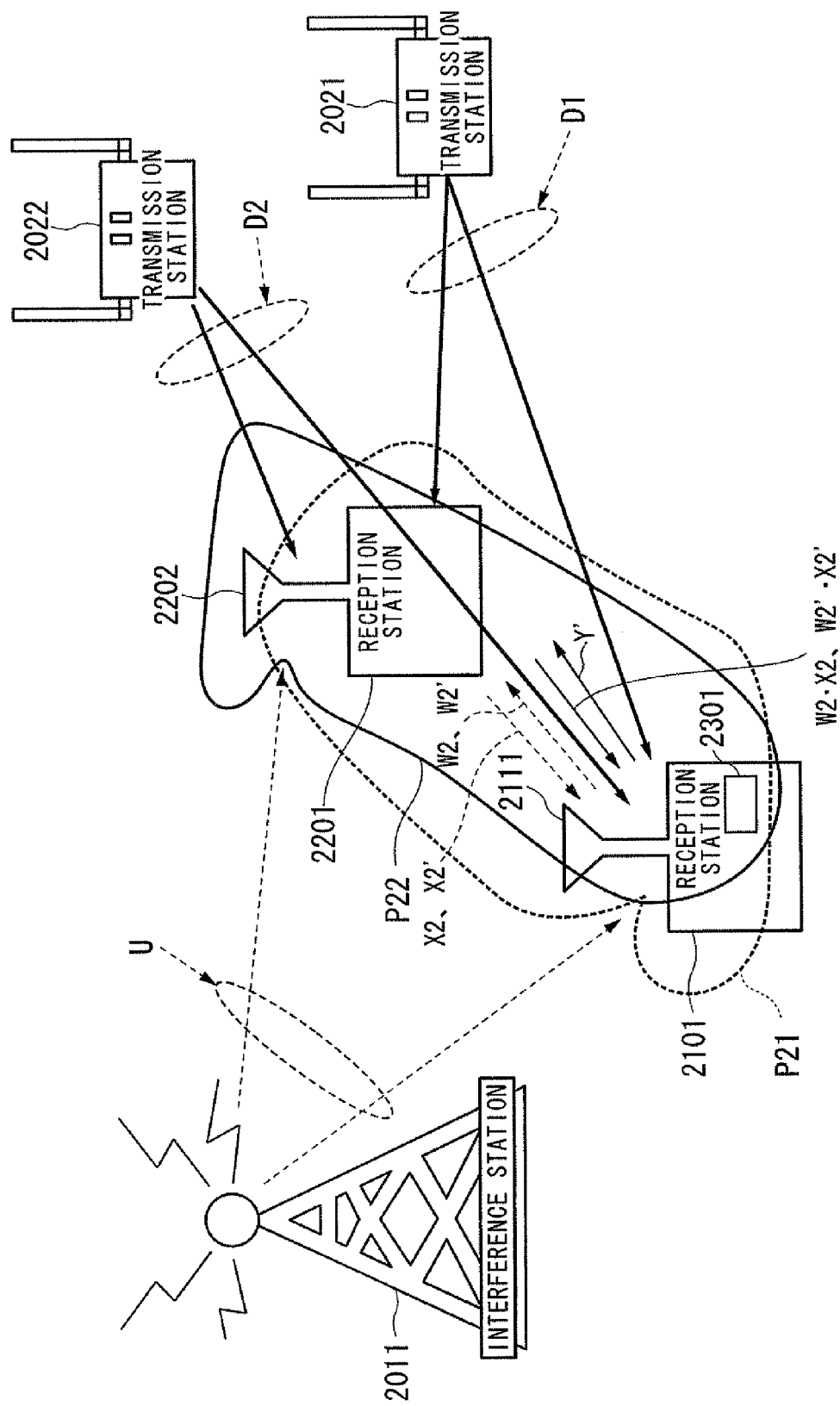
FIG. 21 shows a configuration of a directivity control system according to an eleventh embodiment of the present invention.

In the example shown in FIG. 21, the reception station 2101 receives an interference signal U from an interference station 2011 as well as an original desired signal D1 from a transmission station 2021 at a TDMA slot 2032. The reception station 2101 also receives a desired signal D2, which is not an original desired signal, from a transmission station 2022 and the interference signal U from the interference station 2011 at a TDMA slot 2033.

Meanwhile, a reception station 2201 receives the interference signal U from the interference station 2011 as well as a desired signal D2, which is an original desired signal, from the transmission station 2022 at the TDMA slot 2033. The reception station 2201 also receives the desired signal D1, which is not an original desired signal, from the transmission station 2021 and the interference signal U from the interference station 2011 at the TDMA slot 2032.

A directivity control device 2301 in the reception station 2101 acquires the received signal X1 from the reception station 2101 at a timing of the TDMA slot 2032, and receives the received signal X2 from the reception station 2201. The directivity control device 2301 calculates a weight coefficient W1 for the received signal X1 and a weight coefficient W2 for the received signal X2. That is, the antenna 2102 of the reception station 2101 and the reception station 2201 are regarded as one array antenna, and weight assignment is performed on the received signals X1 and X2.

Through the weight assignment, a directivity pattern P21 having a null in an arrival direction of the interference signal in the reception station 2101 and a high directivity in an arrival direction of the desired signal D1 from the transmission station 2021 is formed at a timing of transmission from the transmission station 2021 to the reception station 2101. Alternatively, a directivity pattern having the null in the arrival direction of the interference signal in the reception station 2101 is formed.

The directivity control device 2301 in the reception station 2101 acquires the received signal X1' from the reception station 2101 and receives the received signal X2' from the reception station 2201 at a timing of the TDMA slot 2033. The directivity control device 2301 calculates a weight coefficient W1' for the received signal X1' and a weight coefficient W2' for the received signal X2. That is, weight assignment is performed on the received signals X1' and X2'.

Through the weight assignment, a directivity pattern P22 having a null in an arrival direction of the interference signal in the reception station 2201 and a high directivity in the arrival direction of the desired signal D2 from the transmission station 2022 is formed at a timing of transmission from the transmission station 2022 to the reception station 2201. Alternatively, a directivity pattern having the null in the arrival direction of the interference signal in the reception station 2201 is formed.

Although, in the eleventh embodiment, the example in which the directivity control device 2301 is provided in the reception station 2101 has been described, the present invention is not limited thereto. For example, the directivity control device 2301 may be provided in the transmission station 2021, the transmission station 2022, or the reception station 2201.

Twelfth Embodiment

Figure 22:
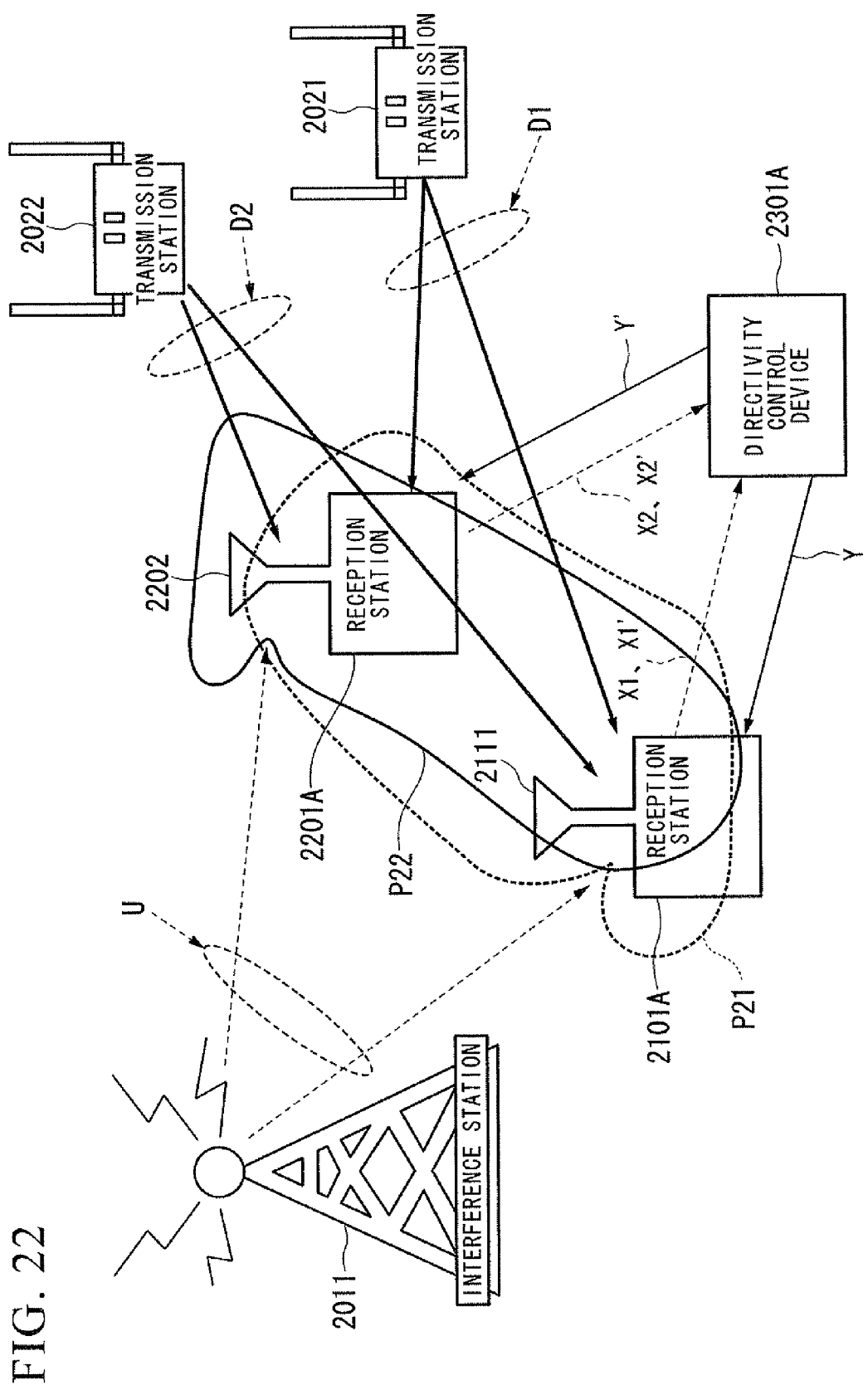
FIG. 22 shows a configuration of a directivity control system according to a twelfth embodiment of the present invention.

FIG. 22 shows an entire configuration of a directivity control system according to a twelfth embodiment of the present invention. In the example shown in FIG. 22, a TDMA scheme is used, as in the example shown in FIG. 17.

In the ninth embodiment shown in FIG. 17, the directivity control device 2301 transmits the weight coefficients W1 and W1' to the reception station 2101 and the weight coefficients W2 and W2' to the reception station 2201. In the twelfth embodiment of the present invention, an example in which a directivity control device 2301 does not transmit the weight coefficients W1 and W1' to the reception station 2101 and does not transmit the weight coefficients W2 and W2' to the reception station 2201 will be described.

In the directivity control system shown in FIG. 22, antennas of a reception stations 2101A and a reception stations 2201A, which do not form an array antenna together, are combined to be regarded as one array antenna system, as in the example shown in FIG. 17, and a directivity control device 2301A assigns a weight to an array antenna phase from a synthesized signal of a desired signal and an interference signal U received in the reception station 2101A and the reception station 2201A or from the interference signal.

Through the weight assignment, a directivity pattern P21 having a null in an arrival direction of the interference signal in the reception station 2101A and a high directivity in an arrival direction of the desired signal D1 from the transmission station 2021a is formed. Alternatively, a directivity pattern having the null in the arrival direction of the interference signal in the reception station 2101A is formed.

Further, a directivity pattern P22 having a null in an arrival direction of the interference signal in the reception station 2201A and a high directivity in the arrival direction of the desired signal D2 from the transmission station 2022 is formed. Alternatively, a directivity pattern having the null in the arrival direction of the interference signal in the reception station 2201A is formed.

In order to form the directivity pattern, the reception station 2101A transmits the received signal X1 to the directivity control device 2301A at a timing of the TDMA slot 2032 and the received signal X1' to the directivity control device 2301A at a timing of the TDMA slot 2033. The reception station 2201A also transmits the received signal X2 to the directivity control device 2301A at the timing of the TDMA slot 2032 and the received signal X2' to the directivity control device 2301A at the timing of the TDMA slot 2033.

The directivity control device 2301A multiplies the received signal X1 received from the reception station 2101A and the received signal X2 received from the reception station 2201A by the weight coefficients W1 and W2, respectively, at the timing of the TDMA slot 2032, generates a signal of a sum Y ($Y = W1 \cdot X1 + W2 \cdot X2$), and transmits the signal to the reception station 2101A.

The directivity control device 2301A also multiplies the received signal X1' received from the reception station 2201A and the received signal X2' received from the reception station 2201A by the weight coefficients W1' and W2', respectively, at the timing of the TDMA slot 2033, generates a signal of a sum Y' ($Y' = W1' \cdot X1' + W2' \cdot X2'$) and transmits the signal to the reception station 2201A.

As described above, the configuration example shown in FIG. 22 differs from that of the ninth embodiment shown in FIG. 17 in that, in FIG. 22, the directivity control device 2301A does not transmit the weight coefficients to the reception station 2101A and the reception station 2201A. The configuration example shown in FIG. 22 also differs from that of the ninth embodiment shown in FIG. 17 in that the directivity control device 2301A multiplies the received signal by the weight coefficient.

Thus, the directivity control device 2301A multiplies the weight coefficient by the received signal, making it unnecessary to transmit the weight coefficient signal from the directivity control device 2301A to the reception station 2101A and the reception station 2201A. Further, it is unnecessary to perform the process of multiplying the received signal by the weight coefficient in the reception station 2101A and the reception station 2201A, thereby simplifying a process in the reception station 2101A and the reception station 2201A.

Figure 23:
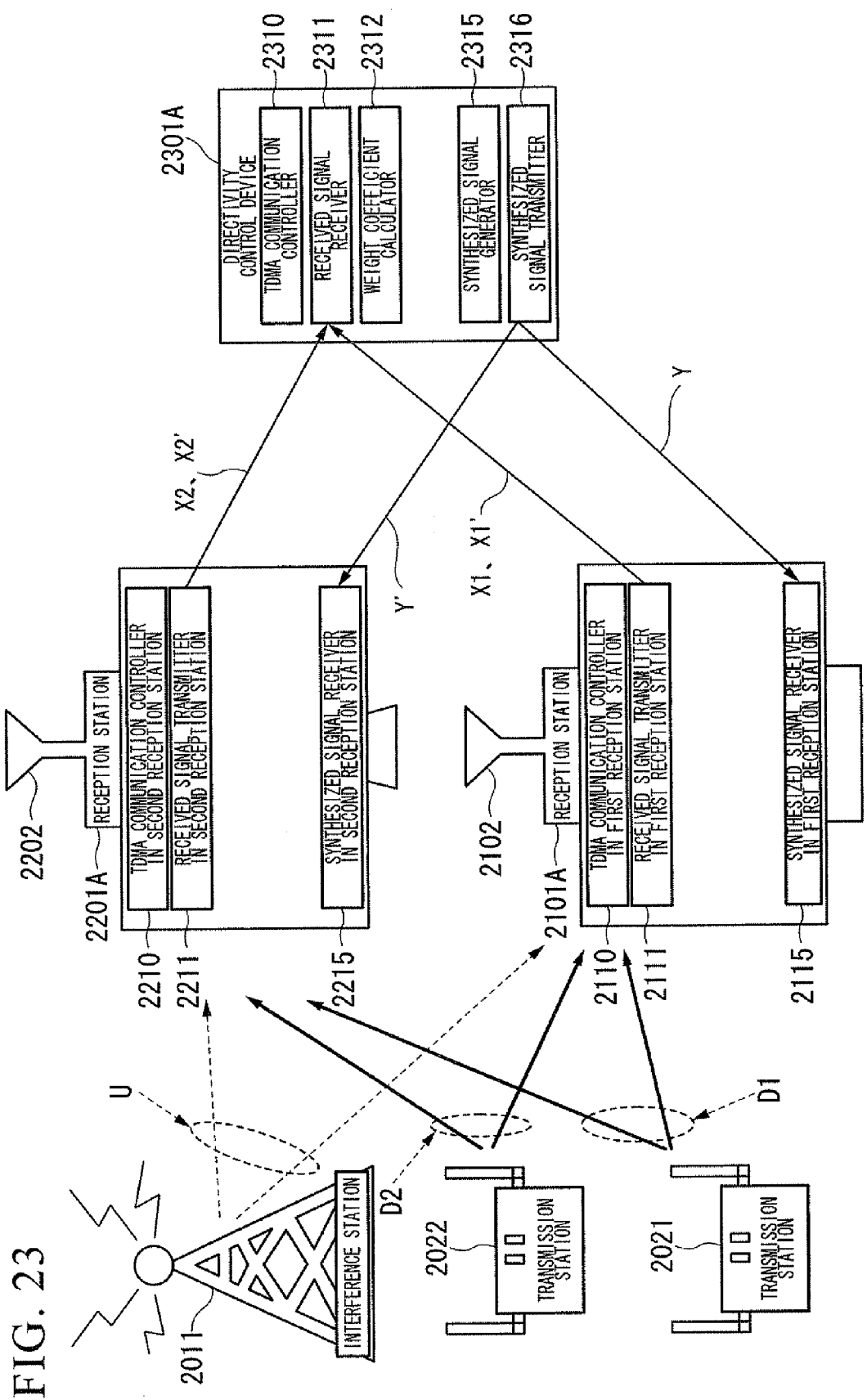
FIG. 23 shows an example of a configuration of each portion in the directivity control system shown in FIG. 20.

FIG. 23 shows an example of a configuration of the reception station 2101A, the reception station 2201A, and the directivity control device 2301A in the directivity control system according to the twelfth embodiment of the present invention.

In the configuration example shown in FIG. 23, the weight coefficient transmitter 2313 and the product signal receiver 2314 in the directivity control device 2301 shown in FIG. 19 are omitted, unlike the configuration example of the ninth embodiment shown in FIG. 19. The weight coefficient receiver 2112, the multiplier 2113, and the product signal transmitter 2114 in the first reception station in the reception station 2101 shown in FIG. 19 are also omitted. The weight coefficient receiver 2212, the multiplier 2213, and the product signal transmitter 2214 in the second reception station in the reception station 2201 shown in FIG. 19 are also omitted.

That is, since, in the configuration example shown in FIG. 23, the signals of the weight coefficients W1, W2, W1' and W2' are not transmitted from the directivity control device 2301A to the reception station 2101A and the reception station 2201A, and the process of multiplying the received signal by the weight coefficient is not performed in the reception station 2101A and the reception station 2201A, related processing units are omitted.

The process of multiplying the received signal by the weight coefficient is performed by the synthesized signal generator 2315 in the directivity control device 2301A. The other portions of the configuration are the same as in FIG. 19. Accordingly, like elements are designated by like reference numerals and an overlapping description thereof will be omitted.

Thirteenth Embodiment

Figure 24:
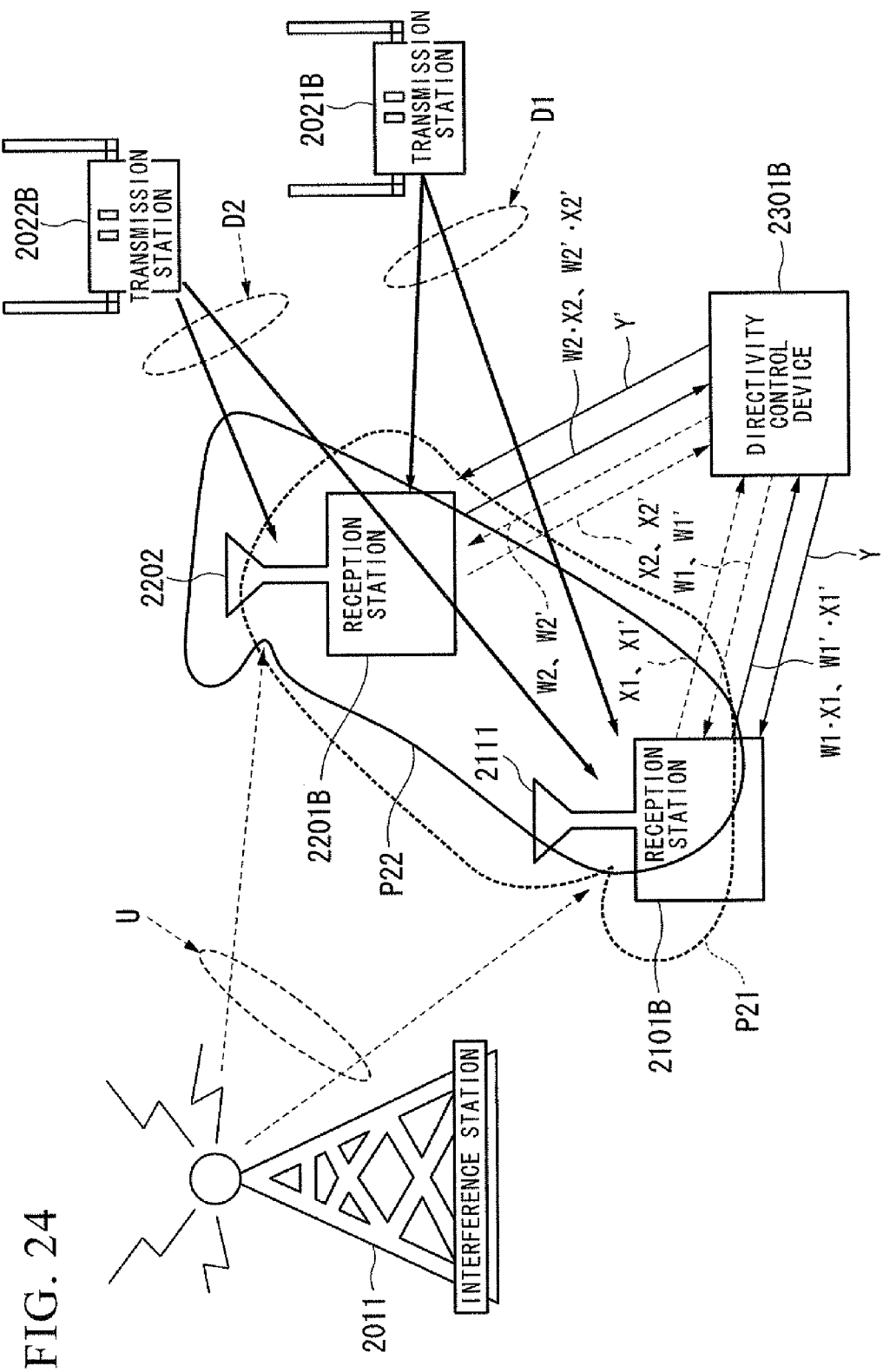
FIG. 24 shows a configuration of a directivity control system according to a thirteenth embodiment of the present invention.

FIG. 24 shows an entire configuration of a directivity control system according to a thirteenth embodiment of the present invention.

In an example shown in FIG. 24, a CSMA scheme is used for communication, and a plurality of clients share the same line. One client, before initiating communication, attempts reception once to check if there is a host currently performing communication, and initiates communication when the other client does not perform communication.

The directivity control system according to the thirteenth embodiment shown in FIG. 24 differs from that according to the ninth embodiment shown in FIG. 17 in that in the example shown in FIG. 17, a TDMA scheme (synchronous scheme) is used as a communication scheme and in the example shown in FIG. 24, the CSMA scheme (asynchronous scheme) is used as a communication scheme. The other portions of the configuration are the same as in FIG. 17.

Figure 25:
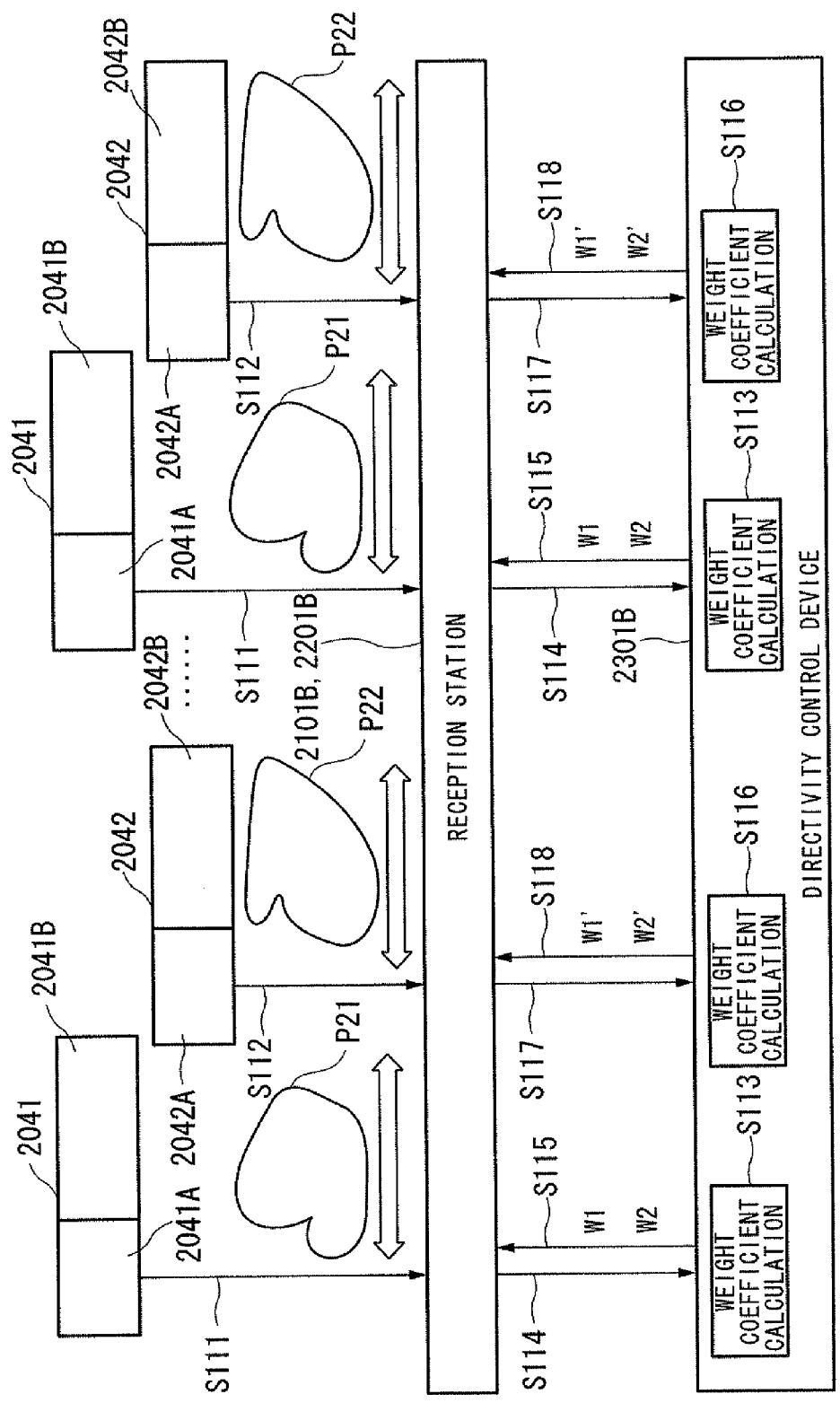
FIG. 25 shows a transmission timing for weight coefficients in a CSMA scheme.

In the example shown in FIG. 24, a reception station 2101B receives a desired signal D1 from a transmission station 2021B using a CSMA frame 2041 at which the transmission station 2021 and the reception station 2101 performs communication, as shown in FIG. 25.

A reception station 2201B also receives a desired signal D2 from a transmission station 2022B using a CSMA frame 2042 at which the transmission station 2022 and the reception station 2201 perform communication.

Thus, the reception station 2101B and the reception station 2201B receive the signal from the transmission station at a different timing using a different CSMA frame. The first timing described above corresponds to, for example, a timing of the CSAM frame 2041, and the second timing described above corresponds to, for example, a timing of the CSAM frame 2042.

In FIG. 24, the reception station 2101B receives an interference signal U from an interference station 2011 as well as an original desired signal D1 from the transmission station 2021B at a timing of the CSMA frame 2041 when the transmission station 2021B and the reception station 2101B perform communication. The reception station 2101B also receives a desired signal D2, which is not an original desired signal, from the transmission station 2022B and the interference signal U from the interference station 2011 at a timing of the CSMA frame 2042 when the transmission station 2022B and the reception station 2201B perform communication.

Meanwhile, the reception station 2201B receives the interference signal U from the interference station 2011 as well as an original desired signal D2 from the transmission station 2022B at the timing of the CSMA frame 2042 when the transmission station 2022B and the reception station 2201B perform communication. The reception station 2201B also receives a desired signal D1, which is not an original desired signal, from the transmission station 2021B and receives the interference signal U from the interference station 2011 at the timing of the CSMA frame 2041 when the transmission station 2021B and the reception station 2101B perform communication.

In the example shown in FIG. 24, the antennas of the reception station 2101B and the reception station 2201B, which do not form an array antenna together, are combined to be regarded as one array antenna system, and a directivity control device 2301B assigns a weight to an array antenna phase from the synthesized signal of the desired signal and the interference signal U received in the reception station 2101B and the reception station 2201B or from the interference signal.

Through the weight assignment, a directivity pattern P21 having a null in an arrival direction of the interference signal in the reception station 2101B and a high directivity in the arrival direction of the desired signal D1 from the transmission station 2021B is formed when the reception station 2101B receives the signal from the transmission station 2021B. Alternatively, a directivity pattern having the null in the arrival direction of the interference signal in the reception station 2101B is formed.

A directivity pattern P22 having a null in an arrival direction of the interference signal in the reception station 2201B and a high directivity in an arrival direction of the desired signal D2 from the transmission station 2022B is also formed when the reception station 2201E receives the signal from the transmission station 2022B. Alternatively, a directivity pattern having the null in the arrival direction of the interference signal in the reception station 2201B is formed.

When the directivity control device 2301 performs the weight assignment (obtains the weight coefficients), the directivity control device 2301 may use the above-described power inversion adaptive array antenna (PIAA antenna) scheme.

According to the procedure, the directivity control device 2301B calculates a weight coefficient W1 for the received signal X1, a weight coefficient W2 for the received signal X2, a weight coefficient W1' for the received signal X1', and a weight coefficient W2' for the received signal X2'.

The directivity control device 2301B transmits the weight coefficient W1 to the reception station 2101B and the weight coefficient W2 to the reception station 2201B at a timing of the CSMA frame 2041. The directivity control device 2301B also transmits the weight coefficient W1' to the reception station 2101B and the weight coefficient W2' to the reception station 2201B at a timing of the CSMA frame 2042.

The reception station 2101B multiplies the weight coefficient W1 received from the directivity control device 2301 by the received signal X1 to obtain (W1·X1) at the timing of the CSMA frame 2041, and transmits a signal of the product W1·X1 to the directivity control device 2301B. The reception station 2101B also multiplies the weight coefficient W1' received from the directivity control device 2301B by the received signal X1' to obtain (W1'·X1') and transmits a signal of the product W1'·X1' to the directivity control device 2301B at the timing of the CSMA frame 2042.

Meanwhile, the reception station 2201B multiplies the weight coefficient W2 received from the directivity control device 2301B by the received signal X2 to obtain (W2·X2) at the timing of the CSMA frame 2041, and transmits a signal of the product W2·X2 to the directivity control device 2301B. The reception station 2201B also multiplies the weight coefficient W2 received from the directivity control device 2301B' by the received signal X2' to obtain (W2'·X2') at the timing of the CSMA frame 2042, and transmits a signal of the product W2'·X2' to the directivity control device 2301B.

The directivity control device 2301B obtains a sum Y based on the signal of the product W1·X1 received from the reception station 2101B and the signal of the product W2·X2 received from the reception station 2201B, at a timing of the CSMA frame 2041.

Sum $Y = W1 \cdot X1 + W2 \cdot X2$

The directivity control device 2301B transmits a signal of the sum Y (Y=W1·X1+W2·X2) to the reception station 2101B. The reception station 2101B takes the signal of the sum Y received from the directivity control device 23018, as a received signal.

Further, the directivity control device 2301B obtains a sum Y' based on the signal of the product received from the reception station 2101B and the signal of the product W2'·X2' received from the reception station 2201B at the timing of the CSMA frame 2042.

Sum $Y' = W1' \cdot X1' + W2' \cdot X2'$

The directivity control device 2301B transmits the signal of the sum Y' (Y'=W1'·X1'+W2'·X2') to the reception station 2201B. The reception station 2201B takes the signal of the sum Y' received from the directivity control device 2301B, as a received signal.

Thus, in the communication system using the CSMA scheme, the reception station 2101B having no array antenna can be combined with the antenna of the peripheral reception station 2201B to form one array antenna, making it possible to achieve an interference suppression effect of the array antenna without affecting the scale of the device. Similarly, the reception station 2201B having no array antenna can be combined with the antenna of the peripheral reception station 2101B to form one array antenna, making it possible to achieve an interference suppression effect of the array antenna without affecting the scale of the device.

Accordingly, even when the reception station 2101B and the reception station 2201B are small reception station devices (e.g., mobile phones) having no array antenna, it is possible to suppress an interference through antenna directivity control. An antenna directivity upon signal reception in the reception station 2101B and the reception station 2201B may be used even upon signal transmission.

Further, an algorithm for obtaining the weight coefficients in the directivity control device 2301B is not limited to the above-described power inversion adaptive array antenna (PIAA antenna) scheme. For example, any algorithm, including zero forcing (ZF) and minimum mean square error (MMSE), is available as a control algorithm. Further, any control index, including reception power, reception SI, reception error rate, and so on, is available as a control index.

FIG. 25 shows a weight coefficient transmission timing in a CSMA scheme. A flow of a process of transmitting and receiving weight coefficients between the control device and the reception station in the CSMA scheme described above is shown.

In the example shown in FIG. 25, the transmission station 2021B and the transmission station 2022B shown in FIG. 24 are not synchronized (perform communication in the CSMA scheme). The directivity control device 2301B stores the weight coefficients W1, W2, W1' and W2' and transmits the weight coefficients to the reception station 2101B and the reception station 2201B.

In FIG. 25, a CSMA frame 2041 with which the transmission station 2021B and the reception station 2101B perform communication consists of a preamble 2041A and a data block 2041B. Further, a CSMA frame 2042 with which the transmission station 2022B and the reception station 2201B perform communication consists of a preamble 2042A and a data block 2042B.

Using the preamble 2041A of the CSMA frame 2041, the reception station 2101B detects the transmission station 2021B (step S111). Using the preamble 2042A of the CSMA frame 2042, the reception station 2201B detects the transmission station 2022B (step S112).

Then, communication between the transmission station 2021B and the reception station 2101B and communication between the transmission station 2022B and the reception station 2201B are initiated. When the communication between the transmission station and the reception station is initiated, communication between the reception station 2101B and the directivity control device 2301B and communication between the reception station 2201B and the directivity control device 2301B are also initiated.

The directivity control device 2301B receives a received signal X1 from the reception station 2101B and a received signal X2 from the reception station 2201B at a timing of the CSMA frame 2041. Based on the received signals X1 and X2, the directivity control device 2301B calculates weight coefficients W1 and W2 using the above-described power inversion adaptive array antenna (PIAA antenna) scheme (step S113).

Where a preamble signal is available as the received signal required for calculating the weight coefficient, the preamble signal may be used to calculate the weight coefficient.

When the weight coefficients W1 and W2 have been calculated, a calling signal for the weight coefficients W1 and W2 for forming the directivity pattern P21 is transmitted from the reception station 2101B to the directivity control device 2301B at a first timing of the CSMA frame 2041 (step S114), and the weight coefficients W1 and W2 are transmitted from the directivity control device 2301B to the reception station 2101B (step S115). Then, the transmission of the weight coefficients W1 and W2 is continued until the communication between the transmission station 2021B and the reception station 2101B stops.

The directivity control device 2301B receives the received signal X1' from the reception station 2101B and the received signal X2' from the reception station 2201B at a timing of the CSMA frame 2042, and calculates the weight coefficients W1' and W2' based on the received signals X1' and X2' using the above-described power inversion adaptive array antenna (PIAA antenna) scheme (step S116). The weight coefficients W1' and W2' are stored in the directivity control device 2301.

When the weight coefficients W1' and W2' have been calculated, a calling signal for the weight coefficients W1' and W2' for forming the directivity pattern P22 is transmitted from the reception station 2201B to the directivity control device 2301B at a first timing of the CSMA frame 2042 (step S117), and the weight coefficients W1' and W2' are transmitted from the directivity control device 2301B to the reception station 2201B (step S118). Then, the transmission of the weight coefficients W1' and W2' is continued until the communication between the transmission station 2021B and the reception station 2201B stops.

Figure 26:
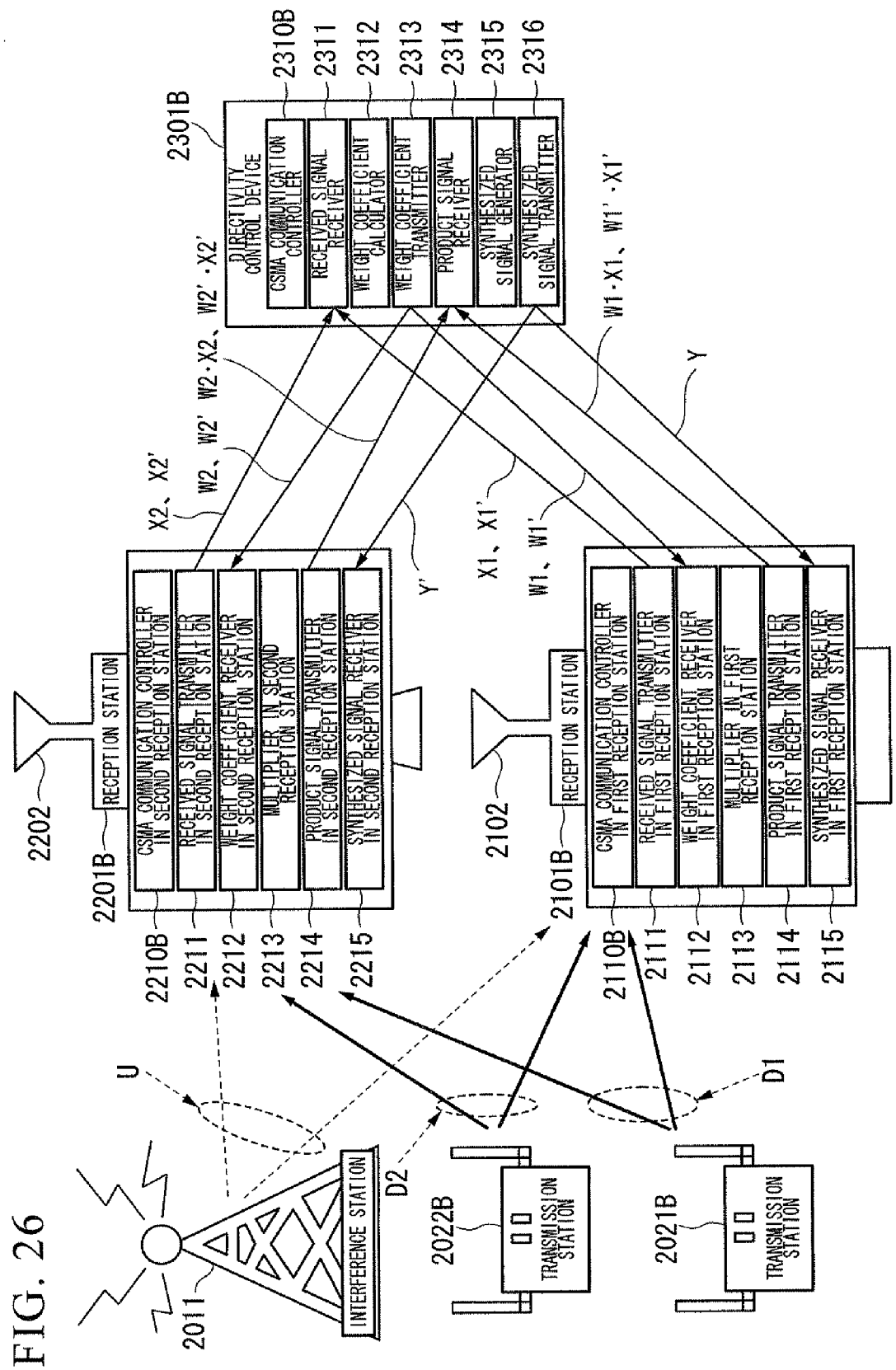
FIG. 26 shows an example of a configuration of each portion in the directivity control system shown in FIG. 24.

FIG. 26 shows an example of a configuration of the reception station 2101B, the reception station 2201B, and the directivity control device 2301B in the directivity control system according to the thirteenth embodiment of the present invention.

The configuration of the directivity control system in the thirteenth embodiment shown in FIG. 26 differs from that of the ninth embodiment shown in FIG. 19 in that the TDMA communication controller 2310 in the directivity control device 2301 shown in FIG. 19 is replaced with a CSMA communication controller 2310B in a directivity control device 2301B shown in FIG. 26. The configuration of the directivity control system in the thirteenth embodiment shown in FIG. 26 also differs from that of the ninth embodiment shown in FIG. 19 in that the TDMA communication controller 2110 in the first reception station in the reception station 2101 shown in FIG. 19 is replaced with a CSMA communication controller 2110B in a first reception station in a reception station 2101B shown in FIG. 26. The configuration of the directivity control system in the thirteenth embodiment shown in FIG. 26 also differs from that of the ninth embodiment shown in FIG. 19 in that the TDMA communication controller 2210 in the second reception station in the reception station 2201 shown in FIG. 19 is replaced with a CSMA communication controller 2210B in a second reception station in a reception station 2201B shown in FIG. 26. The other portions of the configuration are the same as in FIG. 19. Accordingly, like elements are designated by like reference numerals and an overlapping description thereof will be omitted.

The CSMA communication controller 2310B in the directivity control device 2301B performs a communication control process for transmitting and receiving a signal to and from the reception station 2101B and the reception station 2201B using a CSMA scheme. The other configuration portions are the same as in FIG. 19.

The CSMA communication controller 2110B in the first reception station performs a process for performing communication with the transmission station 2021B using the CSMA frame. The CSMA communication controller 2110B also performs a communication control process when communicating with the directivity control device 2301B. The other configuration portions are the same as in FIG. 19.

The CSMA communication controller 2210B in the second reception station 2201B performs a process for performing communication with the transmission station 2022B using the CSMA frame. The CSMA communication controller 2210B also performs a communication control process when communicating with the directivity control device 2301B. The other configuration portions are the same as in FIG. 19.

Fourteenth Embodiment

Figure 27:
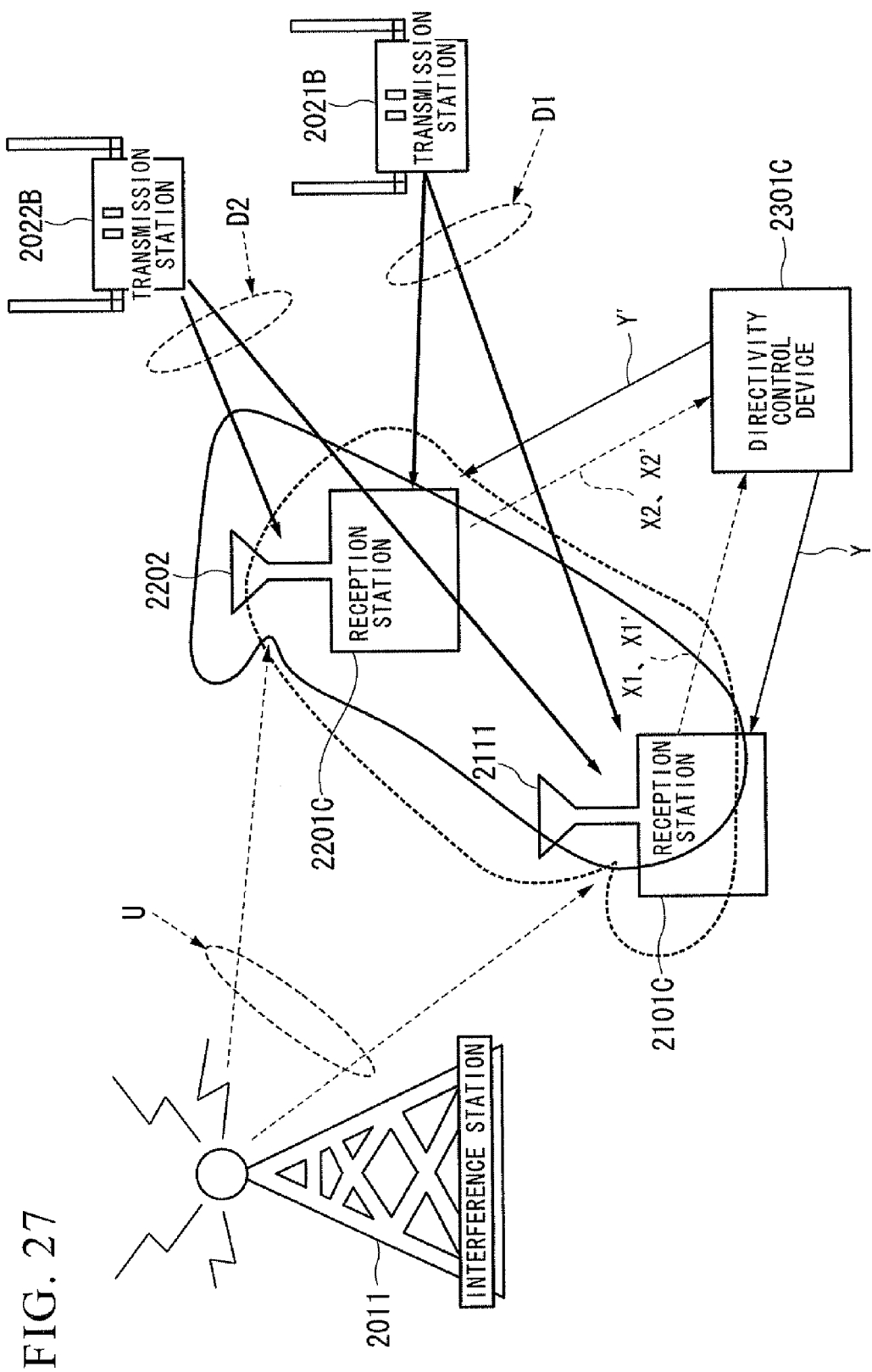
FIG. 27 shows a configuration of a directivity control system according to a fourteenth embodiment of the present invention.

FIG. 27 shows an entire configuration of a directivity control system according to a fourteenth embodiment of the present invention. In an example shown in FIG. 27, a CSAM scheme is used, as in the example shown in FIG. 24.

In the thirteenth embodiment shown in FIG. 24, the directivity control device 2301B transmits the weight coefficients W1 and W1' to the reception station 2101B and transmits the weight coefficients W2 and W2' to the reception station 2201B. In the fourteenth embodiment of the present invention shown in FIG. 27, an example in which a directivity control device 2301C does not transmit the weight coefficients W1 and W1' to a reception station 2101C and does not the weight coefficients W2 and W2' to a reception station 2201C will be described.

In the directivity control system shown in FIG. 27, the reception station 2101C and the reception station 2201C, which do not form an array antenna together, can be combined to be regarded as one array antenna system, and the directivity control device 2301C assigns a weight to an array antenna phase from a synthesized signal of a desired signal and an interference signal U received in the reception station 2101C and the reception station 2201C, or from the interference signal, as in the example shown in FIG. 24.

Through the weight assignment, a directivity pattern P21 having a null in an arrival direction of the interference signal in the reception station 2101C and a high directivity in an arrival direction of the desired signal D1 from the transmission station 2021B is formed. Alternatively, a directivity pattern having a null in the arrival direction of the interference signal in the reception station 2101C is formed.

Further, a directivity pattern P22 having a null in an arrival direction of the interference signal in the reception station 2201C and a high directivity in an arrival direction of a desired signal D2 from the transmission station 2022B is formed. Alternatively, a directivity pattern having the null in the arrival direction of the interference signal is formed in the reception station 2201C.

In order to form the directivity pattern, the reception station 2101C transmits the received signal X1 to the directivity control device 2301C at a timing of the CSAM frame 2041, and transmits the received signal X1' to the directivity control device 2301C at a timing of the CSAM frame 2042. The reception station 2201C transmits the received signal X2 to the directivity control device 2301A at a timing of the CSAM frame 2041, and transmits the received signal X2' to the directivity control device 2301C at a timing of the CSAM frame 2042.

The directivity control device 2301C multiplies the received signal X1 received from the reception station 2101C by the weight coefficient W1 and the received signal X2 received from the reception station 2201C by the weight coefficient W2 at a timing of the CSAM frame 2041 to generate a signal of a sum Y ($Y = W1 \cdot X1 + W2 \cdot X2$), and transmits the signal to the reception station 2101C.

Further, the directivity control device 2301C multiplies the received signal X1' received from the reception station 2201C by the weight coefficient W1' and the received signal X2 received from the reception station 2201C' by the weight coefficient W2' at a timing of the CSAM frame 2042 to generate a signal of the sum Y' ($Y' = W1' \cdot X1' + W2' \cdot X2'$), and transmits the signal to the reception station 2201C.

As described above, the configuration example shown in FIG. 27 differs from that of the thirteenth embodiment shown in FIG. 24 in that the directivity control device 2301B in the example shown in FIG. 24 transmits the weight coefficients W1 and W1' to the reception station 2101B and the weight coefficients W2 and W2' to the reception station 2201B, and the directivity control device 2301C in the example shown in FIG. 27 does not transmit the weight coefficients W1 and W1' to the reception station 2101C and does not transmit the weight coefficients W2 and W2 to the reception station 2201C. The configuration example shown in FIG. 27 also differs from that of the thirteenth embodiment shown in FIG. 24 in that the directivity control device 2301C multiplies the weight coefficient by the received signal.

Thus, the directivity control device 2301C performs the process of multiplying the received signal by the weight coefficient, making it unnecessary to transmit the weight coefficient signal from the directivity control device to the reception station. It is also possible to eliminate the process of multiplying the received signal by the weight coefficient in the reception station, thereby simplifying a process in the reception station.

Figure 28:
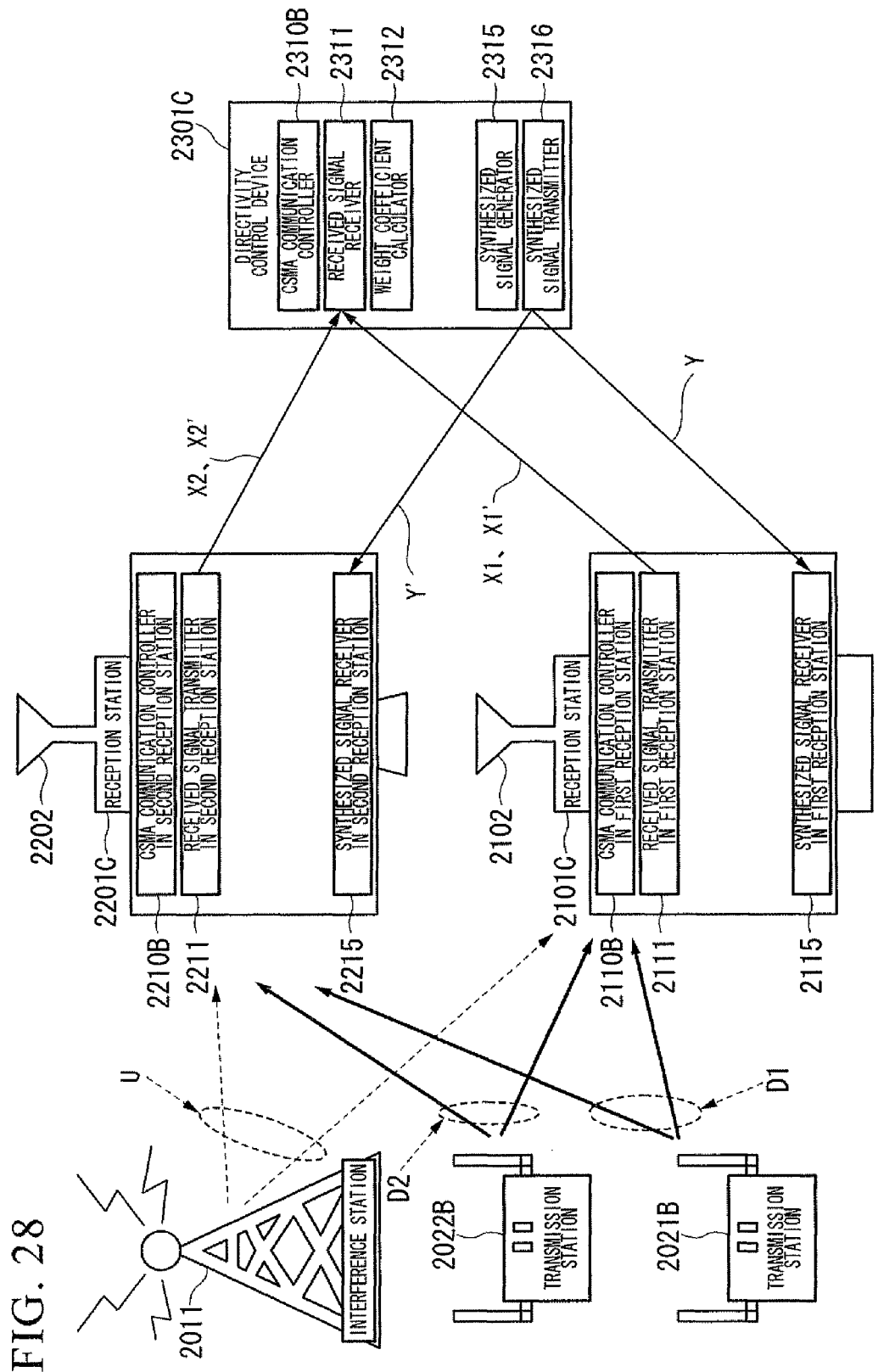
FIG. 28 shows an example of a configuration of each portion in the directivity control system shown in FIG. 26.

FIG. 28 shows an example of a configuration of the reception station 2101C, the reception station 2201C, and the directivity control device 2301C in the directivity control system according to the twelfth embodiment of the present invention.

In the configuration example shown in FIG. 28, the weight coefficient transmitter 2313 and the product signal receiver 2314 in the directivity control device 2301B shown in FIG. 26 are omitted, unlike the configuration example of the thirteenth embodiment shown in FIG. 26. The weight coefficient receiver 2112 in the first reception station, the multiplier 2113 in the first reception station, and the product signal transmitter 2114 in the first reception station in the reception station 2101B shown in FIG. 26 are also omitted. The weight coefficient receiver 2212 in the second reception station, the multiplier 2213 in the second reception station, and the product signal transmitter 2214 in the second reception station in the reception station 2201B shown in FIG. 26 are also omitted.

That is, since, in the configuration example shown in FIG. 28, the signals of the weight coefficients W1, W2, W1' and W2' are not transmitted from the directivity control device 2301C to the reception station 2101C and the reception station 2201C, and the process of multiplying the received signal by the weight coefficient in the reception station 2101C and the reception station 2201C is not performed, related processing units are omitted. The process of multiplying the received signal by the weight coefficient is performed by the synthesized signal generator 2315 in the directivity control device 2301C. The other portions of the configuration are the same as in FIG. 26. Accordingly, like elements are designated by like reference numerals and an overlapping description thereof will be omitted.

Although, in the ninth and fourteenth embodiments of the present invention, the example in which the reception station receives the desired signal from the transmission station have been described, the present invention is not limited thereto and the reception station may receive and transmit the desired signal. Similarly, although, in the ninth to fourteenth embodiments, the example in which the transmission station transmits the desired signal to the reception station have been described, the present invention is not limited thereto and the transmission station may transmit and receive the desired signal.

Fifteenth Embodiment

Figure 29:
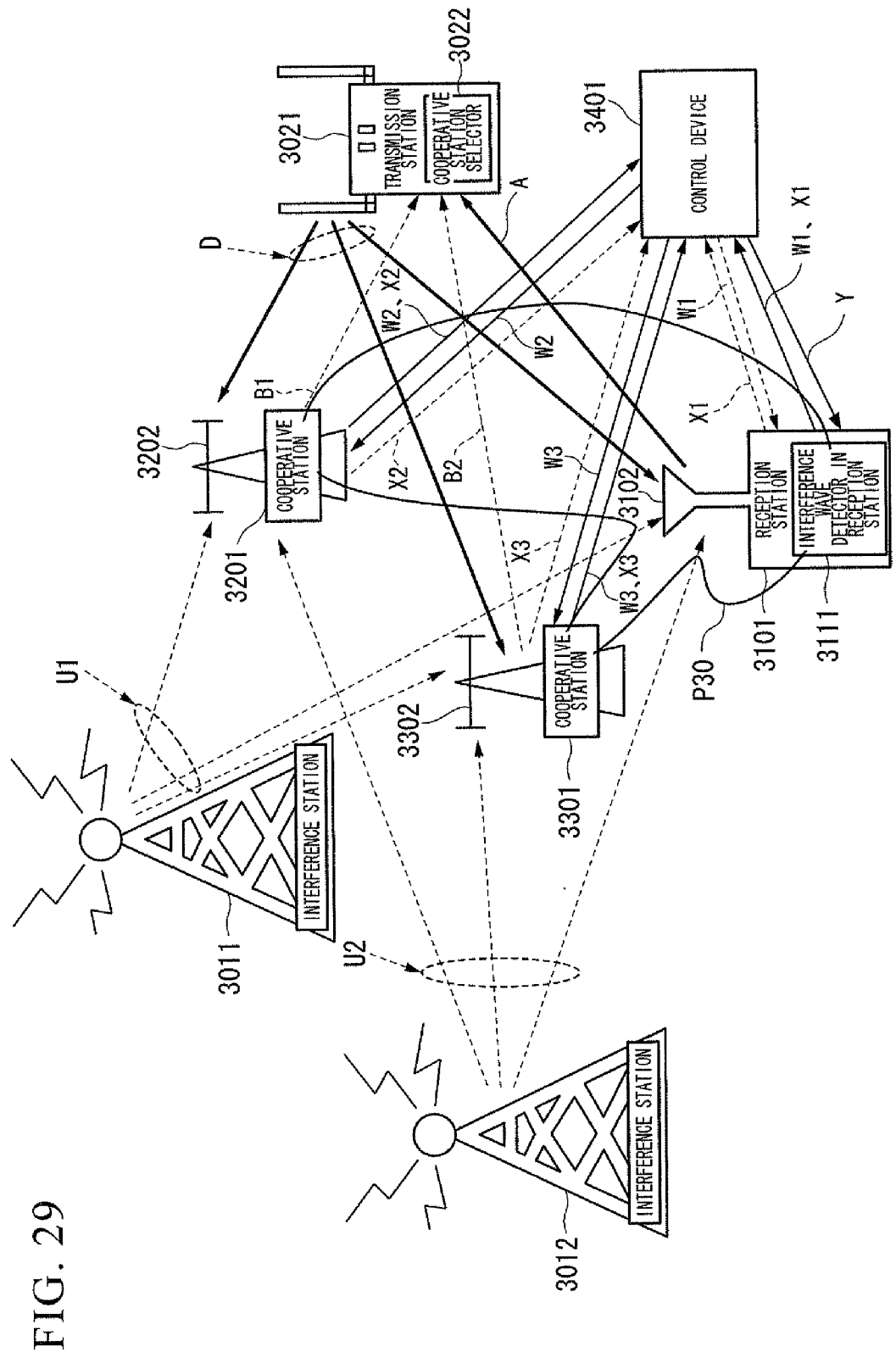
FIG. 29 shows a configuration of a directivity control system according to a fifteenth embodiment of the present invention.

FIG. 29 shows an entire configuration of a directivity control system according to a fifteenth embodiment of the present invention. In an example shown in FIG. 29, a plurality of cells/systems share the same frequency at the same time and the same place, and a plurality of interference signals arrive.

In FIG. 29, the directivity control system detects the number of interference waves received by a reception station 3101 and transmits the interference wave number as an interference wave notification signal A to a cooperative station selector 3022 in a transmission station 3021. The cooperative station selector 3022 receives interference-wave reception state information as reception state notification signals B1 and B2 from cooperative stations under the cooperative station selector (in this example, the cooperative station 3201 and the cooperative station 3301).

The cooperative station selector 3022 selects cooperative stations based on the interference wave number reported by the reception station 3101 and the information on the interference-wave reception state in each cooperative station, and sends a cooperation request signal to the selected cooperative stations. In the example shown in FIG. 29, the cooperative station 3201 and the cooperative station 3301 are selected and the cooperation request signal is transmitted from the transmission station 3021 to the cooperative station 3201 and the cooperative station 3301.

Accordingly, an antenna 3102 of the reception station 3101 and antennas 3202 and 3302 of the cooperative stations 3201 and 3301 selected according to the interference wave number received from the reception station 3101, which do not form an array antenna, are combined to form one array antenna system. A control device 3401 assigns a weight to an array antenna phase from a synthesized signal of a desired signal D and interference signals U1 and U2 received in the respective stations or from the interference signals U1 and U2 to form, in the array antenna, a directivity pattern P30 having a null in an arrival direction of the respective interference signals U1 and U2 and a high directivity in an arrival direction of the desired signal D. Alternatively, a directivity pattern having the null in the arrival direction of the respective interference signals U1 and U2 is formed in the array antenna.

The control device 3401 may use, for example, the power inversion adaptive array antenna (PIAA antenna) scheme when calculating weight coefficients to assign a weight to a received signal from each station device. Hereinafter, a procedure of using the power inversion adaptive array antenna (PIAA antenna) scheme will be described.

In FIG. 29, the reception station 3101 receives the desired signal D from the transmission station 3021, the interference signal U1 from the interference station 301 and the interference signal U2 from the interference station 3012 using the antenna 3102. The received signal X1 received using the antenna 3102 is transmitted to the control device 3401.

Using the antenna 3202, the cooperative station 3201 receives the desired signal D from the transmission station 3021, the interference signal U1 from the interference station 301, and the interference signal U2 from the interference station 3012. The received signal X2 received using the antenna 3202 is transmitted to the control device 3401. Using the antenna 3302, the cooperative station 3301 receives the desired signal D from the transmission station 3021, the interference signal U1 from the interference station 301, and the interference signal U2 from the interference station 3012. The received signal X3 received using the antenna 3302 is transmitted to the control device 3401.

In the fifteenth embodiment, transmission of the received signal X1 from the reception station 3101 to the control device 3401, transmission of the received signal X2 from the cooperative station 3201 to the control device 3401, and transmission of the received signal X3 from the cooperative station 3301 to the control device 3401 are performed only when the weight coefficients are calculated (normally, a signal of a product of the weight coefficient and the received signal, which will be described below, is transmitted).

Based on the received signals X1, X2, and X3, the control device 3401 calculates the weight coefficient W using the following equation so that reception power in the reception station 3101 is minimized.

First, a correlation matrix R of the received signals X1, X2 and X3 is obtained.

$$R = \begin{bmatrix} x_1 x_1^* & x_1 x_2^* & x_1 x_3^* \\ x_2 x_1^* & x_2 x_2^* & x_2 x_3^* \\ x_3 x_1^* & x_3 x_2^* & x_3 x_3^* \end{bmatrix} \quad \text{[Equation 7]}$$

Subsequently, an optimal weight coefficient W is obtained from an inverse matrix of the correlation matrix R and a transpose matrix of a steering vector S (1, 0, 0). The steering vector S (1, 0, 0) is used to fix a weight coefficient of one of the antennas.

$$W = R^{-1} S$$

$$S = [1 \ 0 \ 0]^T \quad \text{[Equation 8]}$$

A weight coefficient W1 for the received signal X1, a weight coefficient W2 for the received signal X2, and a weight coefficient W3 for the received signal X3 are calculated from the optimal weight coefficient W.

$$W = [w_1 w_2 w_3]^T \quad \text{[Equation 9]}$$

When the weight coefficient W1 for the received signal X1, the weight coefficient W2 for the received signal X2 and the weight coefficient W3 for the received signal X3 have been calculated according to the procedure, the control device 3401 transmits the weight coefficient W1 for the received signal X1 to the reception station 3101, the weight coefficient W2 for the received signal X2 to the cooperative station 3201, and the weight coefficient W3 for the received signal X3 to the cooperative station 3301.

The reception station 3101 multiplies the weight coefficient W1 received from the control device 3401 by the received signal X1 to obtain (W1·X1), and transmits a signal of the product W1·X1 to the control device 3401. Meanwhile, the cooperative station 3201 multiplies the weight coefficient W2 received from the control device 3401 by the received signal X2 to obtain (W2·X2), and transmits a signal of the product W2·X2 to the control device 3401. The cooperative station 3301 also multiplies the weight coefficient W3 received from the control device 3401 by the received signal X3 to obtain (W3·X3), and transmits a signal of the product W3·X3 to the control device 3401.

The control device 3401 obtains a sum Y based on the signal of the product W1·X1 received from the reception station 3101, the signal of the product W2·X2 received from the cooperative station 3201, and the signal of the product W3·X3 received from the cooperative station 3301.

Sum $Y = W1 \cdot X1 + W2 \cdot X2 + W3 \cdot X3$

The control device 3401 transmits the signal of the sum Y (Y=W1·X1+W2·X2+W3·X3) to the reception station 3101. The reception station 3101 takes the signal of the sum Y received from the control device 3401, as a received signal.

Thus, the reception station 3101 having no array antenna can be combined with the antennas of the peripheral cooperative stations 3201 and 3301 to form one array antenna. It is possible to form a directivity pattern having a null in an arrival direction of a plurality of interference signals and a high directivity in an arrival direction of the desired signal in the array antenna. It is also possible to form, in the array antenna, a directivity pattern having a null in an arrival direction of a plurality of interference signals. Thus, it is possible to achieve an interference suppression effect of the array antenna without affecting the scale of the device, thereby suppressing the interference through antenna directivity control when the reception station 3101 is a small reception station device (e.g., mobile phone) having no array antenna.

The cooperative station may be any other reception station, and a directivity pattern of the array antenna formed upon signal reception in the reception station may be used even upon signal transmission in the reception station.

Further, an algorithm for obtaining the weight coefficients in the control device 3401 is not limited to the above-described power inversion adaptive array antenna (PIAA antenna) scheme. For example, any algorithm, including zero forcing (ZF) and minimum mean square error (MMSE), is available as a control algorithm. Further, any control index, including reception power, reception SI, reception error rate, and so on, is available as a control index.

Figure 30:
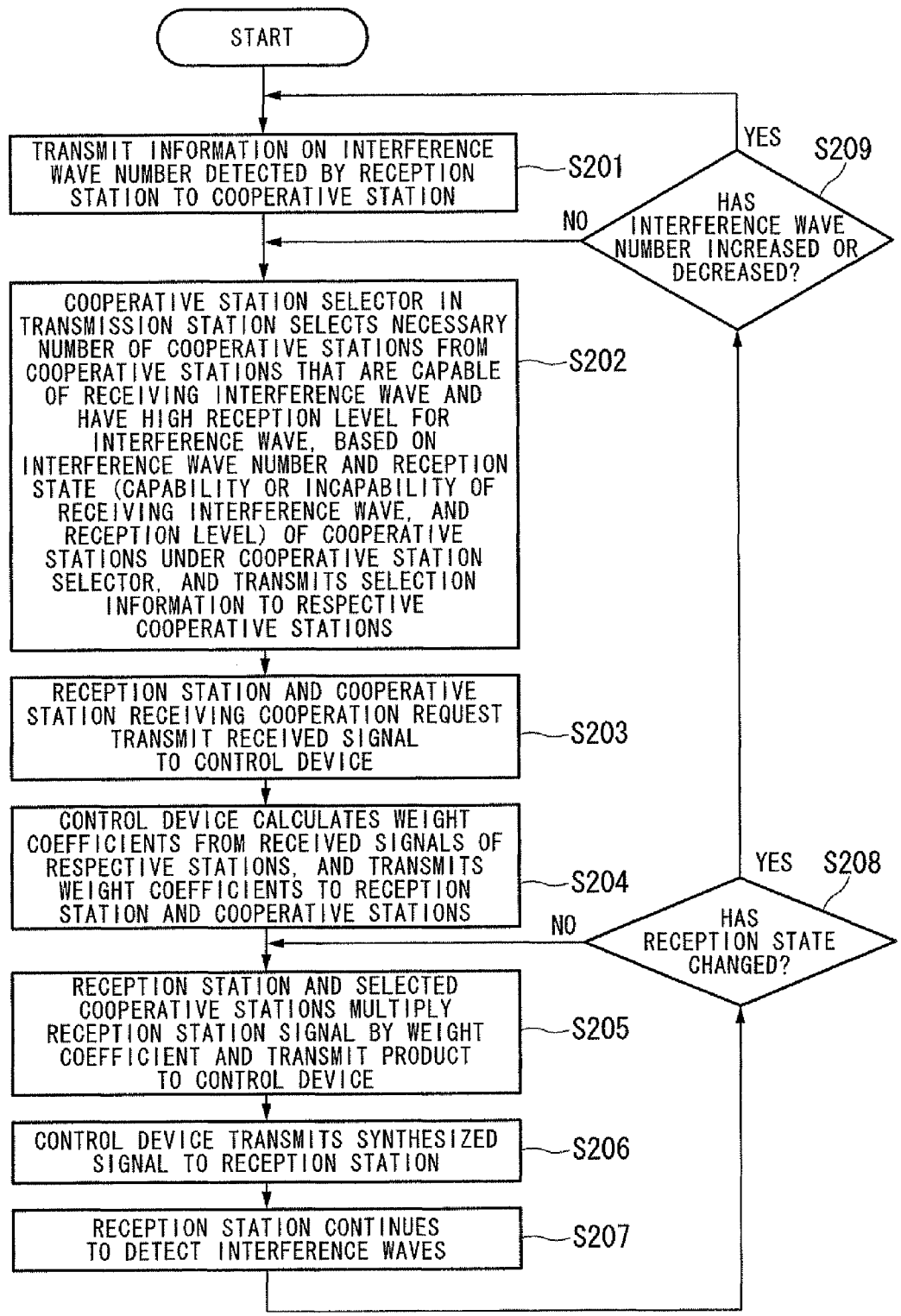
FIG. 30 shows an overview of a process flow in the directivity control system shown in FIG. 29.

FIG. 30 shows an overview of a process flow in the directivity control system shown in FIG. 29.

Hereinafter, the overview of the process flow will be described with reference to FIG. 30.

First, the reception station 3101 transmits information on a detected interference wave number to the cooperative station selector 3022 in the transmission station 3021 (step S201).

The reception station 3101 detects the interference wave number by detecting received waves when not communicating with a desired system, evaluating energy of the received waves, detecting a correlation of a signal (e.g., coded signal) specific to a wireless station that is an interference source, or sharing information on the number of connected terminals among a plurality of systems present in the same area.

In addition, the reception station 3101 may detect the interference wave number by changing the number of cooperative stations used for interference compensation control to detect a remaining interference amount in a reception station of a desired system and obtain an optimal value of an optimal cooperative station number on a trial basis.

When the interference wave number information is received from the reception station 3101, the cooperative station selector 3022 selects a necessary number of cooperative stations from cooperative stations that are capable of receiving the interference wave and have a high reception level for the interference wave, based on the interference wave number information and information on a reception state (interference wave reception and a reception level) of the cooperative stations under the cooperative station selector. Cooperative station selection information is transmitted as a cooperation request signal to the selected cooperative stations (step S202). In the example shown in FIG. 29, two cooperative stations, the cooperative station 3201 and the cooperative station 3301, are selected. Where the cooperative stations are selected, the number of correspondences between the reception station and the selected cooperative stations may be equal to "interference wave number+1" or greater. The cooperation selection information is also transmitted to the control device 3401.

When the cooperative station 3201 and the cooperative station 3301 have been selected, the reception station 3101 transmits the received signal X1 to the control device 3401, the cooperative station 3201 transmits the received signal X2 to the control device 3401, and the cooperative station 3301 transmits the received signal X3 to the control device 3401 (step S203).

The control device 3401 calculates the weight coefficients W1, W2 and W3 based on the received signals X1, X2 and X3 of the respective stations, and transmits the weight coefficient W1 to the reception station 3101, the weight coefficient W2 to the cooperative station 3201, and the weight coefficient W3 to the cooperative station 3301 (step S204).

The reception station 3101 multiplies the received signal X1 by the weight coefficient W1 to obtain (W1·X1) and transmits a product W1·X1 to the control device 3401, the cooperative station 3201 multiplies the received signal X2 by the weight coefficient W2 to obtain (W2·X2) and transmits a product W2·X2 to the control device 3401, and the cooperative station 3301 multiplies the received signal X3 by the weight coefficient W3 to obtain (W3·X3) and transmits a product W3·X3 to the control device 3401 (step S205).

The control device 3401 sums the products (W1·X1, W2·X2, and W3·X3) received from the respective stations, and transmits a signal of a sum Y (Y=W1·X1+W2·X2+W3·X3) to the reception station 3101 (step S206). The reception station 3101 takes the signal of the sum Y as a received signal.

The reception station 3101 then continues to detect interference waves (step S207) and sends reception state information including interference wave information to the cooperative station selector 3022 of the transmission station 3021. The cooperative station selector 3022 determines whether there has been a change in the reception state of the reception station 3101 (step S208).

When the cooperative station selector 3022 determines that there is no change in the reception state (step S208: No), the process proceeds to step S205, in which the reception station 3101 suppresses the interference wave using the current weight coefficient and continues to receive a signal.

On the other hand, when the cooperative station selector 3022 determines that there has been a change in the reception state (step S208: Yes), the reception station 3101 determines whether the interference wave number has increased or decreased. That is, when the interference waves are sufficiently suppressed and eliminated in the reception station 3101, the reception station 3101 determines whether the interference wave number has increased or decreased (step S209).

When the reception station 3101 determines that the interference wave number has not increased or decreased (step S209: No), since there has been a change in the reception state (Yes in step S208), the process proceeds to step S202, in which the cooperative station selector 3022 selects cooperative stations again based on the current interference wave number. When the reception station 3101 determines that the interference wave number has increased or decreased (step S209: Yes), the process proceeds to step S201, in which the reception station 3101 notifies the cooperative station selector 3022 of the interference wave number, and the cooperative station selector 3022 selects cooperative stations again based on a new interference wave number (step S202).

Figure 31:
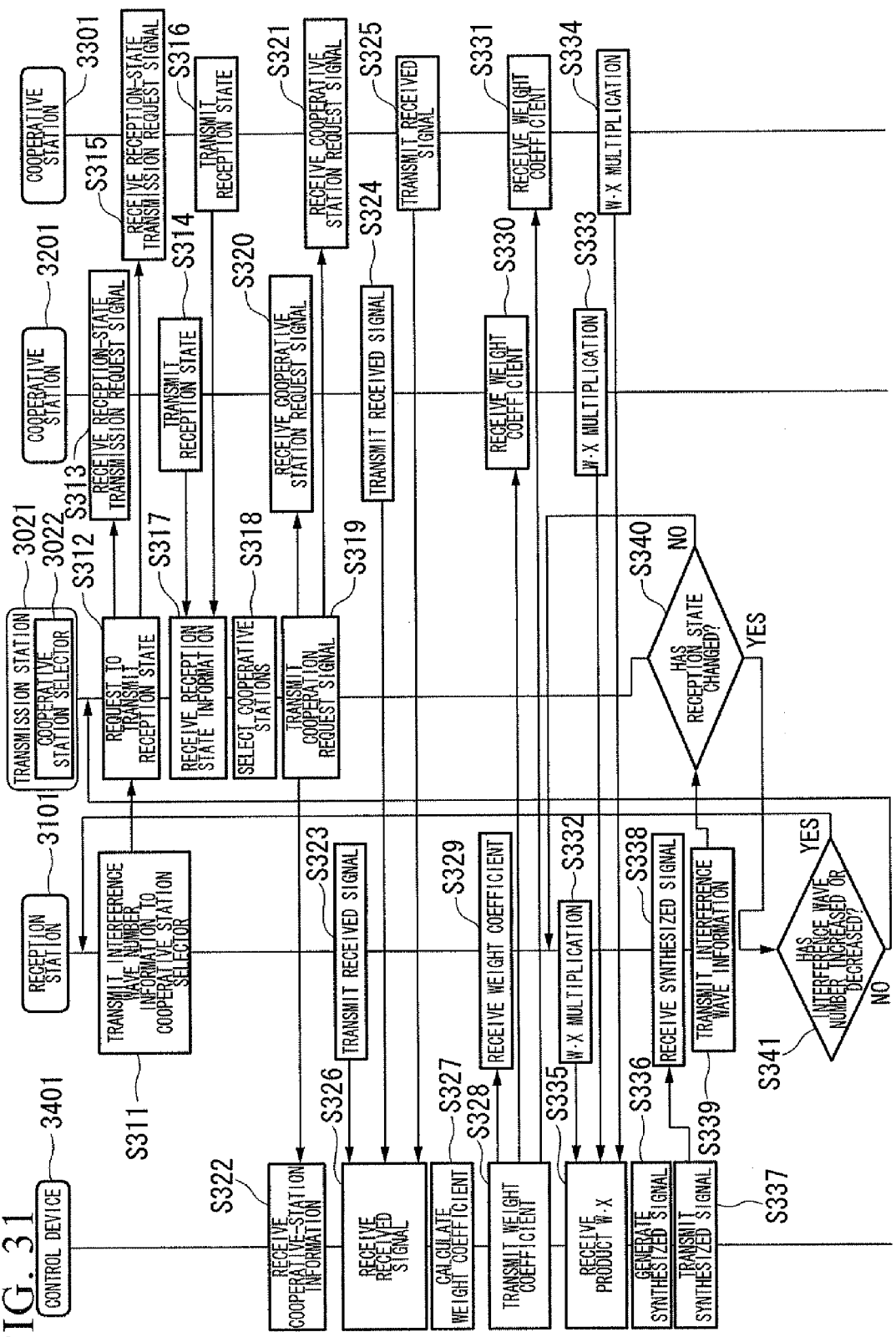
FIG. 31 is a sequence diagram showing a flow of a process in each station device in the directivity control system shown in FIG. 29.

FIG. 31 is a sequence diagram showing a flow of a process in each station device in the directivity control system shown in FIG. 29. The process flow shown in FIG. 30 is shown in detail. Hereinafter, the process flow will be described with reference to FIG. 31. In an example shown in FIG. 31, it is assumed that the cooperative station 3201 and the cooperative station 3301 are selected as cooperative stations.

The reception station 3101 transmits information on the interference wave number to the cooperative station selector 3022 in the transmission station 3021 (step S311).

Based on the interference wave number information received from the reception station 3101, the cooperative station selector 3022 transmits a reception-state transmission request signal to cooperative stations under the cooperative station selector to request the cooperative stations to transmit reception state information for the intended interference wave (step S312).

When the cooperative station 3201 receives the reception-state transmission request signal from the cooperative station selector 3022 (step S313), the cooperative station 3201 transmits the reception state information for the intended interference wave to the cooperative station selector 3022 (step S314). Similarly, when the cooperative station 3301 receives the reception-state transmission request signal from the cooperative station selector 3022 (step S315), the cooperative station 3301 transmits the reception state information for the intended interference wave to the cooperative station selector 3022 (step S316).

The cooperative station selector 3022 receives the interference-wave reception state information from the cooperative station 3201 and the cooperative station 3301 (step S317), and selects cooperative stations for forming an array antenna to suppress the interference wave, based on the interference-wave reception state information from the cooperative station (step S318). The cooperative station selector 3022 transmits a cooperative station request signal to the selected cooperative stations (step S319). In this example, the cooperative station 3201 and the cooperative station 3301 are selected, and a cooperation request signal is transmitted to the cooperative station 3201 (step S320) and to the cooperative station 3301 (step S321). The cooperative-station selection information is also transmitted to the control device 3401 (step S322).

After the selection of the cooperative stations is completed using the above process, the antenna of the reception station 3101, the antenna of the cooperative station 3201, and the antenna of the cooperative station 3301 are formed as an array antenna and a process of receiving a desired signal in the reception station 3101 is initiated.

First, the reception station 3101 transmits the received signal X1 received using its antenna 3102 to the control device 3401 (step S323), the cooperative station 3201 transmits the received signal X2 received using its antenna 3202 to the control device 3401 (step S324), and the cooperative station 3301 transmits the received signal X3 received using its antenna 3302 to the control device 3401 (step S325).

The control device 3401 receives the received signal X1 from the reception station 3101, the received signal X2 from the cooperative station 3201, and the received signal X3 from the cooperative station 3301 (step S326). Based on the received signals X1, X2, and X3, the control device 3401 calculates a weight coefficient W1 for the received signal X1, a weight coefficient W2 for the received signal X2, and a weight coefficient W3 for the received signal X3 so that a directivity pattern of the array antenna has a null in an arrival direction of a plurality of interference signals U1 and U2 in the reception station 3101 and a high directivity in an arrival direction of the desired signal D (step S327).

The weight coefficients W1, W2 and W3 calculated by the control device 3401 are transmitted to the respective stations (step S328). The reception station 3101 receives the weight coefficient W1 (step S329), the cooperative station 3201 receives the weight coefficient W2 (step S330), and the cooperative station 3301 receives the weight coefficient W3 (step S331).

The reception station 3101 multiplies the weight coefficient W1 received from the control device 3401 by the received signal X1 to obtain (W1·X1), and transmits a signal of a product to the control device 3401 (step S332). The cooperative station 3201 multiplies the weight coefficient W2 received from the control device 3401 by the received signal X2 to obtain (W2·X2), and transmits a signal of a product to the control device 3401 (step S333). Further, the cooperative station 3301 multiplies the weight coefficient W3 received from the control device 3401 by the received signal X3 to obtain (W3·X3) and transmits a signal of a product to the control device 3401 (step S334).

The control device 3401 receives the product W1·X1 from the reception station 3101, the product W2·X2 from the cooperative station 3201, and the product W3·X3 from the cooperative station 3301 (step S335). The control device 3401 generates a signal of a sum Y (Y=W1·X1+W2·X2+W3·X3) from the product W1·X1, the product W2·X2, and the product W3·X3 (step S336). The control device 3401 transmits the signal of the sum Y to the reception station 3101 (step S337), and the reception station 3101 takes the signal of the sum Y as a received signal (step S338).

Transmission of the interference wave information from the reception station 3101 to the cooperative station selector 3022 is then continued (step S339). The cooperative station selector 3022 determines whether there has been a change in the reception state in the reception station 3101 (step S340).

When there has been no change in the reception state (step S340: No), the process proceeds to step S332, in which interference wave suppression by the current cooperative stations and weight coefficients is continued. On the other hand, when there has been a change in the reception state (step S340: Yes), the reception station 3101 determines whether the interference wave number has increased or decreased (step S341).

When the interference wave number has not increased or decreased (step S341: No), since there is a change in the reception state (step S340: Yes), the process proceeds to step S312, in which the cooperative station selector 3022 determines an interference wave reception state in each cooperative station again and reexamines cooperative station selection, if necessary.

When the interference wave number has increased or decreased (step S341: Yes), the process proceeds to step S311, in which the reception station 3101 notifies the cooperative station selector 3022 of a new interference wave number, and the cooperative station selector 3022 performs cooperative station selection again.

Figure 32:
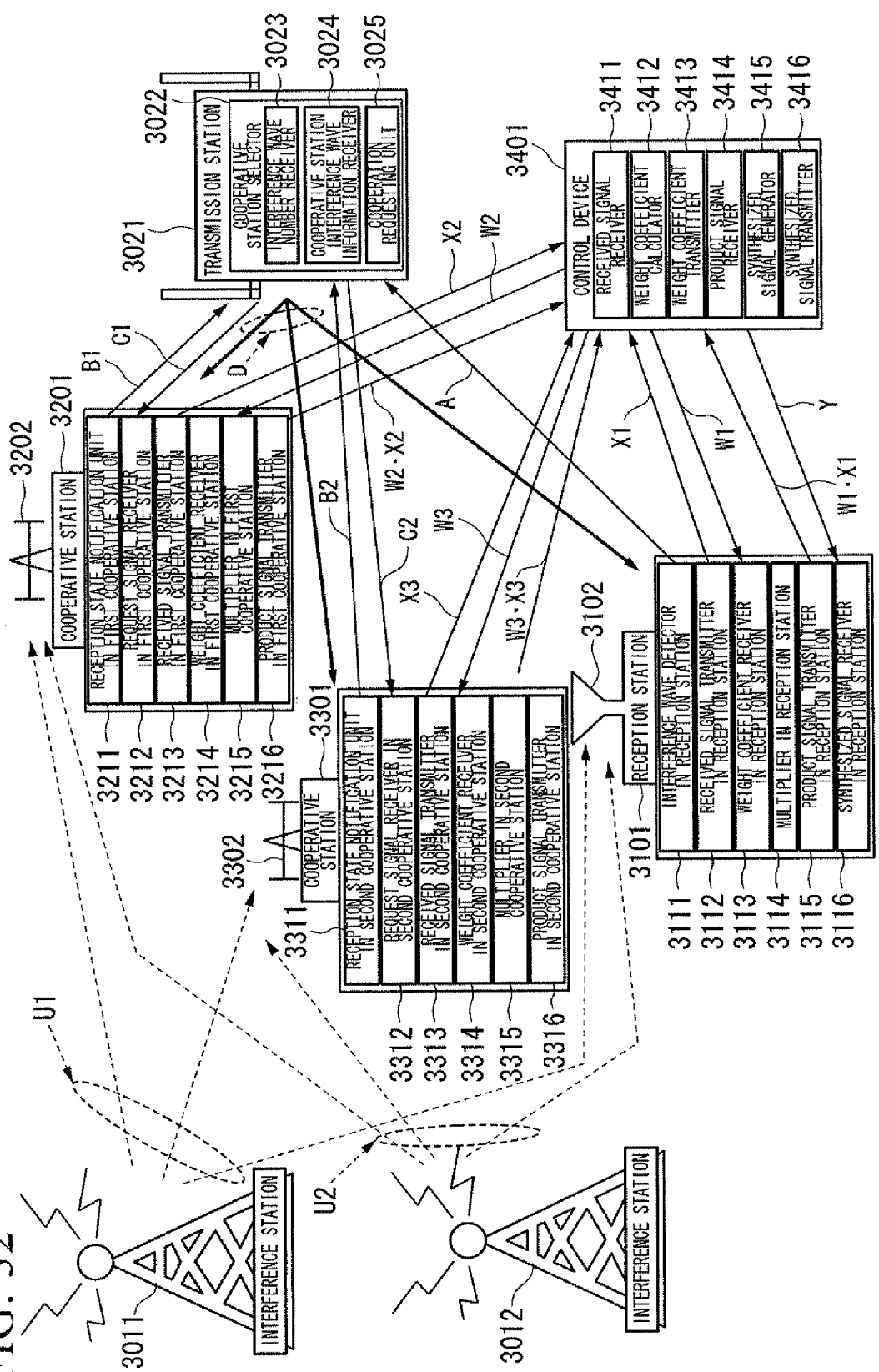
FIG. 32 shows an example of a configuration of each portion in the directivity control system shown in FIG. 29.

FIG. 32 shows an example of a configuration of the reception station 3101, the cooperative station 3201, the cooperative station 3301, and the control device 3401 in the directivity control system according to the fifteenth embodiment of the present invention.

In FIG. 32, the cooperative station selector 3022 in the transmission station 3021 selects cooperative stations for forming an array antenna, based on the interference wave number information received from the reception station 3101 and the interference-wave reception state information from the cooperative stations under the cooperative station selector. Accordingly, the cooperative station selector 3022 has an interference wave number receiver 3023, a cooperative-station interference wave information receiver 3024, and a cooperation requesting unit 3025.

The interference wave information receiver 3023 receives the interference wave number information as an interference wave notification signal A from the reception station 3101. The cooperative-station interference wave information receiver 3024 receives signals of the interference wave reception states as reception state notification signals B1 and B2 from the cooperative stations under the cooperative station selector.

The cooperation requesting unit 3025 transmits a cooperation request signal to the cooperative stations (in this example, the cooperative station 3201 and the cooperative station 3301) selected to form an array antenna. Information on the selected cooperative stations is also transmitted to the control device 3401.

Next, a configuration of the control device 3401 will be described.

A received signal receiver 3411 in the control device 3401 receives the received signal X1, which is received using the antenna 3102 of the reception station 3101, from the reception station 3101, the received signal X2, which is received using the antenna 3202 of the cooperative station 3201, from the cooperative station 3201, and the received signal X3, which is received using the antenna 3302 of the cooperative station 3301, from the cooperative station 3301. The transmission of the received signal X1 from the reception station 3101 to the control device 3401, the transmission of the received signal X2 from the cooperative station 3201 to the control device 3401, and the transmission of the received signal X3 from the cooperative station 3301 to the control device 3401 are performed only when the weight coefficients for the received signals X1, X2 and X3 are calculated (normally, the signal of the product of the weight coefficient and the received signal is transmitted).

Based on the received signals X1, X2, and X3 received by the received signal receiver 3411, a weight coefficient calculator 3412 calculates the weight coefficient W1 of the received signal X1, the weight coefficient W2 of the received signal X2, and the weight coefficient W3 of the received signal X3 so that a directivity pattern of an array antenna formed of the antenna 3102, the antenna 3202, and the antenna 3302 has a null in an arrival direction of a plurality of interference signals and a high directivity in an arrival direction of the desired signal. Alternatively, the weight coefficient calculator 3412 calculates the weight coefficient W1 of the received signal X1, the weight coefficient W2 of the received signal X2, and the weight coefficient W3 of the received signal X3 so that the directivity pattern of the array antenna has the null in the arrival direction of the plurality of interference signals. The above-described power inversion adaptive array antenna (PIAA antenna) scheme may be used to calculate the weight coefficients.

A weight coefficient transmitter 3413 transmits the weight coefficient W1 calculated by the weight coefficient calculator 3412 to the reception station 3101, the weight coefficient W2 to the cooperative station 3201, and the weight coefficient W3 to the cooperative station 3301.

A product signal receiver 3414 receives the signal of the product W1·X1 of the received signal X1 and the weight coefficient W1 from the reception station 3101, the signal of the product W2·X2 of the received signal X2 and the weight coefficient W2 from the cooperative station 3201, and the signal of product W3·X3 of the received signal X3 and the weight coefficient W3 from the cooperative station 3301.

A synthesized signal generator 3415 generates a signal of a sum Y (Y=W1·X1+W2·X2+W3·X3) from the product W1·X1 received from the reception station 3101, the product W2·X2 received from the cooperative station 3201, and the product W3·X3 received from the cooperative station 3301.

A synthesized signal transmitter 3416 transmits the signal of the sum Y generated by the synthesized signal generator 3415 to the reception station 3101.

Next, a configuration of the reception station 3101 will be described.

An interference wave detector 3111 in the reception station 3101 detects an interference signal reception state such as the interference wave number in the reception station 3101, and transmits information on the interference wave number to the cooperative station selector 3022 in the transmission station 3021.

A received signal transmitter 3112 in the reception station transmits the interference signal U (U1 and U2) and the received signal X1 of the desired signal D received using the antenna 3102 to the control device 3401.

A weight coefficient receiver 3113 in the reception station receives the weight coefficient W1 from the control device 3401.

A multiplier 3114 in the reception station multiplies the weight coefficient W1 received from the control device 3401 by the received signal X1 to obtain (W1·X1).

A product signal transmitter 3115 in the reception station transmits the signal of the product W1·X1 calculated by the multiplier 3114 in the reception station to the control device 3401. A synthesized signal receiver 3116 in the reception station receives the signal of the sum Y (Y=W1·X1+W2·X2+W3·X3) from the control device 3401.

Next, a configuration of the cooperative station 3201 will be described.

A reception state notification unit 3211 in a first cooperative station in the cooperative station 3201 transmits information on an interference-wave reception state in the cooperative station 3201 to the cooperative station selector 3022 in response to a request from the cooperative station selector 3022 in the transmission station 3021.

When a request signal receiver 3212 in the first cooperative station is selected as a cooperative station for forming the array antenna, the request signal receiver 3212 receives a cooperation request signal C1 from the cooperative station selector 3022 in the transmission station 3021.

A received signal transmitter 3213 in the first cooperative station transmits the interference signal U (U1 and U2) and the received signal X2 of the desired signal D received using the antenna 3202 to the control device 3401.

A weight coefficient receiver 3214 in the first cooperative station receives the weight coefficient W2 from the control device 3401. A multiplier 3215 in the first cooperative station multiplies the weight coefficient W2 received from the control device 3401 by the received signal X2 to obtain (W2·X2).

A product signal transmitter 3216 in the first cooperative station transmits the signal of the product W2·X2 calculated by the multiplier 3215 in the first cooperative station to the control device 3401.

Next, a configuration of the cooperative station 3301 will be described.

A reception state notification unit 3311 in a second cooperative station in the cooperative station 3301 transmits information on an interference-wave reception state in the cooperative station 3301 as a reception state notification signal B2 to the cooperative station selector 3022 in response to a request from the cooperative station selector 3022 in the transmission station 3021.

When a request signal receiver 3312 in the second cooperative station is selected as a cooperative station for forming the array antenna, the request signal receiver 3312 receives a cooperation request signal C2 from the cooperative station selector 3022 in the transmission station 3021.

A received signal transmitter 3313 in the second cooperative station transmits the interference signal U (U1 and U2) and a received signal X3 of the desired signal D received using the antenna 3302 to the control device 3401.

A weight coefficient receiver 3314 in the second cooperative station receives the weight coefficient W3 from the control device 3401. A multiplier 3315 in the second cooperative station multiplies the weight coefficient W3 received from the control device 3401 by the received signal X3 to obtain (W3·X3).

A product signal transmitter 3316 in the second cooperative station transmits a signal of the product W3·X3 calculated by the multiplier 3315 in the second cooperative station to the control device 3401.

Through the above configuration, it is possible to form a directivity pattern having a null in an arrival direction of a plurality of interference signals and a high directivity in an arrival direction of the desired signal even when the reception station 3101 is a small reception station device (e.g., mobile phone) having no array antenna. It is also possible to form a directivity pattern having the null in the arrival direction of the plurality of interference signals. That is, it is possible to achieve an interference suppression effect of the array antenna without affecting the scale of the device.

Sixteenth Embodiment

Figure 33:
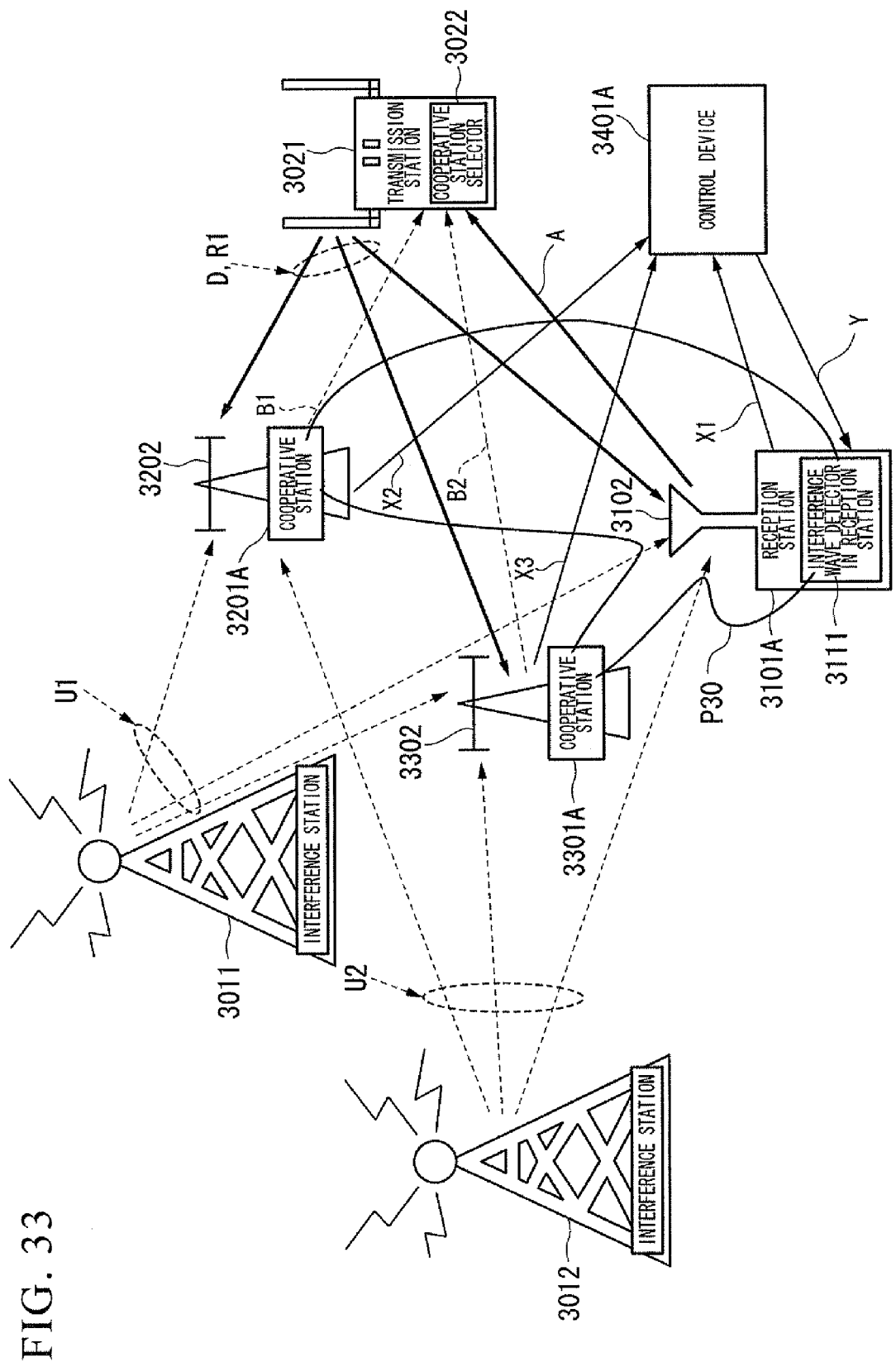
FIG. 33 shows a configuration of a directivity control system according to a sixteenth embodiment of the present invention.

FIG. 33 shows an entire configuration of a directivity control system according to a sixteenth embodiment of the present invention.

In the example shown in FIG. 33, a reception station 3101A, a cooperative station 3201A, and a cooperative station 3301A, which do not form an array antenna together, are combined to be regarded as one array antenna system, as in the example shown in FIG. 29. A control device 3401A assigns a weight to an array antenna phase from a synthesized signal of a desired signal D and interference signals U1 and U2 received in the respective stations or from interference signals U1 and U2 to form, in the array antenna, a directivity pattern having a null in an arrival direction of a plurality of interference waves U1 and U2 and a high directivity in an arrival direction of the desired signal D. Alternatively, a directivity pattern P30 having the null in the arrival direction of the plurality of interference waves U1 and U2 is formed in the array antenna.

The configuration example shown in FIG. 33 differs from that of the fifteenth embodiment shown in FIG. 29 in that, in the example shown in FIG. 33, the control device 3401A does not transmit the weight coefficient W1 to the reception station 3101A, does not transmit the weight coefficient W2 to the cooperative station 3201A, and does not transmit the weight coefficient W3 to the cooperative station 3301A. The configuration example shown in FIG. 33 also differs from that of the fifteenth embodiment shown in FIG. 29 in that the control device 3401A shown in FIG. 33 multiplies the weight coefficient W1 by the received signal X1, the weight coefficient W2 by the received signal X2, and the weight coefficient W3 by the received signal X3. The configuration example shown in FIG. 33 also differs from that of the fifteenth embodiment shown in FIG. 29 in that the reception station 3101A normally transmits the received signal X1 to the control device 3401A (in FIG. 29, normally transmits the product W1·X1), the cooperative station 3201A normally transmits the received signal X2 to the control device 3401A (in FIG. 29, normally transmits the product W2·X2), and the cooperative station 3301A normally transmits the received signal X2 to the control device 3401A (in FIG. 29, normally transmits the product W3·X3). The other portions of the configuration are the same as in FIG. 29.

Thus, the control device 3401A multiplies the weight coefficient W1 by the received signal X1, the weight coefficient W2 by the received signal X2, and the weight coefficient W3 by the received signal X3, making it unnecessary to transmit the weight coefficient signal from the control device 3401A to the reception station 3101A, the cooperative station 3201A, and the cooperative station 3301A. It is also possible to eliminate a process of multiplying the received signal by the weight coefficient in the reception station 3101A, the cooperative station 3201A, and the cooperative station 3301A, thereby simplifying a process in the reception station 3101A, the cooperative station 3201A, and the cooperative station 3301A.

Figure 34:
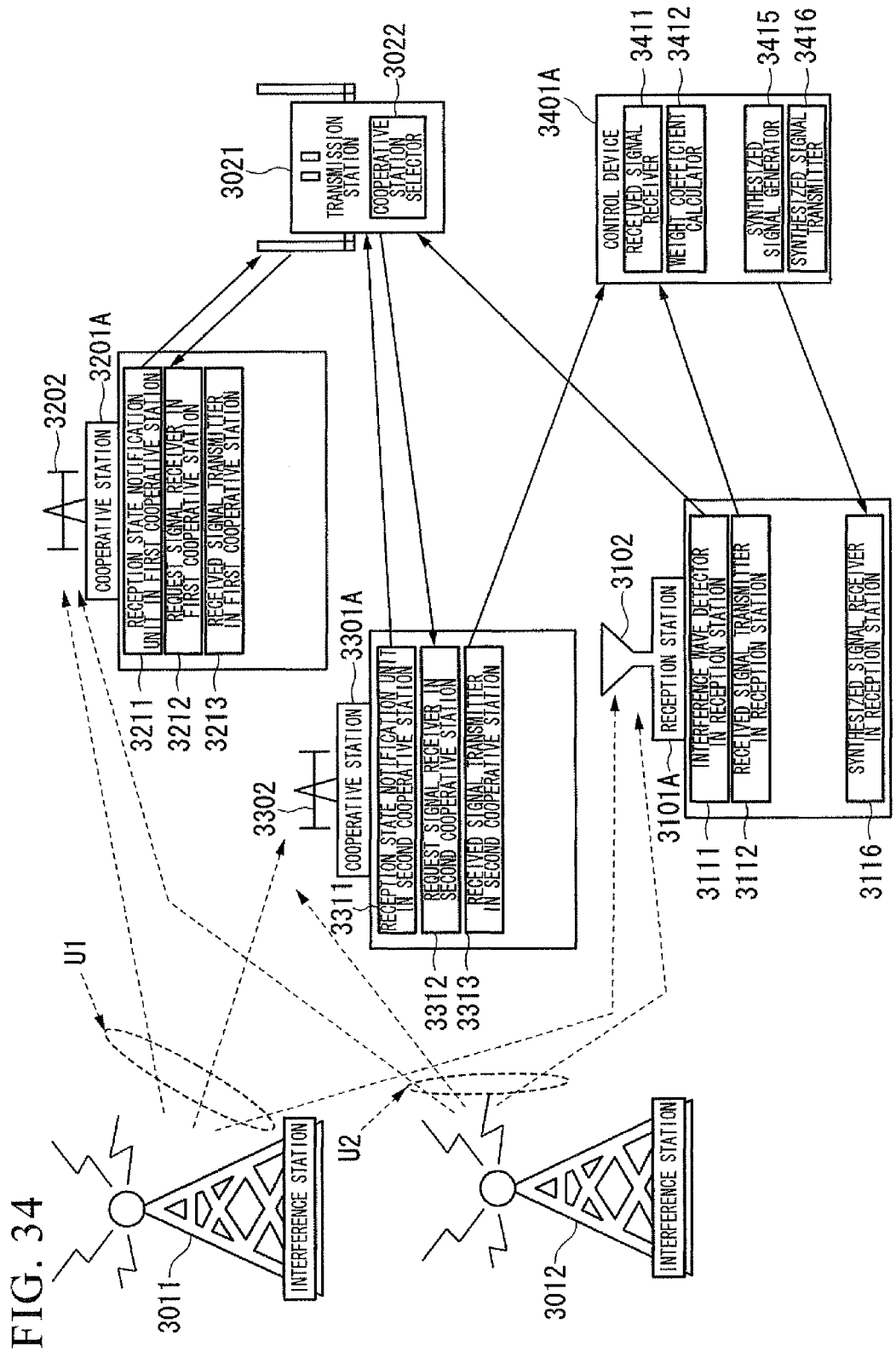
FIG. 34 shows an example of a configuration of each portion in the directivity control system shown in FIG. 33.

FIG. 34 shows an example of a configuration of the reception station 3101A, the cooperative station 3201A, the cooperative station 3301A, and the control device 3401A in the directivity control system according to the sixteenth embodiment of the present invention.

In the configuration example shown in FIG. 34, the weight coefficient transmitter 3413 and the product signal receiver 3414 in the control device 3401 shown in FIG. 32 are omitted, unlike the configuration example of the fifteenth embodiment shown in FIG. 32. The weight coefficient receiver 3113, the multiplier 3114, and the product signal transmitter 3115 in the reception station 3101 shown in FIG. 32 are also omitted. The weight coefficient receiver 3214 in the first cooperative station, the multiplier 3215 in the first cooperative station, and the product signal transmitter 3216 in the first cooperative station in the cooperative station 3201 shown in FIG. 32 are also omitted. The weight coefficient receiver 3314 in the second cooperative station, the multiplier 3315 in the second cooperative station, and the product signal transmitter 3316 in the second cooperative station in the cooperative station 3301 shown in FIG. 32 are also omitted.

That is, since, in the configuration example shown in FIG. 34, the signals of weight coefficients W1, W2 and W3 are not transmitted from the control device 3401A to the reception station 3101A, the cooperative station 3201A, and the cooperative station 3301A, and the process of multiplying the received signal by the weight coefficient is not performed in the reception station 3101A, the cooperative station 3201A, and the cooperative station 3301A, related processing units are omitted. The process of multiplying the received signal by the weight coefficient is performed by the synthesized signal generator 3415 in the control device 3401A. The other portions of the configuration are the same as in FIG. 32. Accordingly, like elements are designated by like reference numerals and an overlapping description thereof will be omitted.

Figure 35:
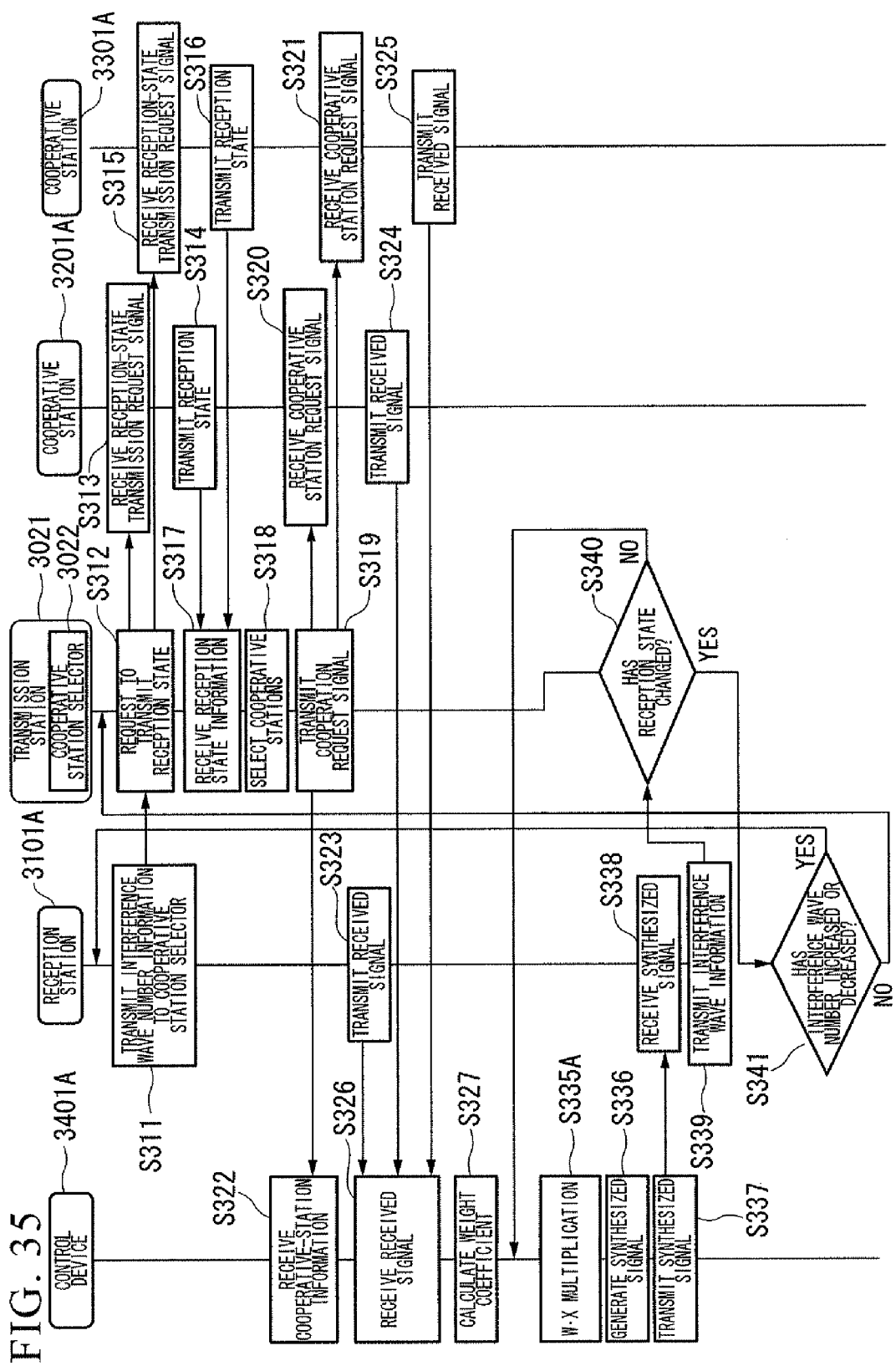
FIG. 35 is a sequence diagram showing a flow of a process in each station device in the directivity control system shown in FIG. 33.

FIG. 35 is a sequence diagram showing a flow of a process in each station device in the directivity control system shown in FIG. 33.

The sequence diagram shown in FIG. 34 includes the same steps S311 to S327 and S336 to S341 as the sequence diagram in the fifteenth embodiment shown in FIG. 31, but does not include steps S328 to S335 shown in FIG. 31, instead additionally including a process of step S335A (the process of multiplying the received signal by the weight coefficient in the control device).

That is, they differ from each other in that the control device 3401A does not transmit the weight coefficient, but performs the process of multiplying the received signal X by the weight coefficient. Accordingly, like processes are designated by like reference numerals and an overlapping description thereof will be omitted.

Seventeenth Embodiment

Figure 36:
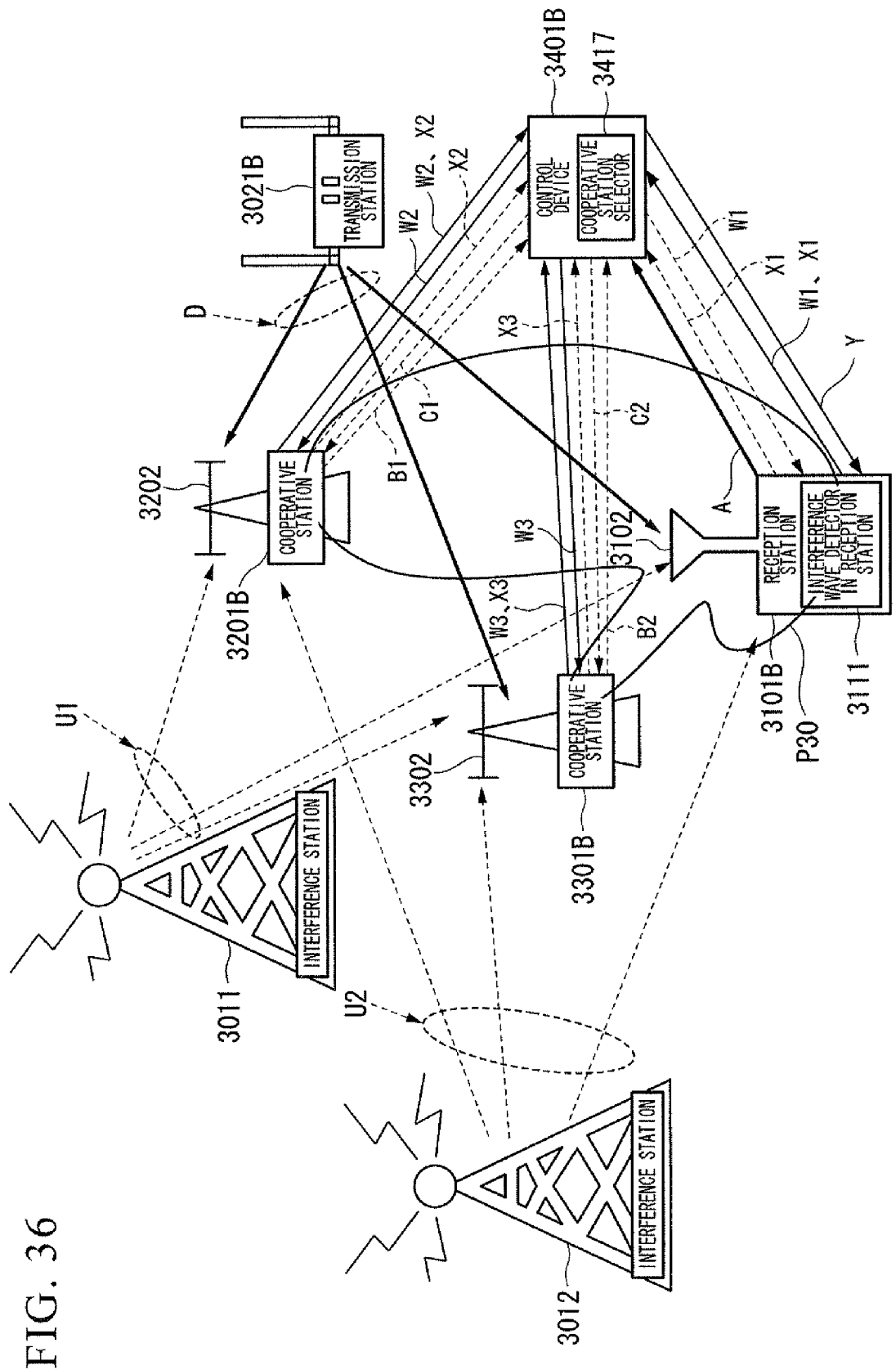
FIG. 36 shows a configuration of a directivity control system according to a seventeenth embodiment of the present invention.

FIG. 36 shows an entire configuration of a directivity control system according to a seventeenth embodiment of the present invention. In an example shown in FIG. 36, a plurality of cells/systems share the same frequency at the same time and the same place, and a plurality of interference signals arrive, as in the example shown in FIG. 29.

In the fifteenth embodiment shown in FIG. 29 and the sixteenth embodiment shown in FIG. 33, the example in which the cooperative station selector which selects cooperative stations is provided in the transmission station is shown. On the other hand, in the seventeenth embodiment shown in FIG. 36, an example in which the cooperative station selector is provided in the control device is shown.

The directivity control system shown in FIG. 36 detects the number of interference waves received by a reception station 3101B and transmits the interference wave number as an interference wave notification signal A to a cooperative station selector 3417 in a control device 3401B. The cooperative station selector 3417 receives interference-wave reception state information as reception state notification signals B1 and B2 from cooperative stations (in this example, the cooperative station 3201B and the cooperative station 3301B) under the cooperative station selector.

The cooperative station selector 3417 selects cooperative stations based on the interference wave number reported from the reception station 3101B and information on an interference-wave reception state in respective cooperative stations, and sends a cooperation request signal to the selected cooperative stations. In the example shown in FIG. 36, the cooperative station 3201B and the cooperative station 3301B are selected, and the cooperation request signals C1 and C2 are transmitted to the cooperative station 3201B and the cooperative station 3301B, respectively.

Accordingly, an antenna 3102 of the reception station 3101B, an antenna 3202 of the selected cooperative station 3201B, and an antenna 3302 of the selected cooperative station 3301B, which do not form an array antenna, are combined as one array antenna. A control device 3401 assigns a weight to an array antenna phase from a synthesized signal of a desired signal D and interference signals U1 and U2 received in the respective stations or from the interference signals U1 and U2 to form, in the array antenna, a directivity pattern having a null in an arrival direction of the respective interference signals U1 and U2 and a high directivity in an arrival direction of the desired signal D. Alternatively, a directivity pattern having the null in the arrival direction of the respective interference signals U1 and U2 P30 is formed in the array antenna.

The control device 3401B may use the above-described power inversion adaptive array antenna (PIAA antenna) scheme when calculating a weight coefficient to assign a weight to the received signal of each station device.

When the control device 3401B has calculated a weight coefficient W1 for the received signal X1, a weight coefficient W2 for the received signal X2, and a weight coefficient W3 for the received signal X3, the control device 3401B transmits the weight coefficient W1 for the received signal X1 to the reception station 3101B, the weight coefficient W2 for the received signal X2 to the cooperative station 3201B, and the weight coefficient W3 for the received signal X3 to the cooperative station 3301B.

The reception station 3101B multiplies the weight coefficient W1 received from the control device 3401B by the received signal X1 to obtain (W1·X1), and transmits a signal of the product W1·X1 to the control device 3401B. Meanwhile, the cooperative station 3201B multiplies the weight coefficient W2 received from the control device 3401B by the received signal X2 to obtain (W2·X2), and transmits a signal of the product W2·X2 to the control device 3401B. Further, the cooperative station 3301B multiplies the weight coefficient W3 received from the control device 3401B by the received signal X3 to obtain (W2·X2) and transmits a signal of the product W3·X3 to the control device 3401B.

The control device 3401B obtains a sum Y based on the signal of the product W1·X1 received from the reception station 3101B, the signal of the product W2·X2 received from the cooperative station 3201B, and the signal of the product W3·X3 received from the cooperative station 3301B.

Sum $Y=W1·X1+W2·X2+W3·X3$

The control device 3401B transmits a signal of the sum Y (Y=W1·X1+W2·X2+W3·X3) to the reception station 3101B. The reception station 3101B takes the signal of the sum Y received from the control device 3401B, as a received signal.

Thus, the reception station 3101B having no array antenna can be combined with the antennas of the peripheral cooperative stations 3201B and 3301B to form one array antenna. Accordingly, it is possible to form, in the array antenna, a directivity pattern having a null in an arrival direction of a plurality of interference signals and a high directivity in an arrival direction of the desired signal. It is also possible to form, in the array antenna, a directivity pattern having the null in the arrival direction of the plurality of interference signals. Thus, it is possible to achieve an interference suppression effect of the array antenna without affecting the scale of the device, thereby suppressing the interference through the antenna directivity control even when the reception station 3101B is a small reception station device (e.g., mobile phone) having no array antenna.

The cooperative station may be any other reception station, and a directivity pattern of the array antenna formed upon signal reception in the reception station may be used even upon signal transmission in the reception station.

Further, an algorithm for obtaining the weight coefficients in the control device 3401B is not limited to the above-described power inversion adaptive array antenna (PIAA antenna) scheme. For example, any algorithm, including zero forcing (ZF) and minimum mean square error (MMSE), is available as a control algorithm. Further, any control index, including reception power, reception SI, reception error rate, and so on, is available as a control index.

Figure 37:
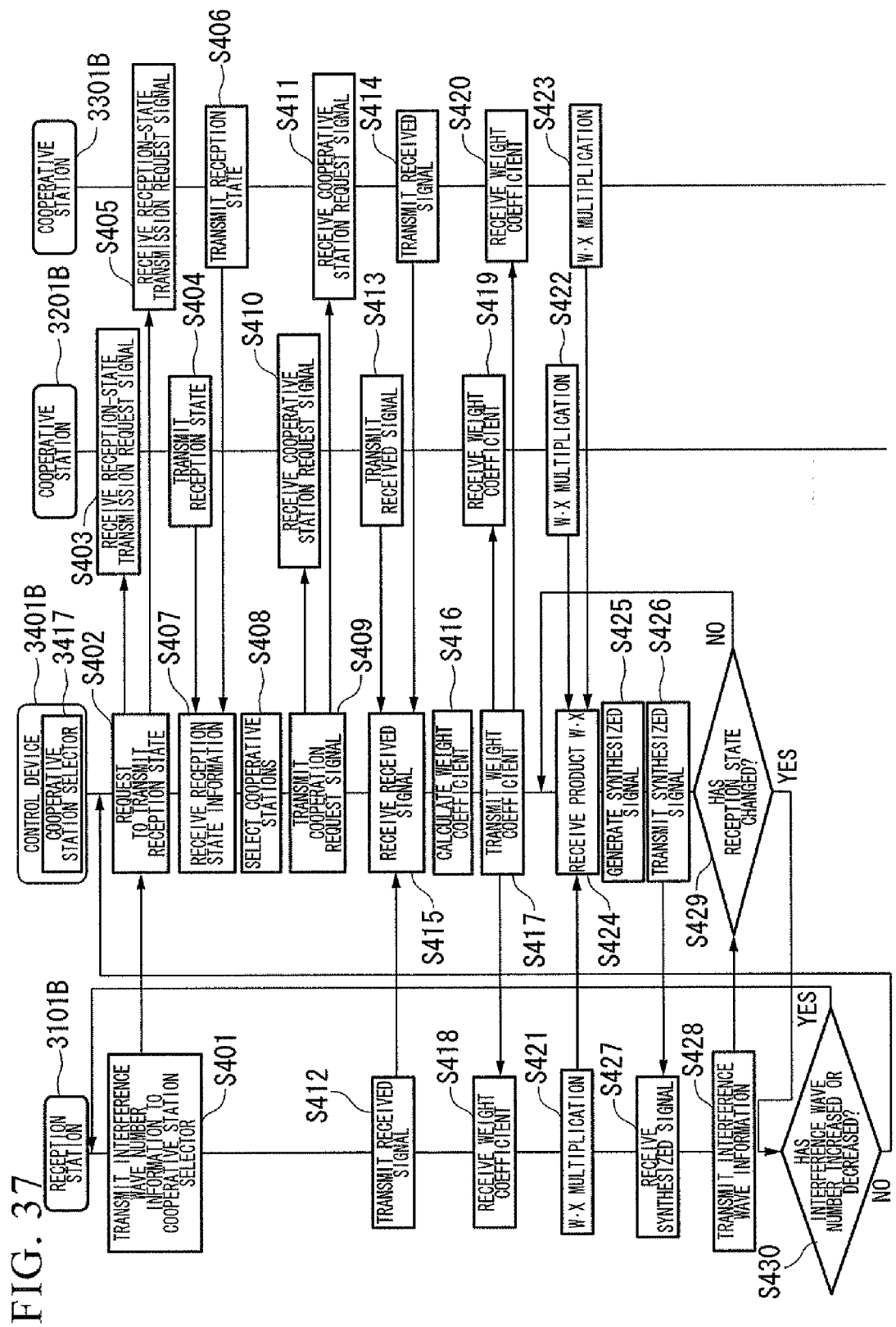
FIG. 37 is a sequence diagram showing a flow of a process in each station device in the directivity control system shown in FIG. 36.

FIG. 37 is a sequence diagram showing a flow of a process in each station device in the directivity control system shown in FIG. 36. Hereinafter, the process flow will be described with reference to FIG. 37. In the example shown in FIG. 31, it is assumed that the cooperative station 3201E and the cooperative station 3301B are selected as cooperative stations.

First, the reception station 3101B transmits the interference wave number information to the cooperative station selector 3417 in the control device 3401B (step S401).

The cooperative station selector 3417 transmits a reception-state transmission request signal to cooperative stations under the cooperative station selector based on the interference wave number information received from the reception station 3101B to request the cooperative station to transmit the reception state information for the intended interference wave (step S402).

When the cooperative station 3201B receives the reception-state transmission request signal from the cooperative station selector 3417 (step S403), the cooperative station 3201B transmits the reception state information for the intended interference wave to the cooperative station selector 3417 (step S404). Similarly, when the cooperative station 3301B receives the reception-state transmission request signal from the cooperative station selector 3417 (step S405), the cooperative station 3301B transmits the reception state information for the intended interference wave to the cooperative station selector 3417 (step S406).

The cooperative station selector 3417 receives the interference-wave reception state information from the cooperative station 3201B and the cooperative station 3301B (step S407), and selects cooperative stations for forming an array antenna to suppress the interference wave based on the information on the reception state in the cooperative stations (step S408). The cooperative station selector 3417 transmits a cooperative station request signal to the selected cooperative stations. In this example, the cooperative station 3201B and the cooperative station 3301B are selected, and the cooperation request signal is transmitted to the cooperative station 3201B and the cooperative station 3301B (steps S409, S410 and S411).

After the selection of the cooperative stations is completed using the process, the antenna of the reception station 3101B, the antenna of the cooperative station 3201B, and the antenna of the cooperative station 3301B are formed as an array antenna, and a process of receiving a desired signal in the reception station 3101B is initiated.

First, the reception station 3101B transmits the received signal X1 received using its antenna 3102 to the control device 3401B (step S412), the cooperative station 3201B transmits the received signal X2 received using its antenna 3202 to the control device 3401B (step S413), and the cooperative station 3301B transmits the received signal X3 received using its antenna 3302 to the control device 3401B (step S414).

The control device 3401B receives the received signal X1 from the reception station 3101B, the received signal X2 from the cooperative station 3201B, and the received signal X3 from the cooperative station 3301B (step S415). Based on the received signals X1, X2 and X3, a weight coefficient W1 for the received signal X1, a weight coefficient W2 for the received signal X2, and a weight coefficient W3 for the received signal X3 are calculated so that the directivity pattern of the array antenna has a null in an arrival direction of a plurality of interference signals in the reception station 3101B and a high directivity in an arrival direction of the desired signal D (step S416). Alternatively, the weight coefficients W1 and W2, and W3 are calculated so that the directivity pattern of the array antenna has a null in an arrival direction of a plurality of interference signals in the reception station 3101B.

The weight coefficients W1, W2 and W3 calculated by the control device 3401 are transmitted to the respective stations (step S417). The reception station 3101B receives the weight coefficient W1 (step S418), the cooperative station 3201B receives the weight coefficient W2 (step S419), and the cooperative station 3301B receives the weight coefficient W3 (step S420).

The reception station 3101B multiplies the weight coefficient W1 received from the control device 340B by the received signal X1 to obtain (W1·X1), and transmits a signal of a product to the control device 3401B (step S421). The cooperative station 3201B multiplies the weight coefficient W2 received from the control device 3401B by the received signal X2 to obtain (W2·X2), and transmits a signal of a product to the control device 3401B (step S422). Further, the cooperative station 3301B multiplies the weight coefficient W3 received from the control device 3401B by the received signal X3 to obtain (W3·X3), and transmits a signal of a product to the control device 3401B (step S423).

The control device 3401B receives the product W1·X1 from the reception station 3101B, the product W2·X2 from the cooperative station 3201B, and the product W3·X3 from the cooperative station 3301B (step S424). The control device 3401B generates a signal of a sum Y (Y=W1·X1+W2·X2+W3·X3) from the product W1·X1, the product W2·X2, and the product W3·X3 (step S425). The control device 3401B transmits the signal of the sum Y to the reception station 3101 (step S426), and the reception station 3101B takes the signal of the sum Y as a received signal (step S427).

The reception station 3101B then continues to detect interference waves, the information of which is transmitted to the cooperative station selector 3417 (step S428). The cooperative station selector 3417 determines whether there has been a change in the reception state in the reception station 3101B (step S429).

When there has not been a change in the reception state (step S429: No), the process moves to step S424, in which interference wave suppression is continued by currently selected cooperative stations and the weight coefficient. Meanwhile, when there has been a change in the reception state (step S429: Yes), the reception station 3101B determines whether the interference wave number has increased or decreased (step S430).

When the interference wave number has not increased or decreased (step S430: No), since there is a change in the reception state (Yes in step S429), the process proceeds to step S402, in which the interference wave reception state in each cooperative station is determined again, and cooperative station selection is examined again, if necessary.

When the interference wave number has increased or decreased (step S430: Yes), the process proceeds to step S401, in which the reception station 3101B notifies the cooperative station selector 3417 of a new interference wave number, and the cooperative station selector 3417 selects cooperative stations again.

Figure 38:
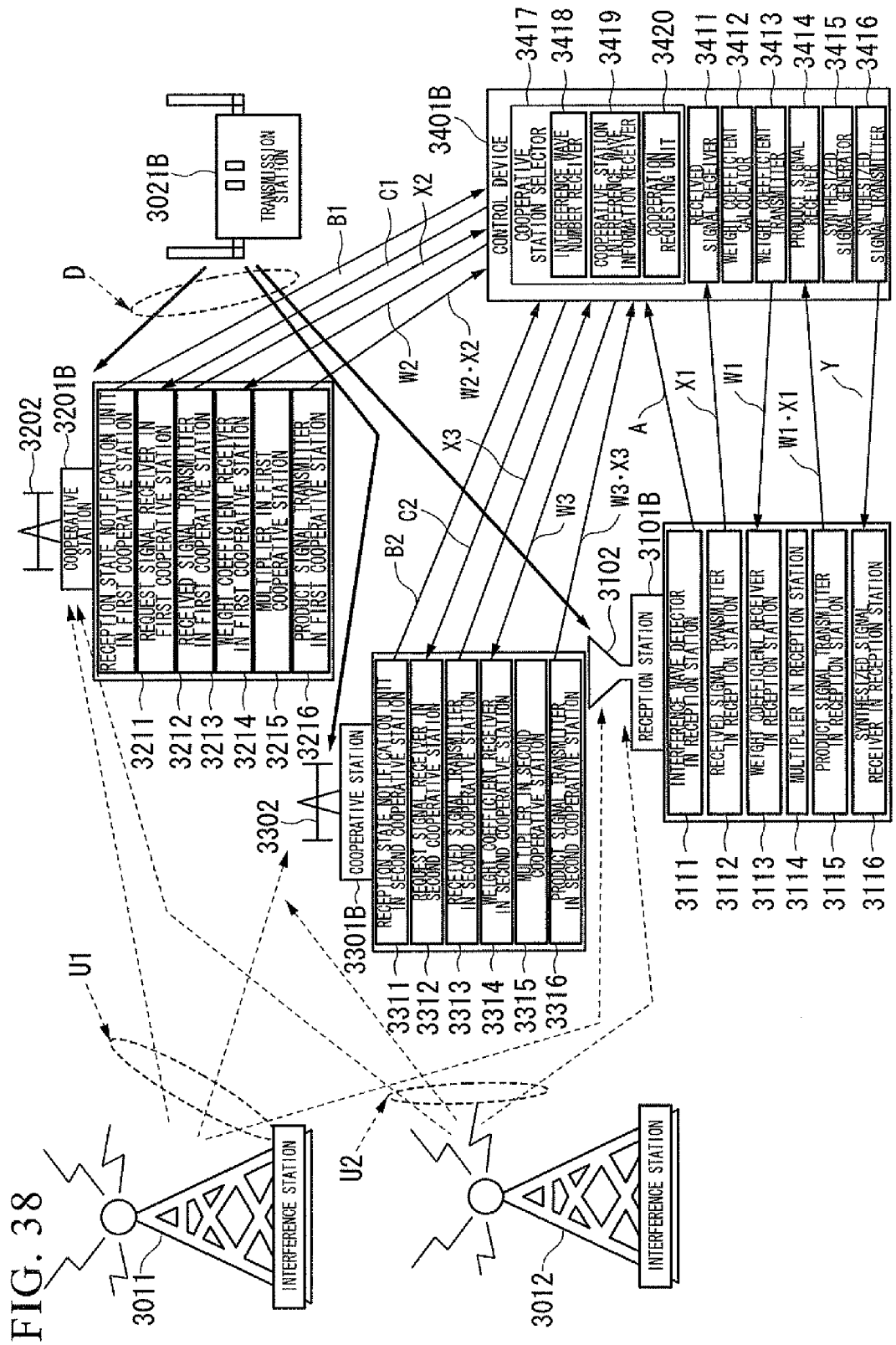
FIG. 38 shows an example of a configuration of each portion in the directivity control system shown in FIG. 36.

FIG. 38 shows an example of a configuration of the reception station 3101B, the cooperative station 3201B, the cooperative station 3301B, and the control device 3401B in the directivity control system according to the seventeenth embodiment of the present invention.

The configuration example of the directivity control system shown in FIG. 38 differs from that of the fifteenth embodiment shown in FIG. 32 in that the cooperative station selector 3022 in the transmission station 3021 shown in FIG. 32 is replaced with a cooperative station selector 3417 in the control device 3401B shown in FIG. 38. The other portions of the configuration are the same as in the directivity control system shown in FIG. 32. Accordingly, like elements are designated by like reference numerals and an overlapping description thereof will be omitted.

That is, in the configuration example shown in FIG. 38, since the cooperative station selector 3417 in the control device 3401B performs a process such as cooperative station selection, an interference wave notification signal A is transmitted from the reception station 3101B to the cooperative station selector 3417.

The cooperative station selector 3417 in the control device 3401B has an interference wave number receiver 3418, a cooperative-station interference wave information receiver 3419, and a cooperation requesting unit 3420. The interference wave information receiver 3418 receives interference wave number information as an interference wave notification signal A from the reception station 3101B. The cooperative-station interference wave information receiver 3419 receives a signal of the interference wave reception state as the reception state notification signals B1 and B2 from the cooperative station under the cooperative station selector.

A cooperation requesting unit 3025 transmits cooperation request signals C1 and C2 to cooperative stations (in this example, the cooperative station 3201 and the cooperative station 3301) selected as cooperative stations for forming the array antenna.

Through the configuration, it is possible to form a directivity pattern having a null in an arrival direction of a plurality of interference signals and a high directivity in an arrival direction of the desired signal even when the reception station 3101B is a small reception station device (e.g., mobile phone) having no array antenna. It is also possible to form a directivity pattern having a null in the arrival direction of a plurality of interference signals. That is, it is possible to achieve an interference suppression effect of the array antenna without affecting the scale of the device.

Eighteenth Embodiment

Figure 39:
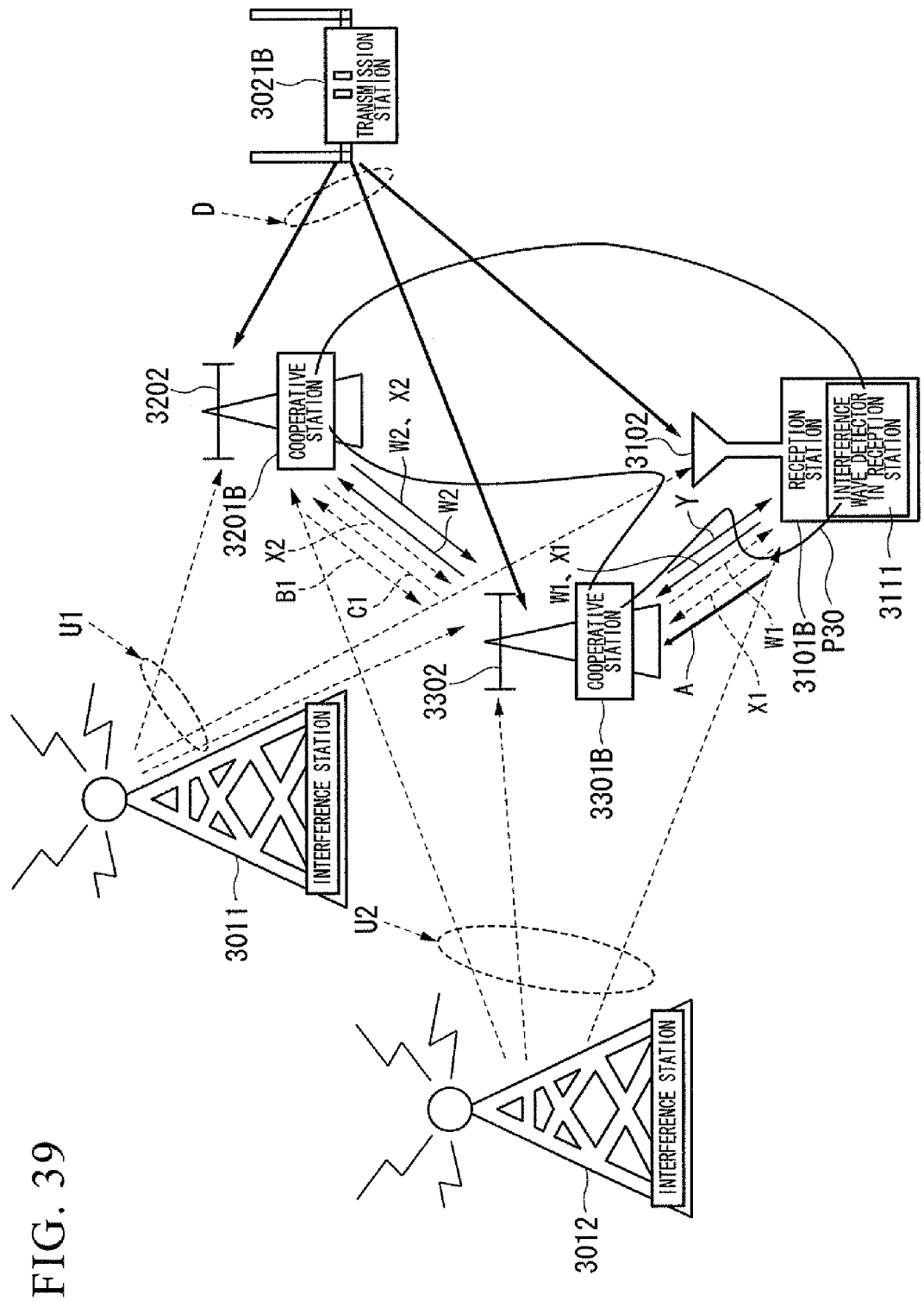
FIG. 39 shows a configuration of a directivity control system according to an eighteenth embodiment of the present invention.

FIG. 39 shows an entire configuration of a directivity control system according to an eighteenth embodiment of the present invention. In an example shown in FIG. 39, a plurality of cells/systems share the same frequency at the same time and the same place, and a plurality of interference signals arrive, as in the example shown in FIG. 29.

In the eighteenth embodiment, a description of the same portions of the configuration as in the seventeenth embodiment or portions performing the same process as in the seventeenth embodiment will be omitted.

In the seventeenth embodiment shown in FIG. 36, the example in which the control device 3401B is provided at a different place from the transmission station 3021B, the reception station 3101B, the cooperative station 3201B, and the cooperative station 3301B has been described. In the eighteenth embodiment, an example in which the control device 3401B is provided in the cooperative station 3301B, as shown in FIG. 39, will be described.

The directivity control system shown in FIG. 39 detects the number of interference waves received by a reception station 3101B and transmits the interference wave number as an interference wave notification signal A to a cooperative station selector 3417 of the control device 3401B in the cooperative station 3301B. The cooperative station selector 3417 receives interference-wave reception state information as reception state notification signals B1 and B2 from cooperative stations (in this example, a cooperative station 3201B and the cooperative station 3301B) under the cooperative station selector.

The cooperative station selector 3417 selects cooperative stations based on the interference wave number from the reception station 3101B and information on an interference-wave reception state in each cooperative station, and sends a cooperation request signal to the selected cooperative stations. In the example shown in FIG. 36, the cooperative station 3201B and the cooperative station 3301B are selected, and the cooperation request signal C1 is transmitted to the cooperative station 3201B. A cooperation request signal C2 is not transmitted to the cooperative station 3301B to which the cooperative station selector 3417 belongs.

Accordingly, an antenna 3102 of the reception station 3101B, an antenna 3202 of the selected cooperative station 3201B, and an antenna 3302 of the selected cooperative station 3301B, which do not form an array antenna, are combined as one array antenna. The control device 3401 assigns a weight to an array antenna phase from a synthesized signal of a desired signal D and interference signals U1 and U2 received in the respective stations or from the interference signals U1 and U2 to form, in the array antenna, a directivity pattern having a null in an arrival direction of the respective interference signals U1 and U2 and a high directivity in an arrival direction of the desired signal D. Alternatively, a directivity pattern P30 having the null in the arrival direction of the respective interference signals U1 and U2 is formed in the array antenna.

The control device 3401B in the cooperative station 3301B may use the above-described power inversion adaptive array antenna (PIAA antenna) scheme when calculating a weight coefficient to assign a weight to the received signal of each station device.

When the control device 3401B has calculated a weight coefficient W1 for the received signal X1, a weight coefficient W2 for the received signal X2, and a weight coefficient W3 for the received signal X3, the control device 3401B transmits the weight coefficient W1 for the received signal X1 to the reception station 3101B, the weight coefficient W2 for the received signal X2 to the cooperative station 3201B, and the weight coefficient W3 for the received signal X3 to the cooperative station 3301B.

The reception station 3101B multiplies the weight coefficient W1 received from the control device 3401B of the cooperative station 3301B by the received signal X1 to obtain (W1·X1), and transmits a signal of a product W1·X1 to the control device 3401B of the cooperative station 3301B. Meanwhile, the cooperative station 3201B multiplies the weight coefficient W2 by the received signal X2 to obtain (W2·X2) and stores a signal of a product W2·X2. Further, the cooperative station 3301B multiplies the weight coefficient W3 by the received signal X3 to obtain (W2·X2) and stores a signal of a product W3·X3.

The control device 3401B in the cooperative station 3301B obtains a sum Y based on the signal of the product W1·X1 received from the reception station 3101B, the stored signal of the product W2·X2, and the stored signal of the product W3·X3.

Sum $Y = W1 \cdot X1 + W2 \cdot X2 + W3 \cdot X3$

The control device 3401B of the cooperative station 3301B transmits a signal of the sum Y ($Y = W1 \cdot X1 + W2 \cdot X2 + W3 \cdot X3$) to the reception station 3101B. The reception station 3101B takes the signal of the sum Y received from the control device 3401B of the cooperative station 3301B, as a received signal.

Thus, the reception station 3101B having no array antenna can be combined with the antennas of the peripheral cooperative stations 3201B and 3301B to form one array antenna. Accordingly, it is possible to form, in the array antenna, a directivity pattern having a null in an arrival direction of a plurality of interference signals and a high directivity in an arrival direction of the desired signal. It is also possible to form, in the array antenna, a directivity pattern having the null in the arrival direction of a plurality of interference signals. Thus, it is possible to achieve an interference suppression effect of the array antenna without affecting the scale of the device, thereby suppressing the interference through antenna directivity control even when the reception station 3101B is a small reception station device (e.g., mobile phone) having no array antenna.

The cooperative station may be any other reception station, and a directivity pattern of the array antenna formed upon signal reception in the reception station may be used even upon signal transmission in the reception station.

An algorithm for obtaining the weight coefficients in the control device 3401B is not limited to the above-described power inversion adaptive array antenna (PIAA antenna) scheme. For example, any algorithm, including zero forcing (ZF) and minimum mean square error (MMSE), is available as a control algorithm. Further, any control index, including reception power, reception SI, reception error rate, and so on, is available as a control index.

Although, in the eighteenth embodiment described above, the example in which the control device 3401B is provided in the cooperative station 3301B has been described, the present invention is not limited thereto. For example, the control device 3401B may be provided in the cooperative station 3201B or the reception station 3101B.

Nineteenth Embodiment

Figure 40:
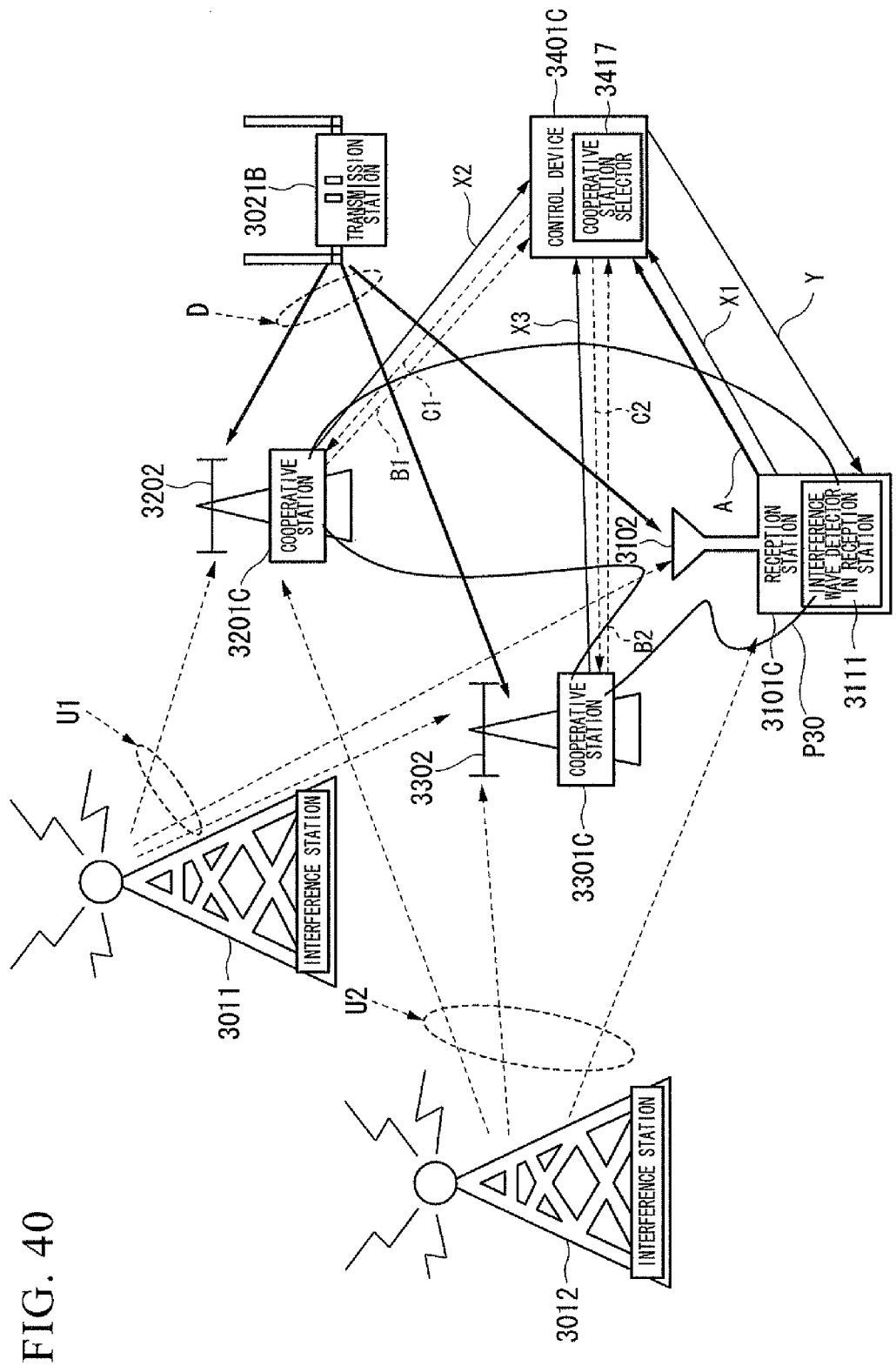
FIG. 40 shows a configuration of a directivity control system according to a nineteenth embodiment of the present invention.

FIG. 40 shows an entire configuration of a directivity control system according to a nineteenth embodiment of the present invention.

In an example shown in FIG. 40, a reception station 3101C, a cooperative station 3201C, and a cooperative station 3301C, which do not form an array antenna together, are combined to be regarded as one array antenna system, as in the seventeenth embodiment shown in FIG. 36. A control device 3401C assigns a weight to an array antenna phase from a synthesized signal of a desired signal D and interference signals U1 and U2 received in the respective stations or from the interference signals U1 and U2 to form, in the array antenna, a directivity pattern having a null in an arrival direction of a plurality of interference waves U1 and U2 and a high directivity in an arrival direction of the desired signal D. Alternatively, a directivity pattern P30 having a null in an arrival direction of the plurality of interference waves U1 and U2 is formed in the array antenna.

The configuration example shown in FIG. 40 differs from that of the seventeenth embodiment shown in FIG. 36 in that in the example shown in FIG. 40, the control device 3401C does not transmit the weight coefficient W1 to the reception station 3101C, does not transmit the weight coefficient W2 to the cooperative station 3201C, and does not transmit the weight coefficient W3 to the cooperative station 3301A.

The configuration example shown in FIG. 40 also differs from that of the seventeenth embodiment shown in FIG. 36 in that the control device 3401C shown in FIG. 40 multiplies the weight coefficient W1 by the received signal X1, the weight coefficient W2 by the received signal X2, and the weight coefficient W3 by the received signal X3. The configuration example shown in FIG. 40 also differs from that of the seventeenth embodiment shown in FIG. 36 in that the reception station 3101C normally transmits the received signal X1 to the control device 3401C (in FIG. 36, normally transmits the product W1·X1), in that the cooperative station 3201C normally transmits the received signal X2 to the control device 3401C (in FIG. 36, normally transmits the product W2·X2), and in that the cooperative station 3301C normally transmits the received signal X3 to the control device 3401C (in FIG. 36, normally transmits the product W3·X3). The other portions of the configuration are the same as in FIG. 36. Accordingly, an overlapping description thereof will be omitted.

Thus, the control device 3401C multiplies the weight coefficient W1 by the received signal X1, the weight coefficient W2 by the received signal X2, and the weight coefficient W3 by the received signal X3, making it unnecessary to transmit the weight coefficient signals from the control device 3401C to the reception station 3101C, the cooperative station 3201C, and the cooperative station 3301C. Further, it is possible to eliminate a process of multiplying the received signal by the weight coefficient in the reception station 3101C, the cooperative station 3201C, and the cooperative station 3301C, thereby simplifying a process in the reception station 3101C, the cooperative station 3201C, and the cooperative station 3301C.

Figure 41:
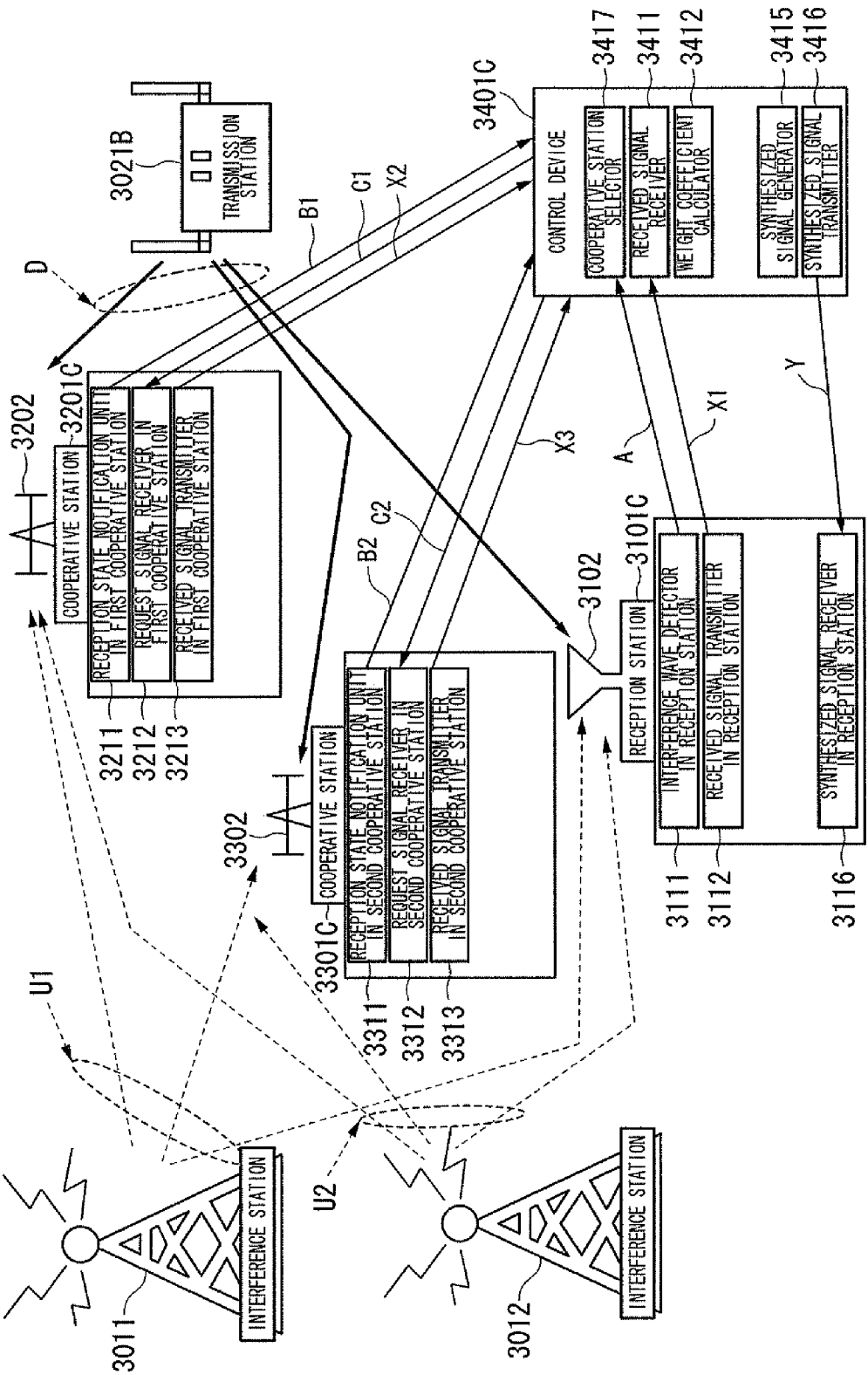
FIG. 41 shows an example of a configuration of each portion in the directivity control system shown in FIG. 40.

FIG. 41 shows an example of a configuration of the reception station 3101C, the cooperative station 3201C, the cooperative station 3301C, and the control device 3401C in the directivity control system according to the nineteenth embodiment of the present invention.

In the configuration example shown in FIG. 41, the weight coefficient transmitter 3413 and the product signal receiver 3414 in the control device 3401C shown in FIG. 38 are omitted, unlike the configuration example of the seventeenth embodiment shown in FIG. 38. The weight coefficient receiver 3113, the multiplier 3114, and the product signal transmitter 3115 in the reception station 3101B shown in FIG. 38 are also omitted. The weight coefficient receiver 3214 in the first cooperative station, the multiplier 3215 in the first cooperative station, and the product signal transmitter 3216 in the first cooperative station in the cooperative station 3201B shown in FIG. 38 are also omitted. The weight coefficient receiver 3314 in the second cooperative station, the multiplier 3315 in the second cooperative station, and the product signal transmitter 3316 in the second cooperative station in the cooperative station 3301 shown in FIG. 38 are also omitted.

That is, since, in the configuration example shown in FIG. 41, the signals of the weight coefficients W1, W2 and W3 are not transmitted from the control device 3401C to the reception station 3101C, the cooperative station 3201C, and the cooperative station 3301C, and the process of multiplying the received signal by the weight coefficient is not performed in the reception station 3101C, the cooperative station 3201C, and the cooperative station 3301C, related processing units are omitted. The process of multiplying the received signal by the weight coefficient is performed by a synthesized signal generator 3415 in the control device 3401C. The other portions of the configuration are the same as in the seventeenth embodiment shown in FIG. 38. Accordingly, like elements are designated by like reference numerals and an overlapping description thereof will be omitted.

Figure 42:
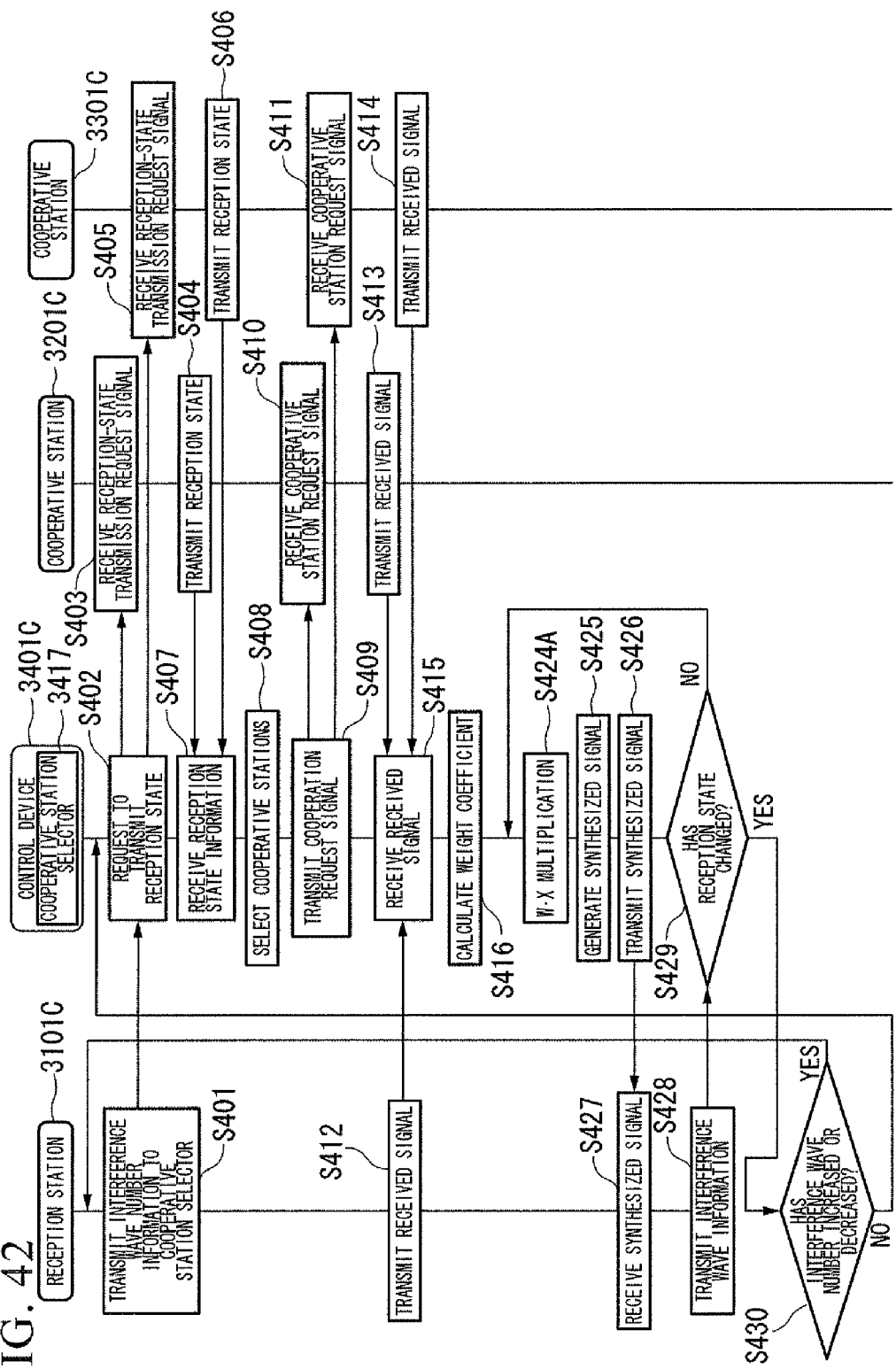
FIG. 42 is a sequence diagram showing a flow of a process in each station device in the directivity control system shown in FIG. 40.
Figure 43:
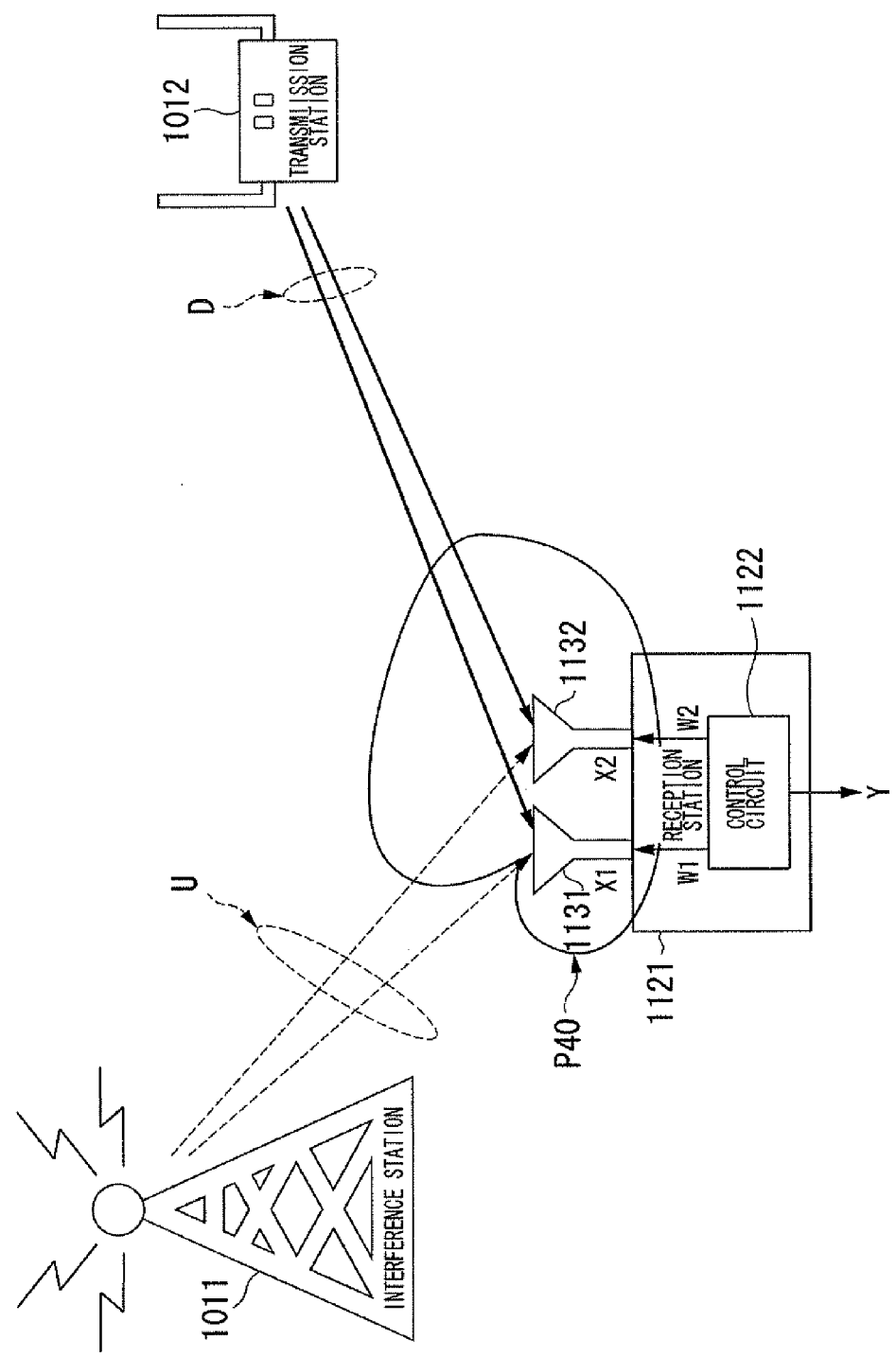
FIG. 43 is a diagram for explaining a conventional method of suppressing array antenna interference.

FIG. 42 is a sequence diagram showing a flow of a process in each station device in the directivity control system shown in FIG. 40.

The sequence diagram shown in FIG. 42 includes the same steps S401 to S416 and S425 to S430 as the sequence diagram in the seventeenth embodiment shown in FIG. 37, but does not include steps S417 to S424 shown in FIG. 37, instead additionally including a process of step S424A (a process of multiplying the received signal by the weight coefficient in the control device 3401C).

That is, they differ from each other in that the control device 3401C does not transmit the weight coefficients, but performs a process of multiplying the received signal X by the weight coefficient W. Accordingly, like processes are designated by like reference numerals and an overlapping description thereof will be omitted.

Although, in the fifteenth to nineteenth embodiments of the present invention, the example in which the reception station receives the desired signal from the transmission station have been described, the present invention is not limited thereto and the reception station may receive and transmit the desired signal. Similarly, although, in the fifteenth to nineteenth embodiments, the example in which the transmission station transmits the desired signal to the reception station have been described, the present invention is not limited thereto and the transmission station may transmit and receive the desired signal.

Although the embodiments of the present invention have been described, the directivity control system, the control device, the reception station (reception station device), the cooperative station (cooperative station device), and the transmission station of the present invention are not limited to the shown examples described above, and it will be understood by those skilled in the art that a variety of modifications and variations may be made to the present invention without departing from the scope of the present invention.

INDUSTRIAL APPLICABILITY

The present invention can be applied to a directivity control system, a control device, a cooperative station device, a reception station device, a method of controlling directivity, and so on capable of suppressing interference through antenna directivity control even with a small reception station device having no array antenna.

The invention claimed is:

1. A directivity control system comprising:
a first reception station device configured to receive an interference signal and a desired signal;
a cooperative station device configured to receive a signal using an antenna, the cooperative station device being disposed at a different place from the first reception station device; and
a control device configured to control the directivity of an antenna of the first reception station device,
wherein the control device is configured to regard a combination of the antenna of the first reception station device and the antenna of the cooperative station device as one array antenna, and calculate a sum, using weight coefficients W1 and W2, of a received signal X1 received using the antenna of the first reception station device and a received signal X2 received using the antenna of the cooperative station device to compose a directivity pattern having a null in an arrival direction of the interference signal in the array antenna, the weight coefficients W1 and W2 being obtained from an inverse matrix of a correlation matrix and a transpose matrix of a steering vector, the received signal X1 being assigned a weight by using the weight coefficient W1, and the received signal X2 being assigned a weight by using the weight coefficient W2.

2. The directivity control system according to claim 1, wherein the control device comprises:
a received signal receiver configured to receive a first received signal X1, which is received using the antenna of the first reception station device, from the first reception station device, and receive a second received signal X2, which is received using the antenna of the cooperative station device, from the cooperative station device;
a weight coefficient calculator configured to calculate a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna;
a weight coefficient transmitter configured to transmit the first weight coefficient W1 to the first reception station device and the second weight coefficient W2 to the cooperative station device;
a product signal receiver configured to receive a signal of a product W1·X1 of the first received signal X1 and the first weight coefficient W1 from the first reception station device, and a signal of a product W2·X2 of the second received signal X2 and the second weight coefficient W2 from the cooperative station device;

a synthesized signal generator configured to generate a signal of a sum Y of the product W1·X1 and the product W2·X2, in which:

$$Y = W1 \cdot X1 + W2 \cdot X2;$$ and a synthesized signal transmitter configured to transmit the signal of the sum Y generated by the synthesized signal generator to the first reception station device.

3. The directivity control system according to claim 1, wherein the control device comprises:

a received signal receiver configured to receive a first received signal X1, which is received using the antenna of the first reception station device, from the first reception station device, and receive a second received signal X2, which is received using the antenna of the cooperative station device, from the cooperative station device;

a weight coefficient calculator configured to calculate a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna;

a synthesized signal generator configured to calculate a product W1·X1 of the first received signal X1 and the first weight coefficient W1 and a product W2·X2 of the second received signal X2 and the second weight coefficient W2, and generate a signal of a sum Y of the product W1·X1 and the product W2·X2, in which:

$$Y = W1 \cdot X1 + W2 \cdot X2;$$ and a synthesized signal transmitter configured to transmit the signal of the sum Y generated by the synthesized signal generator to the first reception station device.

4. The directivity control system according to claim 1, wherein a second reception station device is disposed in place of the cooperative station device, and the first and second reception station devices are configured to take first and second transmission signals as respective desired signals, and regard transmission signals for other reception station devices as interference signals, and the control device comprises:

a directivity controller configured to regard a combination of the antenna of the first reception station device and the antenna of the second reception station device as one array antenna, and calculate a sum of, using a weight, of a received signal received using the antenna of the first reception station device and a received signal received using the antenna of the second reception station device to form, in the array antenna, a directivity pattern having a null in an arrival direction of the interference signal in the first reception station device when the first reception station device performs reception, and a directivity pattern having a null in an arrival direction of the interference signal in the second reception station device when the second reception station device performs reception.

5. The directivity control system according to claim 4, further comprising:

a weight coefficient calculator configured to calculate a weight coefficient W1 for a received signal X1 of the first reception station device and a weight coefficient W2 for a received signal X2 of the second reception station device, so that the directivity pattern of the array antenna forms a null in an arrival direction of the interference signal in the first reception station device, at a first timing when the first reception station device receives a signal, and calculates a weight coefficient W1' for a received signal X1' of the first reception station device and a weight coefficient W2' for a received signal X2' of the second reception station device, so that the directivity pattern of the array antenna forms a null in an arrival direction of the interference signal in the second reception station device, at a second timing when the second reception station device receives a signal, the second timing being different from the first timing;

a weight coefficient transmitter configured to transmit the weight coefficient W1 to the first reception station device and the weight coefficient W2 to the second reception station device at the first timing, and transmit the weight coefficient W1' to the first reception station device and the weight coefficient W2' to the second reception station device at the second timing;

a synthesized signal generator configured to receive a signal of a product W1·X1 of the received signal X1 and the weight coefficient W1 from the first reception station device and a signal of a product W2·X2 of the received signal X2 and the weight coefficient W2 from the second reception station device to generate a signal of a sum Y (Y=W1·X1+W2·X2) at the first timing, and receive a signal of a product W1'·X1' of the received signal X1' and the weight coefficient W1' from the first reception station device and a signal of a product W2'·X2' of the received signal X2' and the weight coefficient W2' from the second reception station device to generate a signal of a sum Y' (Y'=W1'·X1'+W2'·X2') at the second timing; and a synthesized signal transmitter configured to transmit the signal of the sum Y to the first reception station device at the first timing and transmit the signal of the sum Y' to the second reception station device at the second timing.

6. The directivity control system according to claim 4, further comprising:

a weight coefficient calculator configured to calculate a weight coefficient W1 for a received signal X1 of the first reception station device and a weight coefficient W2 for a received signal X2 of the second reception station device, so that the directivity pattern of the array antenna forms a null in an arrival direction of the interference signal in the first reception station device, at a first timing when the first reception station device receives a signal, and calculate a weight coefficient W1' for a received signal X1' of the first reception station device and a weight coefficient W2' for a received signal X2' of the second reception station device, so that the directivity pattern of the array antenna forms a null in an arrival direction of the interference signal in the second reception station device, at a second timing when the second reception station device receives a signal, the second timing being different from the first timing;

a synthesized signal generator configured to calculate a product W1·X1 of the received signal X1 and the weight coefficient W1 and a product W2·X2 of the received signal X2 and the weight coefficient W2 to calculate a signal of a sum Y (Y=W1·X1+W2·X2) at the first timing, and calculate a product W1'·X1' of the received signal X1' and the weight coefficient W1' and a product W2'·X2' of the received signal X2' and the weight coefficient W2' to generate a signal of a sum Y' (Y'=W1'·X1'+W2'·X2') at the second timing; and a synthesized signal transmitter configured to transmit the signal of the sum Y to the first reception station device at the first timing and transmits the signal of the sum Y' to the second reception station device at the second timing.

7. The directivity control system according to claim 1, wherein the first reception station device is configured to receive a plurality of interference signals and the desired signal, and a plurality of cooperative station devices are disposed, and the control device comprises:

a cooperative station selector configured to select at least one or two cooperative station devices based on information on an interference wave number detected by the first reception station device and information on an interference-wave reception state in the cooperative station device, and the control device configured to regard a combination of the antenna of the first reception station device and antennas of the at least one or two selected cooperative station devices as one array antenna, and calculate a sum, using a weight, of signals received using the respective antennas of the first reception station device and the selected cooperative station devices to form a directivity pattern having a null in an arrival direction of the interference signal in the array antenna.

8. The directivity control system according to claim 7, wherein the control device further comprises:

a received signal receiver configured to receive a received signal X1, which is received using the antenna of the first reception station device, from the first reception station device and received signals X2, X3 to Xn+1, which are received using respective antennas of n (n≥1) cooperative station devices selected by the cooperative station selector, from the respective cooperative station devices;

a weight coefficient calculator configured to calculate a weight coefficient W1 for the received signal X1 of the first reception station device and respective weight coefficients W2, W3 to Wn+1 for the received signals X2, X3 to Xn+1 of the cooperative station devices based on the received signal X1 and the received signals X2 to Xn+1 received by the received signal receiver, so that a directivity pattern of an array antenna formed of the antenna of the first reception station device and the antennas of the n selected cooperative station devices form a null in an arrival direction of each interference signal;

a weight coefficient transmitter configured to transmit the weight coefficient W1 to the first reception station device and the weight coefficients W2, W3 to Wn+1 to the corresponding cooperative station devices;

a product signal receiver configured to receive a signal of a product W1·X1 of the signal X1 received from the first reception station device and the reception station weight coefficient W1, and signals of respective products W2·X2, W3·X3 to Wn+1·Xn+1 of the signals X2, X3 to Xn+1 received from the respective cooperative station devices and the weight coefficients W2, W3 to Wn+1;

a synthesized signal generator configured to generate a signal of a sum Y of the product W1·X1 received from the first reception station device and the products W2·X2, W3·X3 to Wn+1·Xn+1 received from the respective cooperative station devices, in which:

$Y = W1 \cdot X1 + W2 \cdot X2 + W3 \cdot X3 + \ldots + Wn+1 \cdot Xn+1$; and a synthesized signal transmitter configured to transmit the signal of the sum Y generated by the synthesized signal generator to the first reception station device.

9. The directivity control system according to claim 7, wherein the control device further comprises:

a received signal receiver configured to receive a received signal X1, which is received using the antenna of the first reception station device, from the first reception station device and received signals X2, X3 to Xn+1, which are received using respective antennas of n (n≥1) cooperative station devices selected by the cooperative station selector, from the respective cooperative station devices;

a weight coefficient calculator configured to calculate a weight coefficient W1 for the received signal X1 of the first reception station device and respective weight coefficients W2, W3 to Wn+1 for the received signals X2, X3 to Xn+1 of the cooperative station devices based on the received signal X1 and the received signals X2 to Xn+1 received by the received signal receiver, so that a directivity pattern of an array antenna formed of the antenna of the first reception station device and the antennas of the n selected cooperative station devices form a null in a direction of each interference signal;

a synthesized signal generator configured to calculate a product W1·X1 of the received signal X1 received from the first reception station device and the weight coefficient W1, and respective products W2·X2, W3·X3 to Wn+1·Xn+1 of the received signals X2, X3 to Xn+1 received from the respective cooperative station devices and the weight coefficients W2, W3 to Wn+1 to generate a signal of a sum Y, in which:

$Y = W1 \cdot X1 + W2 \cdot X2 + W3 \cdot X3 + \ldots + Wn+1 \cdot Xn+1$; and a synthesized signal transmitter configured to transmit the signal of the sum Y generated by the synthesized signal generator to the first reception station device.

10. The directivity control system according to claim 1, wherein the control device is configured to regard a combination of the antenna of the first reception station device and the antenna of the cooperative station device as one array antenna, and calculate a sum, using a weight, of a received signal received using the antenna of the first reception station device and a received signal received using the antenna of the cooperative station device to compose a directivity pattern having a null in an arrival direction of the interference signal in the array antenna and a high directivity in an arrival direction of the desired signal.

11. A control device configured to control a directivity of an antenna of a first reception station device which receives an interference signal and a desired signal, wherein the control device is configured to regard a combination of the antenna of the first reception station device and an antenna of a cooperative station device disposed at a different place from the first reception station device as one array antenna, and calculate a sum, using weight coefficients W1 and W2, of a received signal X1 received using the antenna of the first reception station device and a received signal X2 received using the antenna of the cooperative station device to compose a directivity pattern having a null in an arrival direction of the interference signal in the array antenna, the weight coefficients W1 and W2 being obtained from an inverse matrix of a correlation matrix and a transpose matrix of a steering vector, the received signal X1 being assigned a weight by using the weight coefficient W1, and the received signal X2 being assigned a weight by using the weight coefficient W2.

12. The control device according to claim 11, comprising:

a received signal receiver configured to receive a first received signal X1, which is received using the antenna of the first reception station device, from the first reception station device, and receive a second received signal X2, which is received using the antenna of the cooperative station device, from the cooperative station device;
a weight coefficient calculator configured to calculate a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna;
a weight coefficient transmitter configured to transmit the first weight coefficient W1 to the first reception station device and the second weight coefficient W2 to the cooperative station device;
a product signal receiver configured to receive a signal of a product W1·X1 of the first received signal X1 and the first weight coefficient W1 from the first reception station device, and receive a signal of a product W2·X2 of the second received signal X2 and the second weight coefficient W2 from the cooperative station device;
a synthesized signal generator configured to generate a signal of a sum Y of the product W1·X1 and the product W2·X2, in which:

$$Y = W1 \cdot X1 + W2 \cdot X2; \text{ and}$$

a synthesized signal transmitter configured to transmit the signal of the sum Y generated by the synthesized signal generator to the first reception station device.

13. The control device according to claim 11, comprising:
a received signal receiver configured to receive a first received signal X1, which is received using the antenna of the first reception station device, from the first reception station device, and receive a second received signal X2, which is received using the antenna of the cooperative station device, from the cooperative station device;
a weight coefficient calculator configured to calculate a first weight coefficient W1 for the first received signal X1 and a second weight coefficient W2 for the second received signal X2 based on the first and second received signals X1 and X2 received by the received signal receiver, so that a directivity pattern of an array antenna formed of the antenna of the first reception station device and the antenna of the cooperative station device has a null in an arrival direction of the interference signal in the array antenna;
a synthesized signal generator configured to calculate a product W1·X1 of the first received signal X1 and the first weight coefficient W1 and a product W2·X2 of the second received signal X2 and the second weight coefficient W2, and generate a signal of a sum Y of the product W1·X1 and the product W2·X2, in which:

$$Y = W1 \cdot X1 + W2 \cdot X2; \text{ and}$$

a synthesized signal transmitter configured to transmit the signal of the sum Y generated by the synthesized signal generator to the first reception station device.

14. The control device according to claim 11, wherein a second reception station device is disposed in place of the cooperative station device, and
the first and second reception station devices are configured to take first and second transmission signals as respective desired signals, and regard transmission signals for other reception station devices as interference signals, and
wherein the control device comprises:
a directivity controller configured to regard a combination of the antenna of the first reception station device and an antenna of the second reception station device as one array antenna, and calculate a sum, using a weight, of a received signal received using the antenna of the first reception station device and a received signal received using the antenna of the second reception station device to form, in the array antenna, a directivity pattern having a null in an arrival direction of an interference signal in the first reception station device when the first reception station device performs reception, and a directivity pattern having a null in an arrival direction of the interference signal in the second reception station device when the second reception station device performs reception.

15. The control device according to claim 11, wherein the first reception station device receives a plurality of interference signals and the desired signal, and a plurality of cooperative station devices are disposed, and
wherein the control device comprises:
a cooperative station selector configured to select at least one or two cooperative station devices based on information on an interference wave number detected by the first reception station device and information on an interference-wave reception state in the cooperative station device, and
the control device configured to regard a combination of the antenna of the first reception station device and antennas of the at least one or two selected cooperative station devices as one array antenna, and calculate a sum, using a weight, of signals received using the respective antennas of the first reception station device and the selected cooperative station devices to form a directivity pattern having a null in an arrival direction of each interference signal in the array antenna.

16. A cooperative station device configured to receive an interference signal from an interference station and a desired signal from a transmission station using an antenna, the cooperative station device being disposed at a different place from a reception station device, the cooperative station device comprising:
a received signal receiver configured to receive a first received signal X1 received using the antenna of the reception station device;
a weight coefficient calculator configured to calculate a first weight coefficient W1 for the first received signal X1 and a second weight coefficient W2 for a second received signal X2 based on the first received signal X1 and the second received signal X2 received using an antenna of the cooperative station device, so that a directivity pattern of an array antenna formed of the antenna of the reception station device and the antenna of the cooperative station device has a null in an arrival direction of the interference signal in the array antenna, the weight coefficients W1 and W2 being obtained from an inverse matrix of a correlation matrix and a transpose matrix of a steering vector; and
a synthesized signal transmitter configured to transmit a signal of a sum Y generated based on the first received signal X1, the first weight coefficient W1, the second received signal X2, and the second weight coefficient W2 to the reception station device, in which:

$$Y = W1 \cdot X1 + W2 \cdot X2.$$

17. The cooperative station device according to claim 16, further comprising:
- a weight coefficient transmitter configured to transmit the first weight coefficient W1 to the reception station device;
- a product signal receiver configured to receive a signal of a product W1·X1 of the first received signal X1 and the first weight coefficient W1 from the reception station device; and
- a synthesized signal generator configured to calculate a product W2·X2 of the second received signal X2 and the second weight coefficient W2 and generate a signal of a sum Y of the product W2·X2 and the product W1·X1 received from the reception station device, in which:

$$Y = W1 \cdot X1 + W2 \cdot X2.$$

18. The cooperative station device according to claim 16, further comprising:
- a synthesized signal generator configured to calculate a product W1·X1 of the first received signal X1 and the first weight coefficient W1 and a product W2·X2 of the second received signal X2 and the second weight coefficient W2, and generate a signal of a sum Y of the product W1·X1 and the product W2·X2, in which:

$$Y = W1 \cdot X1 + W2 \cdot X2.$$

19. The cooperative station device according to claim 16, wherein the weight coefficient calculator is configured to calculate respective weight coefficients for the reception station device, the cooperative station itself, and the other cooperative station device, so that a directivity pattern of an array antenna formed of the antenna of the reception station device, the antenna of the cooperative station device itself, and the other cooperative station device has a null in an arrival direction of the interference signal in the array antenna, and
the synthesized signal transmitter is configured to transmit a sum generated based on respective received signals of the reception station device, the cooperative station itself, and the other cooperative station device, and the respective weight coefficients calculated by the weight coefficient calculator, to the reception station device.

20. A reception station device configured to receive an interference signal from an interference station and a desired signal from a transmission station using an antenna, the reception station device comprising:
- a received signal receiver configured to receive a second received signal X2 that is received using an antenna of a cooperative station device disposed at a different place from the reception station device and receive the interference signal and the desired signal;
- a weight coefficient calculator configured to calculate, based on the second received signal X2 and a first received signal X1 received using the antenna of the reception station device itself, a first weight coefficient W1 for the first received signal X1 and a second weight coefficient W2 for the second received signal X2, so that a directivity pattern of an array antenna formed of the antenna of the cooperative station device and the antenna of the reception station device itself has a null in an arrival direction of the interference signal in the array antenna, the weight coefficients W1 and W2 being obtained from an inverse matrix of a correlation matrix and a transpose matrix of a steering vector; and
- a synthesized signal generator configured to generate a signal of a sum Y based on the first received signal X1, the first weight coefficient W1, the second received signal X2, and the second weight coefficient W2, in which:

$$Y = W1 \cdot X1 + W2 \cdot X2.$$

21. The reception station device according to claim 20, further comprising:
- a weight coefficient transmitter configured to transmit the second weight coefficient W2 to the cooperative station device; and
- a product signal receiver configured to receive a signal of a product W2·X2 of the second received signal X2 and the second weight coefficient W2 from the cooperative station device,
wherein the synthesized signal generator is configured to calculate a product W1·X1 of the first received signal X1 and the first weight coefficient W1, and generate a signal of a sum Y of the product W1·X1 and the product W2·X2 received from the cooperative station device, in which:

$$Y = W1 \cdot X1 + W2 \cdot X2.$$

22. The reception station device according to claim 20, wherein the synthesized signal generator is configured to calculate a product W1·X1 of the first received signal X1 and the first weight coefficient W1 and a product W2·X2 of the second received signal X2 and the second weight coefficient W2, and generate a signal of a sum Y of the product W1·X1 and the product W2·X2, in which:

$$Y = W1 \cdot X1 + W2 \cdot X2.$$

23. The reception station device according to claim 20, wherein the received signal receiver is configured to receive respective received signals that are received using respective antennas of first and second cooperative station devices disposed at a different place from the reception station device and receives the interference signal and the desired signal;
the weight coefficient calculator is configured to calculate respective weight coefficients of the first and second cooperative station devices and the reception station device itself based on the respective received signals received using respective antennas of the first and second cooperative station devices and a received signal received using the antenna of the reception station device itself, so that a directivity pattern of an array antenna formed of the antennas of the first and second cooperative station devices and the antenna of the reception station device itself has a null in an arrival direction of the interference signal in the array antenna; and
the synthesized signal generator is configured to generate a sum based on the respective received signals received using the respective antennas of the first and second cooperative station devices, the received signal received using the antenna of the reception station device itself, and the respective weight coefficients of the first and second cooperative station devices and the reception station device itself.

24. The reception station device according to claim 20, further comprising:
- a cooperative station selector configured to select at least one or two cooperative station devices based on information on a detected interference wave number and information on an interference-wave reception state in the cooperative station device,
wherein the reception station device is configured to regard a combination of the antenna of the reception station device and antennas of the at least one or two selected cooperative station devices as one array antenna, and calculate a sum, using a weight, of signals received using the respective antennas of the reception station device and the selected cooperative station devices to form a directivity pattern having a null in an arrival direction of each interference signal in the array antenna.

25. A method of controlling directivity, the method further comprising:

receiving, by a first reception station device, an interference signal and a desired signal;

receiving, by a cooperative station device disposed at a different place from the first reception station device, a signal using an antenna; and controlling, by a control device, the directivity of an antenna of the first reception station device, wherein the control device regards a combination of the antenna of the first reception station device and the antenna of the cooperative station device as one array antenna, and calculates a sum, using weight coefficients W1 and W2, of a received signal X1 received using the antenna of the first reception station device and a received signal X2 received using the antenna of the cooperative station device to compose a directivity pattern having a null in an arrival direction of the interference signal in the array antenna, the weight coefficients W1 and W2 being obtained from an inverse matrix of a correlation matrix and a transpose matrix of a steering vector, the received signal X1 being assigned a weight by using the weight coefficient W1, and the received signal X2 being assigned a weight by using the weight coefficient W2.

26. The method of controlling directivity according to claim 25, the method further comprising:

receiving, by the control device, a first received signal X1, which is received using the antenna of the first reception station device, from the first reception station device, and receiving a second received signal X2, which is received using the antenna of the cooperative station device, from the cooperative station device;

calculating, by the control device, a first weight coefficient W1 for the first received signal X1 and a second weight coefficient W2 for the second received signal X2 based on the first and second received signals X1 and X2 received in the reception of the first and second received signals, so that a directivity pattern of an array antenna formed of the antenna of the first reception station device and the antenna of the cooperative station device has a null in an arrival direction of the interference signal in the array antenna;

transmitting, by the control device, the first weight coefficient W1 to the first reception station device and the second weight coefficient W2 to the cooperative station device;

receiving, by the control device, a signal of a product W1·X1 of the first received signal X1 and the first weight coefficient W1 from the first reception station device and a signal of a product W2·X2 of the second received signal X2 and the second weight coefficient W2 from the cooperative station device;

generating, by the control device, a signal of the sum Y of the product W1·X1 and the product W2·X2, in which:

$Y = W1 \cdot X1 + W2 \cdot X2$; and transmitting, by the control device, the signal of the sum Y generated in the generation to the first reception station device.

27. The method of controlling directivity according to claim 25, the method further comprising:

receiving, by the control device, a first received signal X1, which is received using the antenna of the first reception station device, from the first reception station device, and receiving a second received signal X2, which is received using the antenna of the cooperative station device, from the cooperative station device;

calculating, by the control device, a first weight coefficient W1 for the first received signal X1 and a second weight coefficient W2 for the second received signal X2 based on the first and second received signals X1 and X2 received in the reception of the first and second received signals, so that a directivity pattern of an array antenna formed of the antenna of the first reception station device and the antenna of the cooperative station device has a null in an arrival direction of the interference signal in the array antenna;

calculating, by the control device, a product W1·X1 of the first received signal X1 and the first weight coefficient W1 and a product W2·X2 of the second received signal X2 and the second weight coefficient W2, and generating a signal of a sum Y of the product W1·X1 and the product W2·X2, in which:

$Y = W1 \cdot X1 + W2 \cdot X2$; and transmitting, by the control device, the signal of the sum Y generated in the generation to the first reception station device.

28. The method of controlling directivity according to claim 25, wherein a second reception station device is disposed in place of the cooperative station device, and the first and second reception station devices take first and second transmission signals as respective desired signals, and regard transmission signals for other reception station devices as interference signals, and the method further comprises:

regarding, by the control device, a combination of the antenna of the first reception station device and the antenna of the second reception station device as one array antenna, and calculating a sum, using a weight, of a received signal received using the antenna of the first reception station device and a received signal received using the antenna of the second reception station device to form, in the array antenna, a directivity pattern having a null in an arrival direction of an interference signal in the first reception station device when the first reception station device performs reception, and a directivity pattern having a null in an arrival direction of the interference signal in the second reception station device when the second reception station device performs reception.

29. The method of controlling directivity according to claim 25, wherein the first reception station device receives a plurality of interference signals and the desired signal, and a plurality of cooperative station devices are disposed, and the method further comprises:

selecting, by the control device, at least one or two cooperative station devices based on information on an interference wave number detected by the first reception station device and information on an interference-wave reception state in the cooperative station device; and regarding, by the control device, a combination of the antenna of the first reception station device and antennas of the at least one or two selected cooperative station devices as one array antenna, and calculating a sum, using a weight, of signals received using the respective antennas of the first reception station device and the selected cooperative station devices to form a directivity pattern having a null in an arrival direction of each interference signal in the array antenna.

* * * * *